United States Patent [19]
Arikane et al.

[11] Patent Number: 5,959,700
[45] Date of Patent: Sep. 28, 1999

[54] AUTOMATIC TUNING APPARATUS FOR A VIDEO TAPE SIGNAL

[75] Inventors: Noboru Arikane; Tetsuo Sugano; Kimitoshi Hongoh; Isamu Okugawa; Katsushi Shimamoto; Junichi Hamada; Keiichiro Shirakashi, all of Tokyo, Japan

[73] Assignee: Mitsubishi Denki Kabushiki Kaisha, Tokyo, Japan

[21] Appl. No.: 08/581,422

[22] Filed: Dec. 29, 1995

[30] Foreign Application Priority Data

Jan. 25, 1995 [JP] Japan .................................. 7-009738

[51] Int. Cl.⁶ ..................................................... H04N 5/50
[52] U.S. Cl. ............................ 348/731; 348/735; 348/468
[58] Field of Search ..................................... 348/735, 731, 348/732, 726, 465, 468, 570; 455/154.1, 158.1, 182.2, 182.3, 164.2, 185.1, 192.2, 192.3; 386/83; H04N 5/50

[56] References Cited

U.S. PATENT DOCUMENTS

| | | | |
|---|---|---|---|
| 4,701,794 | 10/1987 | Fröling et al. | 348/468 |
| 4,897,727 | 1/1990 | Richards | 348/731 |
| 5,371,550 | 12/1994 | Shibutani et al. | 348/735 |
| 5,428,400 | 6/1995 | Landis et al. | 348/465 |
| 5,428,405 | 6/1995 | Lee | 348/731 |
| 5,557,422 | 9/1996 | Nishigaki et al. | 386/83 |
| 5,564,088 | 10/1996 | Saitoh | 348/731 |
| 5,631,707 | 5/1997 | D'Errico | 348/731 |

FOREIGN PATENT DOCUMENTS 4-371085  12/1992  Japan .

*Primary Examiner*—Sherrie Hsia
*Attorney, Agent, or Firm*—Oblon, Spivak, McClelland, Maier & Neustadt, P.C.

[57] ABSTRACT

An automatic tuning apparatus capable of automatically switching the tuning mode of a tuner circuit, automatically arranging various signal data in or after completion of tuning and arbitrarily and automatically arranging various signal data by the user comprises a SYNC discrimination circuit (11) discriminating whether a video signal system is the NTSC system or another system, a tuning mode switching circuit (12) for switching the tuning mode, and a color discrimination circuit (13) receiving a color bust signal (identic signal) for discriminating whether the video signal system is the PAL system or the SECAM system. As to the NTSC system, the PAL system, the SECAM system and the SECAM-L system, the user may not set the tuning mode of tuning circuit, whereby an automatic tuning apparatus imposing no burden on the user can be obtained.

8 Claims, 51 Drawing Sheets

PRIOR ART
FIG. 53

| | | | | | |
|---|---|---|---|---|---|
| STATION NUMBER AND TUNING DATA IN TUNING (WHEN ONLY 4 STATIONS ARE RECEIVABLE) | STATION NUMBER | 0 | 1 | 2 | 3 | 4~99 |
| | DATA | B STATION | D STATION | C STATION | A STATION | NO DATA |
| POSITION NUMBER AMD TUNING DATA AFTER CONMPLETION OF TUNING (WHEN CHANNEL CAPACITIES ARE 0 TO 99) | POSIION NUMBER | 0 | 1 | 2 | 3 | 4~99 |
| | DATA | B STATION | D STATION | C STATION | A STATION | SKIPPED SO THAT THIS POSITION CANNOT BE CALLED |

AUTOMATIC TUNING APPARATUS FOR A VIDEO TAPE SIGNAL

BACKGROUND OF THE INVENTION

1. Field of the Invention

The present invention relates to an automatic tuning apparatus, and more particularly, it relates to an automatic tuning apparatus for a VTR, which is adapted to discriminate the signal system and process stored signal information in automatic tuning.

2. Description of the Background Art

A conventional automatic tuning apparatus for a VTR (video tape recorder) is now described with reference to FIGS. 51 to 53. FIG. 51 is a block diagram showing a principal part in the conventional automatic tuning apparatus for a VTR, and FIG. 52 is a flow chart as to its operation. FIG. 53 shows the relations between station numbers (expedient broadcasting station numbers) and position numbers (expedient numbers on the VTR unit for selecting the broadcasting stations) after completion of tuning.

Referring to FIG. 51, numeral 2 denotes a tuner circuit which can be switched in correspondence to a video signal system by an external control signal, numeral 3 denotes a video signal processing circuit (referred to as Y/C in the figure) including a synchronizing signal (abbreviated as SYNC) separation circuit which receives a composite video signal S1 from the tuner circuit 2 and carries out signal processing, numeral 4 denotes an AFT detection circuit which detects presence/absence of a broadcasting station by a signal received from the tuner circuit 2, numeral 5 denotes a tuning control circuit, and numeral 6 denotes a memory circuit, and a system controller 7 is formed by the tuning control circuit 5 and the memory circuit 6. Numeral 8 denotes an input signal system switch for switching the operation of the tuning control circuit 5 in response to the carrier system of the input signal.

The operation is now described with reference to FIGS. 52 and 53. First, the operation of automatic tuning (hereinafter referred to as auto tuning) is described with reference to the flow chart of FIG. 52. When a command for automatic tuning (hereinafter referred to as auto tuning) is received from the user, the system controller 7 sets the tuning mode of the tuner circuit 2 at the PAL system and sets a memory address of the memory 6 at a station number "0", as initialization (step ST1).

Then, a tuning control signal S3 is transmitted to the tuner circuit 2, to control the same in a direction for increasing its tuning frequency by a constant amount (step ST2).

At this time, an AFT (automatic fine tuning) signal S4 which is outputted from the AFT detection circuit 4 and a SYNC signal S2 indicating presence/absence of a signal separated by the video signal processing circuit 3 are inputted in the tuning control 5 for making a discrimination, in order to detect presence/absence of a broadcasting station transmitting a signal of the frequency (step ST3).

When both of the AFT signal S4 and the SYNC signal S3 are supplied at this point of time, the tuning control circuit 5 determines that it has been possible to receive the signal from the broadcasting station, and stores current tuning data in the address of the station number "0" in the memory 6 (step ST4). The tuning data indicates data related to the frequency.

Then, the address of the memory 6 is incremented by one to a station number "1" to enter a next tuning operation, in order to store next tuning data (step ST5).

When both of the AFT signal S4 and the SYNC signal S2 are not supplied, on the other hand, a discrimination is made as to whether or not the current frequency reaches the upper limit of the tuning frequency, i.e., whether or not the tuning is ended (step ST6). The tuning is ended if the current frequency reaches the upper limit of the tuning frequency, otherwise the operation at the step ST2 is carried out again. The operations at the steps ST2 to ST6 are repeated, so that the tuning is ended when the frequency reaches the upper limit of the tuning frequency.

The tuning data obtained by the tuning is supplied to a channel selection system from the address in the memory 6, so that a position number for channel selection is allotted and the tuning mode is ended.

Results obtained by the aforementioned auto tuning are expressed as shown in FIG. 53. FIG. 53 shows station numbers of the addresses of the memory 6 and the tuning data stored therein, and the relations between the station numbers and the position numbers for channel selection.

FIG. 53 indicates that frequency data corresponding to transmission frequencies of "B station", "D station", "C station" and "A station" are stored in the station numbers "0" to "3" as the tuning data respectively. On the other hand, it indicates that no data to be stored are present, i.e., no broadcasting stations are present in the station numbers "4" to "99".

In the channel selection system, the frequency data corresponding to the transmission frequencies of "B station", "D station", "C station" and "A station" are stored in the position numbers "0" to "3" respectively, while the position numbers "4" to "99" are skipped since no data reading is necessary.

The user can use the channel selection system of the VTR from the point of time when the auto tuning is completed, and obtain a tuned signal by selecting a switch corresponding to the position number. In the auto tuning, the tuning operation is carried out only as to a signal which is transmitted in the PAL system, and hence no signal transmitted in a transmission system other than the PAL system can be obtained. In order to tune a signal of a transmission system other than the PAL system, the input signal system switch 8 which is connected to the tuning control circuit 5 is so switched that the tuning control circuit 5 supplies a control signal SCON for switching the input signal system to the tuner circuit 2.

The conventional automatic tuning apparatus is structured in the aforementioned manner, and hence the transmission system of the input signal is set at the PAL system in initialization. In order to tune a signal of a transmission system other than the PAL system, the user must manually switch the input signal system switch 8 after completion of auto tuning, to carry out re-tuning.

In the auto tuning, further, only the data related to the frequency is stored and hence there are no data as to the type of the tuned broadcasting station, strongness/weakness of the signal, and the sound and video signal systems which are varied with countries. Thus, the user is disadvantageously forced to select the position in relation to these differences after completion of the auto tuning.

SUMMARY OF THE INVENTION

According to a first aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, the automatic tuning apparatus comprises a text data decoder receiving the video signal which is outputted from the tuner means for decoding text data included in the video signal, and the tuning control means controls the tuner means by the decoded text data while separating broadcasting station information specifying the broadcasting station from the decoded text data for storing the same in the memory means along with the data related to the tuning frequency.

According to a second aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, the automatic tuning apparatus comprises noise detection means receiving the video signal which is outputted from the tuner means for detecting a random noise included in the video signal and outputting the same as noise data, and the noise data is stored in the memory means along with the data related to the tuning frequency through the tuning control means.

According to a third aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, the automatic tuning apparatus comprises signal definition detection means receiving the video signal which is outputted from the tuner means for detecting signal definition of the video signal and outputting signal definition data, and the signal definition data is stored in the memory means along with the data related to the tuning frequency through the tuning control means.

According to a fourth aspect of the present invention, the automatic tuning apparatus further comprises character generator means which is connected to a side of the video signal processing means outputting the video signal for superposing the broadcasting station information which is stored in the memory means on the video signal.

According to a fifth aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, the automatic tuning apparatus comprises synchronizing signal discrimination means receiving the synchronizing signal from the video signal processing means and counting the pulse number of the synchronizing signal per second for discriminating the video signal system of the video signal in response to the pulse number and outputting the result of the discrimination as a synchronizing signal discrimination signal, and tuning mode switching means receiving the synchronizing signal discrimination signal for outputting a tuning mode switching signal for changing the tuning mode of the tuner means in response to the signal system of the video signal and supplying the synchronizing signal discrimination signal to the tuning control means, and the tuning mode of the tuner means is automatically changed in response to the signal system of the video signal, while the tuning mode of the tuner means is stored in the memory means along with the data related to the tuning frequency through the tuning control means.

According to a sixth aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, the automatic tuning apparatus comprises color signal discrimination means receiving the synchronizing signal from the video signal processing means and counting the frequency of a color burst signal which is superposed on the trailing edge of the synchronizing signal for discriminating the video signal system of the video signal in response to the frequency and outputting the result of the discrimination as a color signal discrimination signal, and tuning mode switching means receiving the color discrimination signal for outputting a tuning mode switching signal for switching the tuning mode of the tuner means in response to the signal system of the video signal and supplying the color signal discrimination signal to the tuning control means, and the tuning mode of the tuner means is automatically changed in response to the signal system of the video signal, while the tuning mode of the tuner means is stored in the memory means along with the data related to the tuning frequency through the tuning control means.

According to a seventh aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, the automatic tuning apparatus comprises synchronizing signal discrimination means receiving the synchronizing signal from the video signal processing means and counting the pulse number of the synchronizing signal per second for discriminating the video signal system of the video signal in response to the pulse number and outputting the result of the discrimination as a synchronizing signal discrimination signal, and color signal discrimination means receiving the synchronizing signal from the video signal processing means and counting the frequency of a color burst signal which is superposed on the trailing edge of the synchronizing signal for discriminating the video signal system of the video signal in response to the frequency and outputting the result of the discrimination as a color signal discrimination signal, tuning mode switching means receiving the synchronizing signal discrimination signal and the color signal discrimination signal outputting a tuning mode switching signal for switching the tuning mode of the tuner means in response to the signal system of the video signal and supplying the synchronizing signal discrimination signal and the color signal discrimination signal to the tuning control means, and the tuning mode of the tuner means is automatically changed in response to the signal system of the video signal, while the tuning mode of the tuner means is stored in the memory means along with the data related to the tuning frequency through the tuning control means.

According to an eighth aspect of the present invention, an automatic tuning apparatus comprises tuner means tune-selecting a prescribed channel from broadcast electric waves including a video signal and a sound signal, sound signal processing means receiving the sound signal which is outputted from the tuner means and carrying out sound demodulation in response to the signal system of the sound signal for outputting the same as a demodulated sound signal, AFT detection means detecting presence/absence of a broadcasting station by a signal received from the tuner means, tuning control means receiving the demodulated sound signal and an AFT signal from the AFT detection means for controlling a tuning operation of the tuner means, and memory means which is connected to the tuning control means for storing data related to at least the tuning frequency of the tuner means, the sound processing means includes a plurality of sound demodulation means which are supplied with the sound signal in parallel with each other, and voltage control oscillation means which is connected to each of the plurality of sound demodulation means for oscillating only one different frequency among frequencies corresponding to the signal system of the sound signal, while only that of the sound demodulation means having the voltage control oscillation means oscillating the frequency corresponding to the sound signal carries out sound demodulation, and the value of the frequency corresponding to the sound signal is stored in the memory means along with the data related to the tuning frequency through the tuning control means.

According to a ninth aspect of the present invention, an automatic tuning apparatus comprises tuner means tune-selecting a prescribed channel from broadcast electric waves including a video signal and a sound signal, sound signal processing means receiving the sound signal which is outputted from the tuner means and carrying out sound demodulation in response to the signal system of the sound signal for outputting the same as a demodulated sound signal, AFT detection means detecting presence/absence of a broadcasting station by a signal received from the tuner means, tuning control means receiving the demodulated sound signal and an AFT signal from the AFT detection means for controlling a tuning operation of the tuner means, and memory means which is connected to the tuning control means for storing data related to at least the tuning frequency of the tuner means, the sound processing means includes sound demodulation means, voltage control oscillation means which is connected to the sound demodulation means and oscillating various frequencies corresponding to the signal system of the sound signal, and sound detection means which is connected to an output side of the sound demodulation means, discriminating whether or not the sound demodulation means outputs the demodulated sound signal, and supplying the result to the tuning control means, sound demodulation is carried out while making the voltage control oscillation means oscillate a frequency corresponding to the sound signal, and the value of the frequency corresponding to the sound signal is stored in the memory means along with the data related to the tuning frequency through the tuning control means.

According to a tenth aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the signal processing means and an AFT signal from the AFT detection means for controlling a tuning operation of the tuner means, and memory means which is connected to the tuning control means for storing data related to at least the tuning frequency of the tuner means, the automatic tuning apparatus comprises a text data decoder receiving the video signal which is outputted from the tuner means for decoding text data included in the video signal, and sorting control means automatically sorting storage contents which are stored in the memory means, including at least the data related to the tuning frequency of the tuning means, in previously set order, and the tuning control means controls the tuner means by the decoded text data while separating broadcasting station information specifying the broadcasting station from the decoded text data for storing the same in the memory means along with the data related to the tuning frequency, and data related to the broadcasting station information and the corresponding tuning frequency are automatically sorted in previously set order.

According to an eleventh aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, the automatic tuning apparatus comprises video signal system discrimination means receiving the synchronizing signal from the video signal processing means for discriminating the video signal system of the video signal and supplying the result of the discrimination to the tuning control means as video signal system information, and sorting control means automatically sorting storage contents which are stored in the memory means, including at least the data related to the tuning frequency of the tuning means, in previously set order, the video signal system information is stored in the memory means along with the data related to the tuning frequency through the tuning control means, and data related to the video signal system information and the corresponding tuning frequency are automatically sorted in previously set order.

According to a twelfth aspect of the present invention, the video signal system discrimination means includes synchronizing signal discrimination means receiving the synchronizing signal from the video signal processing means and counting the pulse number of the synchronizing signal per second for discriminating the video signal system of the video signal in response to the pulse number, and the video signal system information is a synchronizing signal discrimination signal which is outputted from the synchronizing signal discrimination means as the result of the discrimination.

According to a thirteenth aspect of the present invention, the video signal system discrimination means includes color signal discrimination means receiving the synchronizing signal from the video signal processing means and counting the frequency of a color burst signal which is superposed on the trailing edge of the synchronizing signal for discriminating the video signal system of the video signal in response to the frequency, and the video signal system information is a color signal discrimination signal which is outputted from the color signal discrimination means as the result of the discrimination.

According to a fourteenth aspect of the present invention, the video signal system discrimination means includes synchronizing signal discrimination means receiving the synchronizing signal from the video signal processing means and counting the pulse number of the synchronizing signal per second for discriminating the video signal system of the video signal in response to the pulse number, and color signal discrimination means receiving the synchronizing signal from the video signal processing means and counting the frequency of a color burst signal which is superposed on the trailing edge of the synchronizing signal for discriminating the video signal system of the video signal in response to the frequency, and the video signal system information is a synchronizing signal discrimination means and a color signal discrimination signal which is outputted from the synchronizing signal discrimination means and the color signal discrimination means as the results of the discriminations.

According to a fifteenth aspect of the present invention, an automatic tuning apparatus comprises tuner means tune-selecting a prescribed channel from broadcast electric waves including a sound signal and a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, and the automatic tuning apparatus comprises sound signal system discrimination means receiving the sound signal which is outputted from the tuner means for discriminating the signal system of the sound signal and supplying the result of the discrimination to the tuning control means as sound signal system information, and sorting control means automatically sorting storage contents which are stored in the memory means, including at least the data related to the tuning frequency of the tuning means, in previously set order, while the sound signal system information is stored in the memory means along with the data related to the tuning frequency through the tuning control means, and data related to the sound signal system information and the corresponding tuning frequency are automatically sorted in previously set order.

According to a sixteenth aspect of the present invention, the sound signal system discrimination means includes a plurality of sound demodulation means which are supplied with the sound signal in parallel with each other, and voltage control oscillation means which is connected to each of the plurality of sound demodulation means for oscillating only one different frequency among frequencies corresponding to the signal system of the sound signal, and the sound signal system information is the value of the frequency of the voltage control oscillation means oscillating the frequency corresponding to the sound signal.

According to a seventeenth aspect of the present invention, the sound signal system discrimination means included sound demodulation means, voltage control oscillation means which is connected to the sound demodulation means and oscillating various frequencies corresponding to the signal system of the sound signal, and sound detection means which is connected to an output side of the sound demodulation means, determining whether or not the sound demodulation means outputs the demodulated sound signal, and supplying the result to the tuning control means, and the sound signal system information is the value of the frequency which is oscillated by the voltage control oscillation means for demodulating the sound signal in the sound demodulation means.

According to an eighteenth aspect of the present invention, the automatic tuning apparatus further comprises sorting order set means which is connected to the memory means for arbitrarily setting sorting order of the storage contents.

According to a nineteenth aspect of the present invention, an automatic tuning apparatus comprises tuner means tune-selecting a prescribed channel from broadcast electric waves including at least a video signal, video signal processing means receiving the video signal which is outputted from the tuner means and separating a synchronizing signal which is included in the video signal, AFT detection means detecting presence/absence of a broadcasting station by a signal received from the tuner means, tuning control means receiving the synchronizing signal from the video signal processing means and an AFT signal from the AFT detection means for controlling a tuning operation of the tuner means, and memory means which is connected to the tuning control means for storing data related to at least the tuning frequency of the tuner means, the automatic tuning apparatus comprises picture definition discrimination means receiving the video signal which is outputted from the tuner means for discriminating the degree of picture definition of the video signal and supplying the result of the discrimination to the tuning control means as picture definition information, and sorting control means automatically sorting storage contents which are stored in the memory means, including at least data related to the tuning frequency of the tuning means, in previously set order, the picture definition information is stored in the memory means along with the data related to the tuning frequency through the tuning control means, and data related to the picture definition information and the corresponding tuning frequency are automatically sorted in order of the degree of picture definition.

According to a twentieth aspect of the present invention, the picture definition discrimination means has picture definition detection means receiving the video signal which is outputted from the tuning means and detecting signal definition of the video signal, and the picture definition information is a picture definition signal which is outputted from the picture definition detection means as the result of the discrimination.

In the automatic tuning apparatus according to the first aspect of the present invention, the broadcasting station information specifying the broadcasting station is separated from the decoded text data in the tuning control means and stored in the memory means along with the data related to the tuning frequency, whereby the broadcasting station information can be recognized at need during and after completion of automatic tuning.

In the automatic tuning apparatus according to the second aspect of the present invention, the noise data is stored in the memory means along with the data related to the tuning frequency, whereby the broadcast electric wave receiving situation can be recognized at need during and after completion of automatic tuning.

In the automatic tuning apparatus according to the third aspect of the present invention, the receiving situation of broadcast electric waves including not only a simple noise but jamming and ghost waves can be recognized at need during and after completion of automatic tuning.

In the automatic tuning apparatus according to the fourth aspect of the present invention, the broadcasting station information can be displayed on a receiver screen due to provision of the character generator means for superposing the broadcasting station information stored in the memory means on the video signal.

In the automatic tuning apparatus according to the fifth aspect of the present invention, the tuning mode of the tuner means is automatically changed in response to the signal system of the video signal which is discriminated by the synchronizing signal discrimination means and this tuning mode of the tuner means is stored in the memory means along with the data related to the tuning frequency through the tuning control means, whereby the user may not set the tuning mode of the tuner means as to the signal system of the video signal which is discriminated by the synchronizing signal discrimination means, i.e., as to the PAL system or the NTSC system.

In the automatic tuning apparatus according to the sixth aspect of the present invention, the tuning mode of the tuner means is automatically changed in response to the signal system of the video signal which is discriminated by the color signal discrimination means and this tuning mode of the tuner means is stored in the memory means along with the data related to the tuning frequency through the tuning control means, whereby the user may not set the tuning mode of the tuner means as to the signal system of the video signal which is discriminated by the color signal discrimination means, i.e., as to the PAL system, the SECAM system or the SECAM-L system.

In the automatic tuning apparatus according to the seventh aspect of the present invention, the tuning mode of the tuner means is automatically changed in response to the signal system of the video signal which is discriminated by the synchronizing signal discrimination means and the color signal discrimination means and this tuning mode of the tuner means is stored in the memory means along with the data related to the tuning frequency through the tuning control means, whereby the user may not set the tuning mode of the tuner means as to the signal system of the video signal which is discriminated by the synchronizing signal discrimination means and the color signal discrimination means, i.e., as to the NTC system, the PAL system, the SECAM system or the SECAM-L system.

In the automatic tuning apparatus according to the eighth aspect of the present invention, the sound demodulation means having the voltage control oscillation means oscillating the frequency corresponding to the sound signal carries out sound demodulation among those provided in parallel with each other, whereby the time required for the sound demodulation is short and the broadcast electric waves can be discriminated by the signal system of the sound signal during and after completion of automatic tuning, and the discrimination of the sound signal can be quickened and classification of the broadcast electric waves can be further refined, and an automatic tuning apparatus suitable for employment in an area having various broadcast electric waves in a mixed state can obtained.

In the automatic tuning apparatus according to the ninth aspect of the present invention, the voltage control oscillation means is made to oscillate the frequency corresponding to the sound signal for carrying out sound demodulation, whereby the numbers of necessary sound demodulation means and voltage control oscillation means can be reduced and the broadcast electric waves can be discriminated by the signal system of the sound signal during and after completion of automatic tuning, and the discrimination of the sound signal can be quickened and classification of the broadcast electric waves can be further refined, and an automatic tuning apparatus suitable for employment in an area having various broadcast electric waves in a mixed state can be obtained.

In the automatic tuning apparatus according to the tenth aspect of the present invention, the broadcasting station information specifying the broadcasting station is separated from the decoded text data in the tuning control means and stored in the memory means along with the data related to the tuning frequency while the broadcasting station information and the data related to the corresponding tuning frequency are automatically sorted in previously set order, whereby the user may not set a call number in correspondence to the broadcasting station information.

In the automatic tuning apparatus according to the eleventh aspect of the present invention, the video signal system information is stored in the memory means along with the data related to the tuning frequency through the tuning control means while the video signal system information and the data related to the corresponding tuning frequency are automatically sorted in previously set order, whereby the user may not set a call number in correspondence to the video signal system information.

In the automatic tuning apparatus according to the twelfth aspect of the present invention, the video signal system discrimination means has the synchronizing signal discrimination means so that the video signal system information is formed by the synchronizing signal discrimination signal which is outputted as the result of the discrimination, whereby the user may not set a call number in correspondence to the video signal system information as to the signal system of the video signal which is discriminated by the synchronizing signal discrimination means.

In the automatic tuning apparatus according to the thirteenth aspect of the present invention, the video signal system discrimination means has the color signal discrimination means so that the video signal system information is formed by the color signal discrimination signal which is outputted as the result of the discrimination, whereby the user may not set a call number in correspondence to the video signal system information as to the signal system of the video signal which is discriminated by the color signal discrimination means, i.e., as to the PAL system, the SECAM system or the SECAM-L system.

In the automatic tuning apparatus according to the fourteenth aspect of the present invention, the video signal system discrimination means has the synchronizing signal discrimination means and the color signal discrimination means so that the video signal system information is formed by the synchronizing signal discrimination signal and the color signal discrimination signal, whereby the user may not set a call number in correspondence to the video signal system information as to the signal system of the video signal which is discriminated by the synchronizing signal discrimination means and the color signal discrimination means, i.e., as to the NTSC system, the PAL system, the SECAM system or the SECAM-L system.

In the automatic tuning apparatus according to the fifteenth aspect of the present invention, the sound signal system information is stored in the memory means along with the data related to the tuning frequency through the tuning control means and the sound signal system information and the data related to the corresponding tuning frequency are automatically sorted in previously set order, whereby the user may not set a call number in correspondence to the sound signal system information.

In the automatic tuning apparatus according to the sixteenth aspect of the present invention, the sound signal system discrimination means has a plurality of sound demodulation means which are supplied with the sound signal in parallel with each other and the voltage control oscillation means which is connected to each of the plurality of sound demodulation means for oscillating only one different frequency among those corresponding to the signal system of the sound signal so that the sound signal system information is formed by the value of the frequency of the voltage control oscillation means oscillating the frequency corresponding to the sound signal, whereby the time required for discriminating the sound signal system is short. Hence the discrimination of the sound signal is quickened and no operation for setting the call number is required, whereby an automatic tuning apparatus imposing onto burden on the user can be obtained.

In the automatic tuning apparatus according to the seventeenth aspect of the present invention, the sound signal system discrimination means has the sound demodulation means, the voltage control oscillation means which is connected with the sound demodulation means and oscillating various frequencies corresponding to the signal system of the sound signal, and the sound detection means which is connected to the output side of the sound demodulation means for discriminating whether or not the demodulated sound signal is outputted from the sound demodulation means and supplying the result to the tuning control means, and the sound signal system information is formed by the value of the frequency oscillated by the voltage control oscillation means in order to demodulate the sound signal in the sound demodulation means, whereby the numbers of the required sound demodulation means and voltage control oscillation means can be reduced, and no operation for setting the call number is required, whereby an automatic tuning apparatus imposing no burden on the user can be obtained.

The automatic tuning apparatus according to the eighteenth aspect of the present invention further comprises the sorting order set means which is connected with the memory means for arbitrarily setting the sorting order for the storage contents, whereby an automatic tuning apparatus having a large degree of freedom for the user can be obtained.

In the automatic tuning apparatus according to the nineteenth aspect of the present invention, the picture definition information is stored in the memory means along with the data related to the tuning frequency through the tuning control means while the picture definition information and the data related to the corresponding tuning frequency are sorted in order of degrees of picture definition, whereby the user may not set the call number in correspondence to the order of degrees of picture definition.

In the automatic tuning apparatus according to the twentieth aspect of the present invention, the picture definition discrimination means has the picture definition detection means receiving the video signal outputted from the tuner means for detecting the signal definition of the video signal so that the picture definition information is formed by the picture definition signal outputted as the result of the discrimination, whereby the degrees of picture definition can be discriminated in relation to not only simple noises but jamming and ghost waves.

An object of the present invention is to obtain an automatic tuning apparatus which can automatically switch the tuning mode of a tuner circuit in correspondence to a sound signal system and a video signal system, automatically arrange various signal data in correspondence to a previously set position number during or after completion of tuning, or automatically arrange various signal data in correspondence to a position number required by the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 51 illustrates the structure of a conventional automatic tuning apparatus;

FIG. 53 illustrates the operation of the conventional automatic tuning apparatus.

DESCRIPTION OF THE PREFERRED EMBODIMENTS

<First Embodiment>

Figure 1:
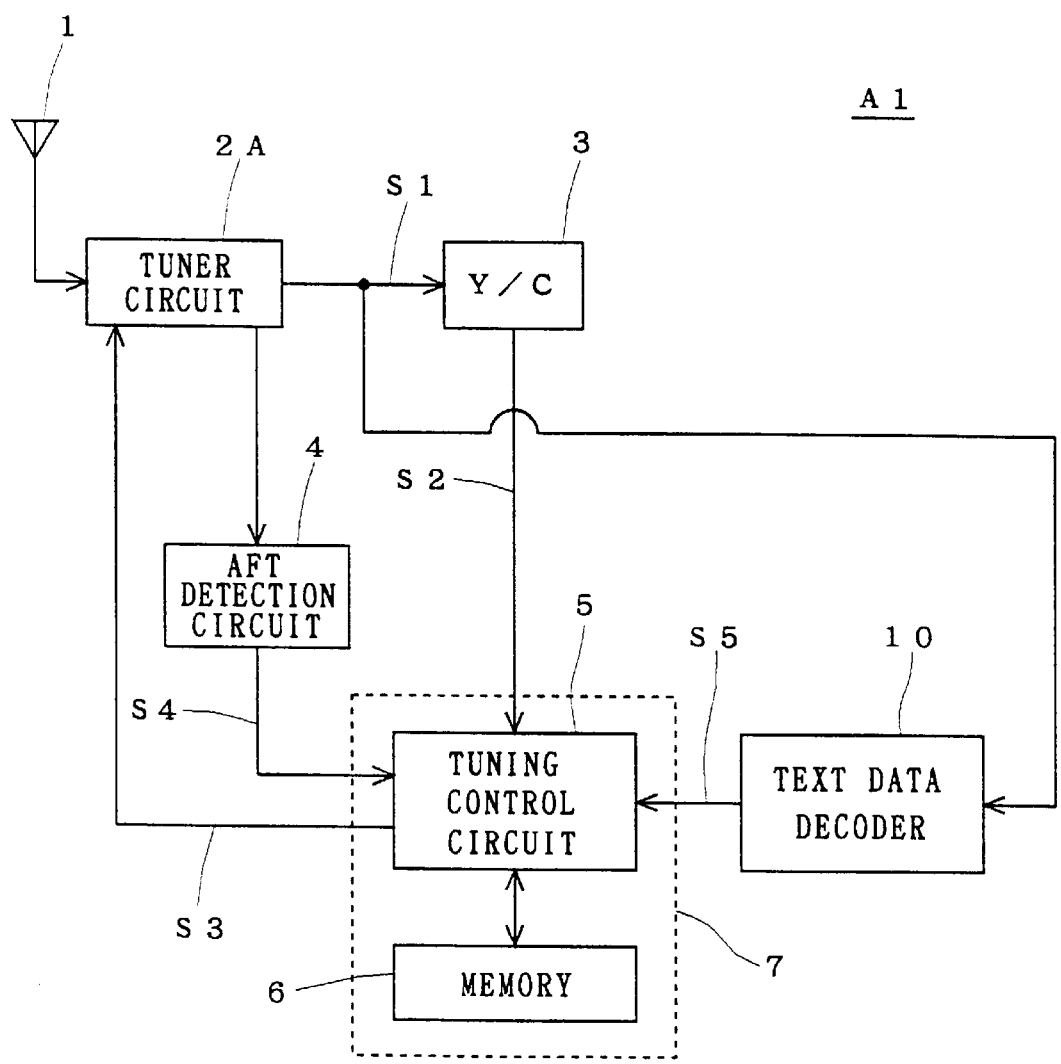
FIG. 1 illustrates the structure of an automatic tuning apparatus according to a first embodiment of the present invention.

FIG. 1 shows the structure of an automatic tuning apparatus A1 for a VTR according to a first embodiment of the present invention. Referring to FIG. 1, numeral 2A denotes a tuner circuit which is connected to an antenna 1, numeral 3 denotes a video signal processing circuit including a SYNC separation circuit receiving a composite video signal S1 from the tuner circuit 2A and carrying out signal processing, numeral 4 denotes an AFT detection circuit receiving a signal from the tuner circuit 2A and detecting presence/absence of a broadcasting station, numeral 5 denotes a tuning control circuit for controlling the tuning operation of the tuner circuit 2A, and numeral 6 denotes a memory circuit which is connected with the tuning control circuit 5, and a system controller 7 is formed by the tuning control circuit 5 and the memory circuit 6. Numeral 10 denotes a text data decoder circuit receiving the video signal S1 and extracting a teletext signal S5, which is information from the broadcasting station, from the video signal S1 for supplying the same to the tuning control circuit 5.

Figure 2:
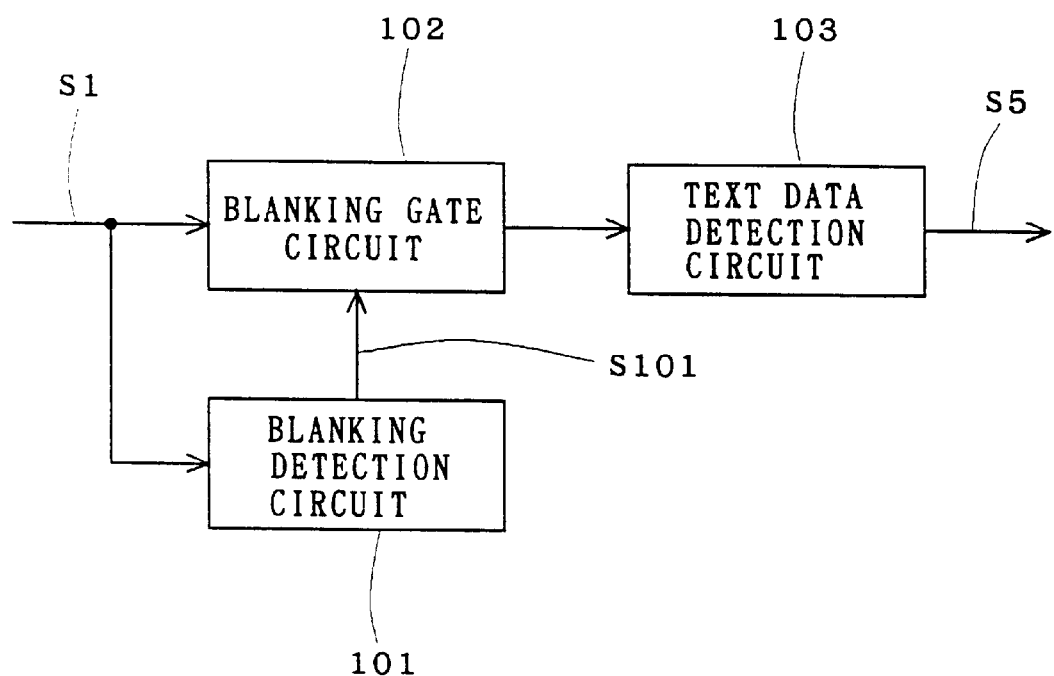
FIG. 2 illustrates a partial structure of the automatic tuning apparatus according to the first embodiment of the present invention.

With reference to FIG. 2, the structure of the text data decoder circuit 10 is now described. Referring to FIG. 2, the text data decoder circuit 10 is formed by a blanking detection circuit 101 and a blanking gate circuit 102 which are supplied with the video signal S1, and a text data detection circuit 103 which is connected to the blanking gate circuit 102 and outputs the teletext signal S5.

The operation is now described. The blanking detection circuit 101 detects a part (vertical blanking period) of the video signal S1 having no actual signal such as a picture in the vicinity of a synchronizing signal, and supplies a blanking signal S101 to the blanking gate circuit 102. In the video signal S1 which is supplied to the blanking gate circuit 102, only the part having no actual signal such as the picture in the vicinity of the synchronizing signal is extracted in response to the blanking signal S101 and supplied to the text data detection circuit 103, so that text data included in this part is read in the text data detection circuit 103 and outputted as the teletext signal S5.

Figure 3:
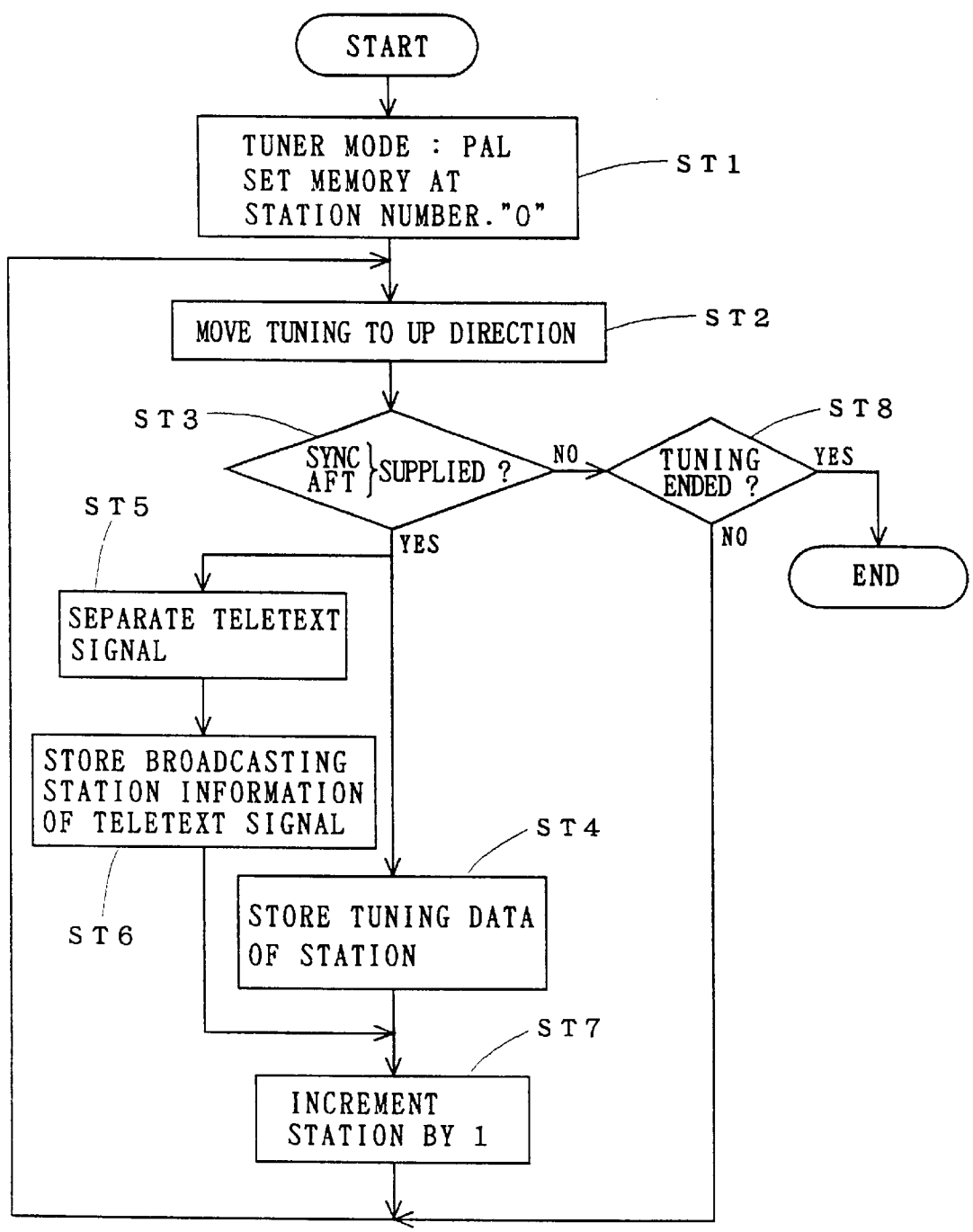
FIG. 3 is a flow chart for illustrating the operation of the automatic tuning apparatus according to the first embodiment of the present invention.

The operation of the automatic tuning apparatus A1 is now described with reference to a flow chart shown in FIG. 3. When a command for auto tuning is received from the user, the system controller 7 sets the tuning mode of the tuner circuit 2A at the PAL system while setting the memory address of the memory 6 at a station number "0" as initialization (step ST1).

Then, a tuning control signal S3 is transmitted to the tuner circuit 2A, to control the same in a direction for increasing the tuning frequency by a constant amount (step ST2). In order to detect presence/absence of a broadcasting station transmitting a signal of the frequency at this time, an AFT (automatic fine tuning) signal S4 outputted from the AFT detection circuit 4 and a SYNC signal S2 indicating presence/absence of a signal separated by the video signal processing circuit 3 are inputted in the tuning control circuit 5, for making a discrimination (step ST3).

If both of the AFT signal S4 and the SYNC signal S2 are supplied at this point of time, the tuning control circuit 5 determines that the signal from the broadcasting station can be received, and stores the current tuning data (data related to the frequency) in the address of the station number "0" in the memory 6 (step ST4).

At the same time, the text data decoder circuit 10 decodes text information which is superposed on a blanking period of the signal from the composite video signal S1, so that the decoded teletext signal S5 is inputted in the tuning control circuit 5 (step ST5).

The tuning control circuit 5 extracts broadcasting station information from the teletext signal S5, and stores the same in the address of the station number "0" in the memory 6, similarly to the data related to the frequency (step ST6).

Then, the address of the memory 6 is incremented by one to a station number "1" in order to store next tuning data, and the process advances to a next tuning operation (step ST7).

If both of the AFT signal S4 and the SYNC signal S2 are not supplied at the step ST3, on the other hand, a discrimination is made as to whether or not the current frequency reaches the upper limit of the tuning frequency, i.e., whether or not the tuning is ended (step ST8). The tuning is ended if the current frequency reaches the upper limit of the tuning frequency, otherwise the operation at the step ST2 is carried out again so that the operations through the steps ST2 to ST7 are repeated, and the tuning is ended when the frequency reaches the upper limit of the tuning frequency.

The tuning data obtained by the tuning is supplied to a system for channel selection from the address of the memory 6, so that a position number for channel selection is allotted thereto and the tuning mode is ended.

The automatic tuning apparatus A1 for a VTR according to the present invention comprises the text data decoder circuit 10 and the memory 6 of the system controller 7 stores the broadcasting station information along with data related to the frequency, whereby the broadcasting station can be discriminated through the teletext signal S5 serving as broadcasting station information during and after completion of the auto tuning operation.

While the broadcasting station information is extracted from the teletext signal S5 in the tuning control circuit 5 in the aforementioned automatic tuning apparatus A1, the broadcasting station information may be replaced by another information, or all of the teletext signal may be extracted and stored. For example, an error rate of text data may be calculated to discriminate the state of a received electric field.

While the data related to the frequency and the teletext signal are stored only in the auto tuning operation in the aforementioned automatic tuning apparatus A1, a teletext signal of a currently received video signal may be stored in the system controller 7 after completion of auto tuning, so that the same is compared with that in the auto tuning or the data is updated. Thus, it is possible to cope with such case that the received electric field or the broadcasting station is changed after the auto tuning.

While the aforementioned automatic tuning apparatus A1 determines presence/absence of the broadcasting station in the auto tuning operation by inputting both of the AFT signal S4 and the SYNC signal S2 in the system controller 7, the same may alternatively be determined only through presence/absence of the teletext signal S5, the AFT signal S4 or the SYNC signal S2, for example.

If any broadcasting station has no teletext signal S5, this fact can be stored in the system controller 7.

While the frequency is increased from the lower side to the higher side in the auto tuning operation of the aforementioned automatic tuning apparatus A1, the frequency may alternatively be reduced from the higher side to the lower side. When there are various frequency bands for VHF, UHF and the like, the tuning may be carried out from any frequency band or only in a specific frequency band. Further, the tuning direction may be varied with the frequency band.

The tuning control signal S3 which is outputted from the tuning control circuit 5 is a dc voltage, a PWM pulse, or serial data.

<Second Embodiment>

Figure 4:
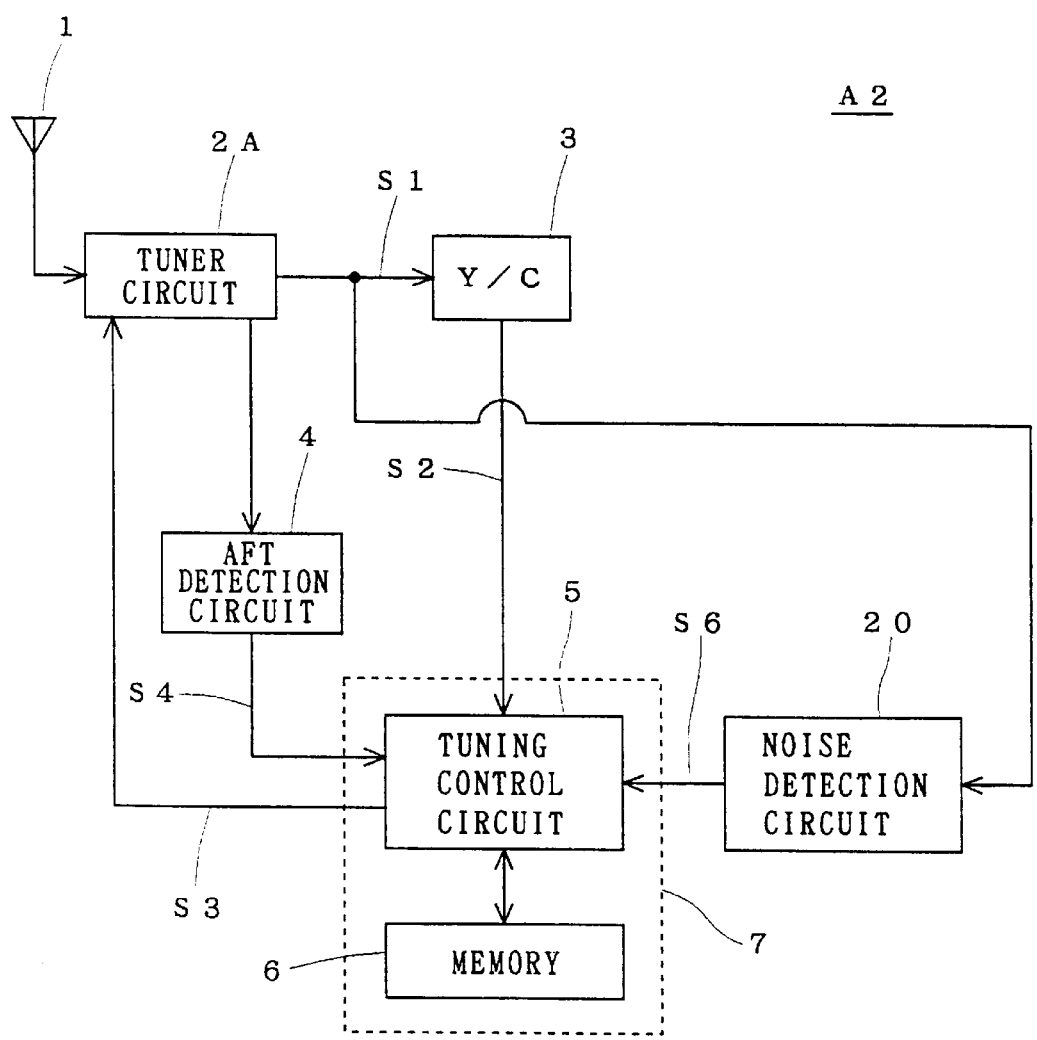
FIG. 4 illustrates the structure of an automatic tuning apparatus according to a second embodiment of the present invention.

FIG. 4 illustrates the structure of an automatic tuning apparatus A2 for a VTR according to a second embodiment of the present invention. Referring to FIG. 4, a noise detection circuit 20 for detecting the noise quantity of a received signal and outputting the same as noise data S6 is provided in place of the text data decoder circuit 10 of the automatic tuning apparatus A1 according to the first embodiment shown in FIG. 1. The structural parts of this embodiment which are identical to those of the automatic tuning apparatus A1 shown in FIG. 1 are denoted by the same reference numerals, to omit redundant description.

Figure 5:
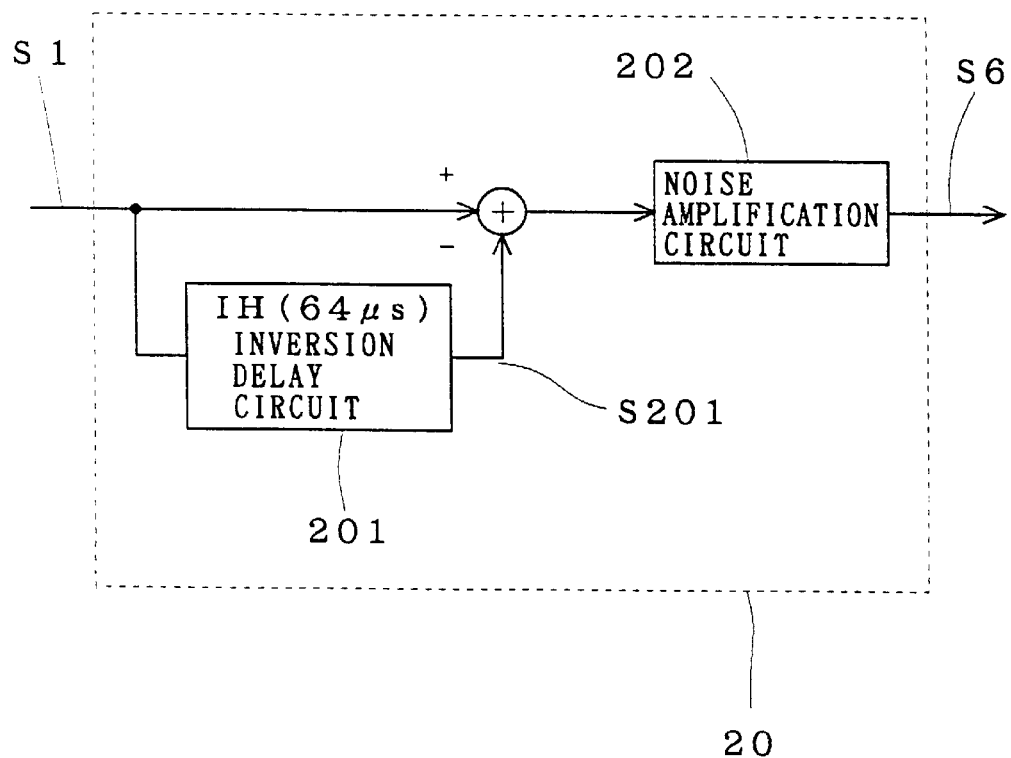
FIG. 5 illustrates a partial structure of the automatic tuning apparatus according to the second embodiment of the present invention.

With reference to FIG. 5, the structure of the noise detection circuit 20 is now described. Referring to FIG. 5, the noise detection circuit 20 is formed by an inversion delay circuit 201 for inverting and delaying a video signal S1, and a noise amplification circuit 202 receiving the video signal S1 and an inverted delay signal S201 of the video signal S1 and amplifying the noise. The inversion delay circuit 201 is provided in parallel with the line of the video signal, and inverts the same while supplying a delay (64 $\mu$s) for one horizontal scanning period (hereinafter abbreviated as 1H), and supplying the same to the video signal S1.

The video signal S1, which has correlation every 1H, itself disappears to leave only a random noise when the inverted delay signal S201 is supplied. This random noise is amplified by the noise amplification circuit 202, thereby obtaining noise data S6.

Figure 6:
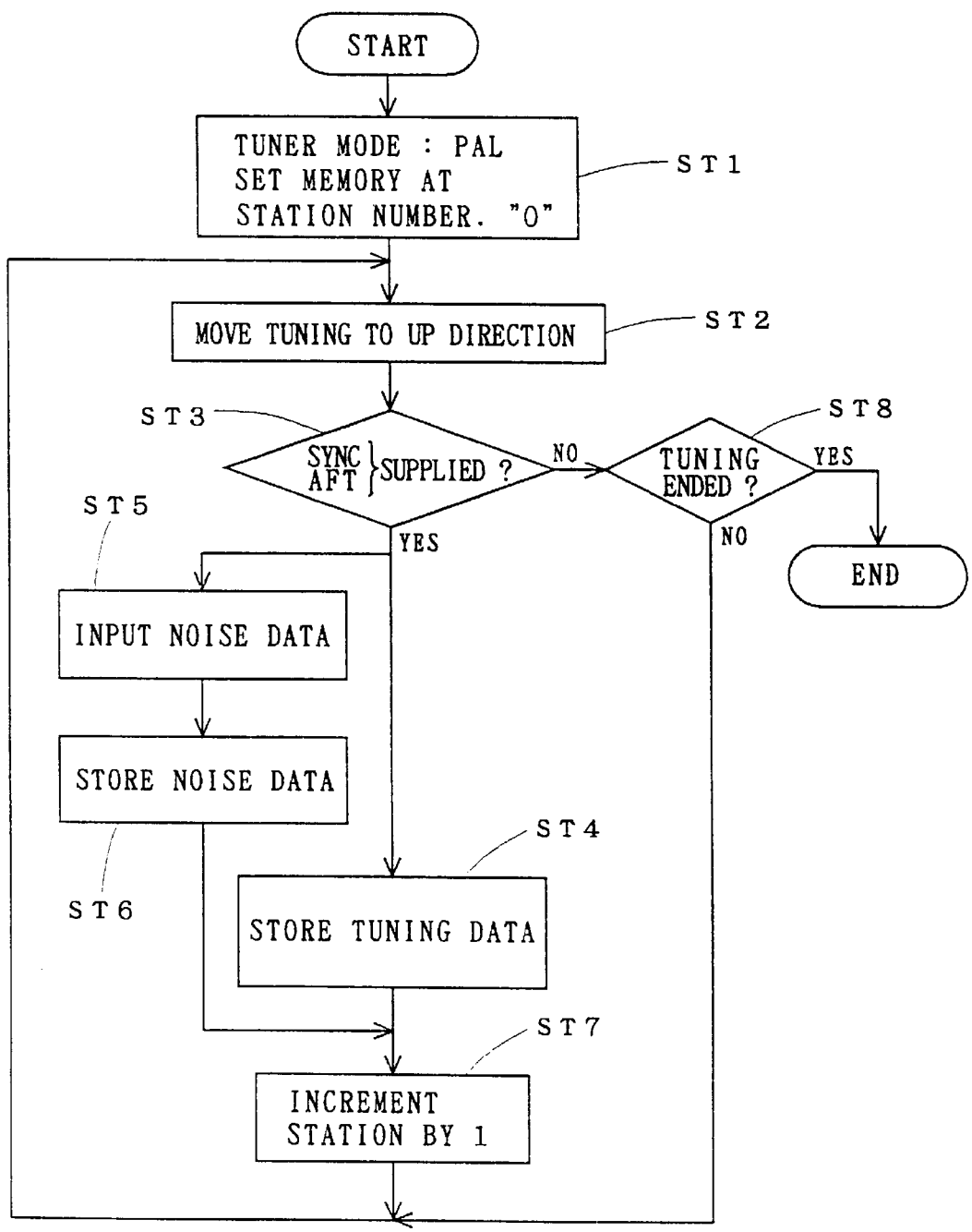
FIG. 6 is a flow chart for illustrating the operation of the automatic tuning apparatus according to the second embodiment of the present invention.

With reference to a flow chart shown in FIG. 6, the operation of the automatic tuning apparatus A2 is now described. When a command for auto tuning is received from the user, a system controller 7 sets the tuning mode of a tuner circuit 2A at the PAL system, and sets the memory address of a memory 6 at a station number "0" as initialization (step ST1).

Then, a tuning control signal S3 is transmitted to the tuner circuit 2A, to control the same in a direction for increasing the tuning frequency by a constant amount (step ST2).

In order to detect presence/absence of a broadcasting station transmitting a signal of the frequency at this time, an AFT signal S4 outputted from an AFT detection circuit 4 and a SYNC signal S2 indicating presence/absence of a signal separated by a video signal processing circuit 3 are inputted in a tuning control circuit 5, for making a discrimination (step ST3).

If both of the AFT signal S4 and the SYNC signal S2 are supplied at this point of time, the tuning control circuit 5 determines that the signal from the broadcasting station can be received, and stores the current tuning data (data related to the frequency) in the address of the station number "0" in the memory 6 (step ST4).

At the same time, the noise data S6 which is outputted from the noise detection circuit 20 is inputted in the tuning control circuit 5 (step ST5).

In the tuning control circuit 5, the noise data S6 is stored in the address of the station number "0" in the memory 6, similarly to the data related to the frequency (step ST6).

Then, the address of the memory 6 is incremented by one to a station number "1" in order to store next tuning data, and the process advances to a next tuning operation (step ST7).

If both of the AFT signal S4 and the SYNC signal S2 are not supplied at the step ST3, on the other hand, a discrimination is made as to whether or not the current frequency reaches the upper limit of the tuning frequency, i.e., whether or not the tuning is ended (step ST8). The tuning is ended if the current frequency reaches the upper limit of the tuning frequency, otherwise the operation at the step ST2 is carried out again so that the operations through the steps ST2 to ST7 are repeated, and the tuning is ended when the frequency reaches the upper limit of the tuning frequency.

The tuning data obtained by the tuning is supplied to a system for channel selection from the address of the memory 6, so that a position number for channel selection is allotted thereto and the tuning mode is ended.

The automatic tuning apparatus A2 for a VTR according to the present invention comprises the noise detection circuit 20 and the memory 6 of the system controller 7 also stores the noise data S6 as information of the receiving situation along with the data related to the frequency, whereby the receiving situation of the receiving station can be recognized during and after completion of the auto tuning operation, to allow comparison with other receiving stations and discrimination of the receiving electric field.

While the noise detection circuit 20 comprises the noise amplifier 202 for amplifying a general noise of an amplification direction for detecting the noise quantity with respect to the composite video signal S1 in the aforementioned automatic tuning apparatus A2, the noise amplifier 202 may be replaced by means for detecting the noise level of a sound signal, means for detecting the noise level of a video signal or a sound signal before demodulation, or means for detecting the level of RF-AGC (automatic gain control for making sensitivity of a tuner system constant) which is varied with the receiving electric field, or alternatively by means for detecting an edge of the SYNC signal S2 and calculating its S-N ratio or means for detecting only a vertical synchronizing signal and detecting its S-N ratio.

While the data related to the frequency and the noise data are stored only in an auto tuning operation in the aforementioned automatic tuning apparatus A2, noise data of a currently received video signal may be stored in the system controller 7 after completion of the auto tuning for carrying out comparison with the data in the auto tuning or updating the data. Thus, it is possible to cope with change of the receiving electric field or the broadcasting station caused after the auto tuning.

While the frequency is increased from the lower side to the higher side in the auto tuning operation of the aforementioned automatic tuning apparatus A2, the frequency may alternatively be reduced from the higher side to the lower side. When there are various frequency bands for VHF, UHF and the like, the tuning may be carried out from any frequency band or only in a specific frequency band. Further, the tuning direction may be varied with the frequency band.

The tuning control signal S3 which is outputted from the tuning control circuit 5 is a dc voltage, a PWM pulse, or serial data.

<Third Embodiment>

Figure 7:
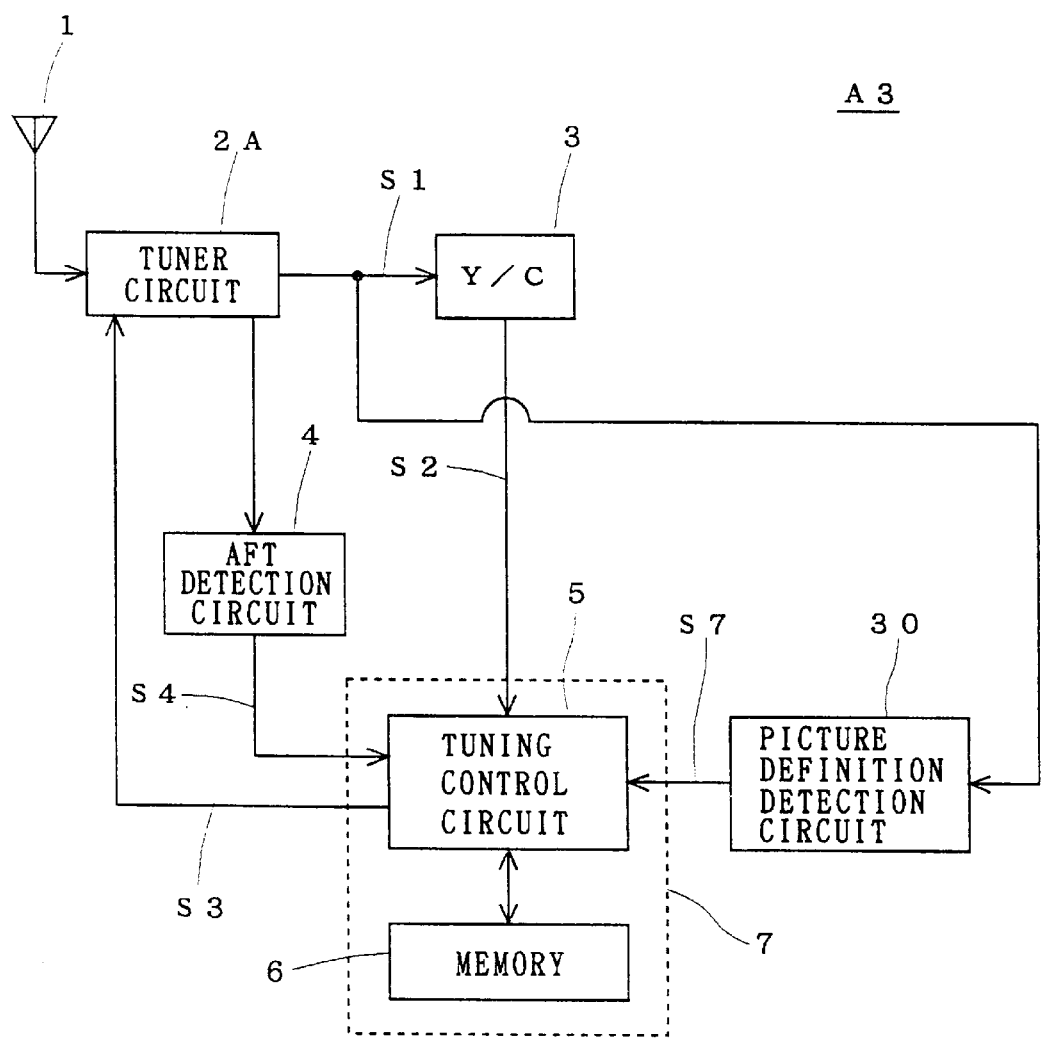
FIG. 7 illustrates the structure of an automatic tuning apparatus according to a third embodiment of the present invention.

FIG. 7 illustrates the structure of an automatic tuning apparatus A3 for a VTR according to a third embodiment of the present invention. Referring to FIG. 7, a picture definition detection circuit 30 is provided in place of the text data decoder circuit 10 of the automatic tuning apparatus A1 according to the first embodiment shown in FIG. 1. The structural parts of this embodiment which are identical to those of the automatic tuning apparatus A1 shown in FIG. 1 are denoted by the same reference numerals, to omit redundant description.

Figure 8:
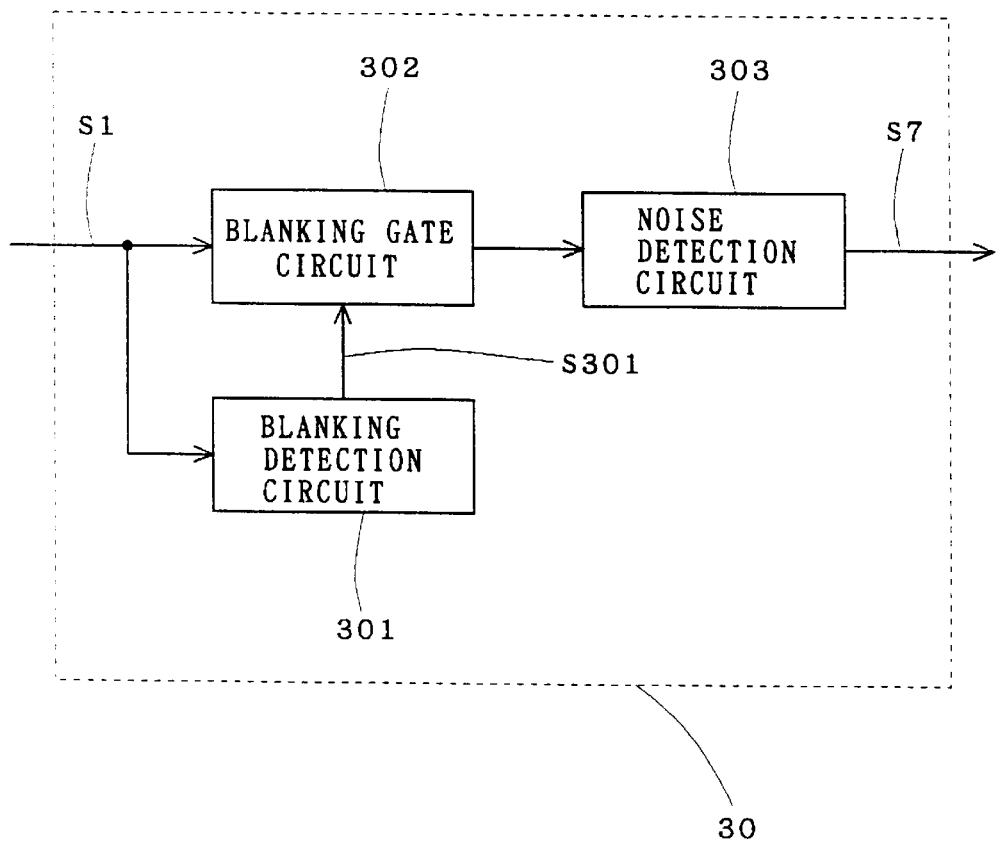
FIG. 8 illustrates a partial structure of the automatic tuning apparatus according to the third embodiment of the present invention.

The structure of the picture definition detection circuit 30 is now described. FIG. 8 is a block diagram showing the structure of the picture definition detection circuit 30. Referring to FIG. 8, numeral 301 denotes a blanking detection circuit for detecting a blanking part in a video signal S1, which is outputted from a tuner circuit 2A, having no actual signal, numeral 302 denotes a blanking gate circuit for passing the blanking part with respect to the video signal S1 in response to a blanking signal S301 which is detected by the blanking detection circuit 301, and numeral 303 denotes a noise detection circuit for detecting a noise component of only the blanking part. The noise detection circuit 303 outputs picture definition data S7 which is proportional to the noise quantity of the blanking part of the video signal S1 having no actual signal.

The operation is now described. First, the blanking detection circuit 301 detects the blanking part of the obtained video signal S1, and outputs the blanking signal S301 in correspondence to this part. Further, the blanking gate circuit 302 which opens/closes its gate in response to the blanking signal S301 for passing only the blanking part extracts only the blanking part from the video signal S1, so that the noise detection circuit 303 carries out noise detection of only the blanking part. Thus, picture definition data S7 of the received signal is formed by the noise detection output of only the blanking part of the video signal S1, whereby presence/absence of a jam signal etc. can also be detected in addition to simple noise detection, determination of ghost etc. is enabled, and definition of the received signal can be correctly discriminated.

Figure 9:
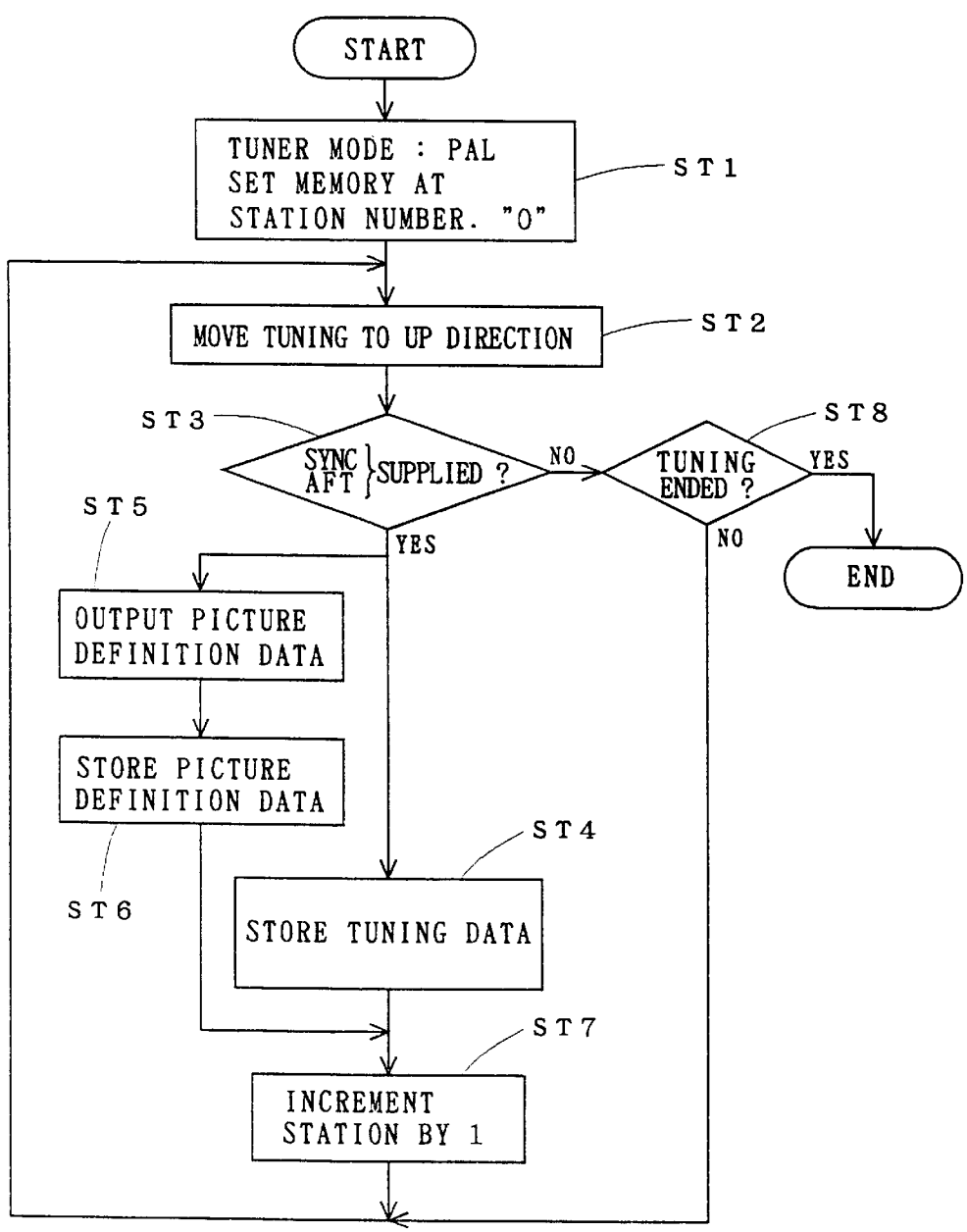
FIG. 9 is a flow chart for illustrating the operation of the automatic tuning apparatus according to the third embodiment of the present invention.

With reference to a flow chart shown in FIG. 9, the operation of the automatic tuning apparatus A3 is now described. When a command for auto tuning is received from the user, a system controller 7 sets the tuning mode of a tuner circuit 2A at the PAL system, and sets the memory address of a memory 6 at a station number "0" as initialization (step ST1).

Then, a tuning control signal S3 is transmitted to the tuner circuit 2A, to control the same in a direction for increasing the tuning frequency by a constant amount (step ST2). In order to detect presence/absence of a broadcasting station transmitting a signal of the frequency at this time, an AFT signal S4 which is outputted from an AFT detection circuit 4 and a SYNC signal S2 indicating presence/absence of a signal separated by a video signal processing circuit 3 are inputted in a tuning control circuit 5, for making a discrimination (step ST3).

If both of the AFT signal S4 and the SYNC signal S2 are supplied at this point of time, the tuning control circuit 5 determines that the signal from the broadcasting station can be received, and stores the current tuning data (data related to the frequency) in the address of the station number "0" in the memory 6 (step ST4).

At the same time, the picture definition detection circuit 30 detects the picture definition of the currently received composite video signal S1, outputs the same as picture definition data S7, and supplies the same to the tuning control circuit 5 (step ST5).

This picture definition data S7 is stored in the address of the station number "0" in the memory 6, similarly to the data related to the frequency (step ST6).

Then, the address of the memory 6 is incremented by one to a station number "1" in order to store next tuning data, and the process advances to a next tuning operation (step ST7).

If both of the AFT signal S4 and the SYNC signal S2 are not supplied at the step ST3, on the other hand, a discrimination is made as to whether or not the current frequency reaches the upper limit of the tuning frequency, i.e., whether or not the tuning is ended (step ST8). The tuning is ended if the current frequency reaches the upper limit of the tuning frequency, otherwise the operation at the step ST2 is carried out again.

The operations through the ST2 to ST7 are repeated, and the tuning is ended when the frequency reaches the upper limit of the tuning frequency. The tuning data obtained by the tuning is supplied to a system for channel selection from the address of the memory 6, so that a position number for channel selection is allotted thereto and the tuning mode is ended.

The automatic tuning apparatus A3 for a VTR according to the present invention comprises the picture definition detection circuit 30 and the memory 6 of the system controller 7 also stores the picture definition data S7 as information of the receiving situation along with the data related to the frequency, whereby the receiving situation of the receiving station can be recognized during and after completion of the auto tuning operation, to allow comparison with other receiving stations and the discrimination of the receiving electric field.

While the noise detection circuit 303 detects the noise component of only the blanking part of the video signal S1 in the picture definition detection circuit 30 in the aforementioned automatic tuning apparatus A3, means for detecting a video intermediate frequency signal (hereinafter referred to as a VIF signal) which is outputted from the tuner circuit, or means for making detection at the level of RF-AGC may alternatively be employed.

While the data related to the frequency and the picture definition data are stored only in the auto tuning operation in the aforementioned automatic tuning apparatus A3, picture definition data of a currently received video signal may be stored in the system controller 7 after completion of the auto tuning for carrying out comparison with the data in the auto tuning or updating the data. Thus, it is possible to cope with change of the receiving electric field or the broadcasting station caused after the auto tuning.

While the frequency is increased from the lower side to the higher side in the auto tuning operation of the aforementioned automatic tuning apparatus A3, the frequency may alternatively be reduced from the higher side to the lower side. When there are various frequency bands for VHF, UHF and the like, tuning may be carried out from any frequency band or only in a specific frequency band. Further, the tuning direction may be varied with the frequency band.

The tuning control signal S3 which is outputted from the tuning control circuit 5 is a dc voltage, a PWM pulse, or serial data.

\<Fourth Embodiment\>

Figure 10:
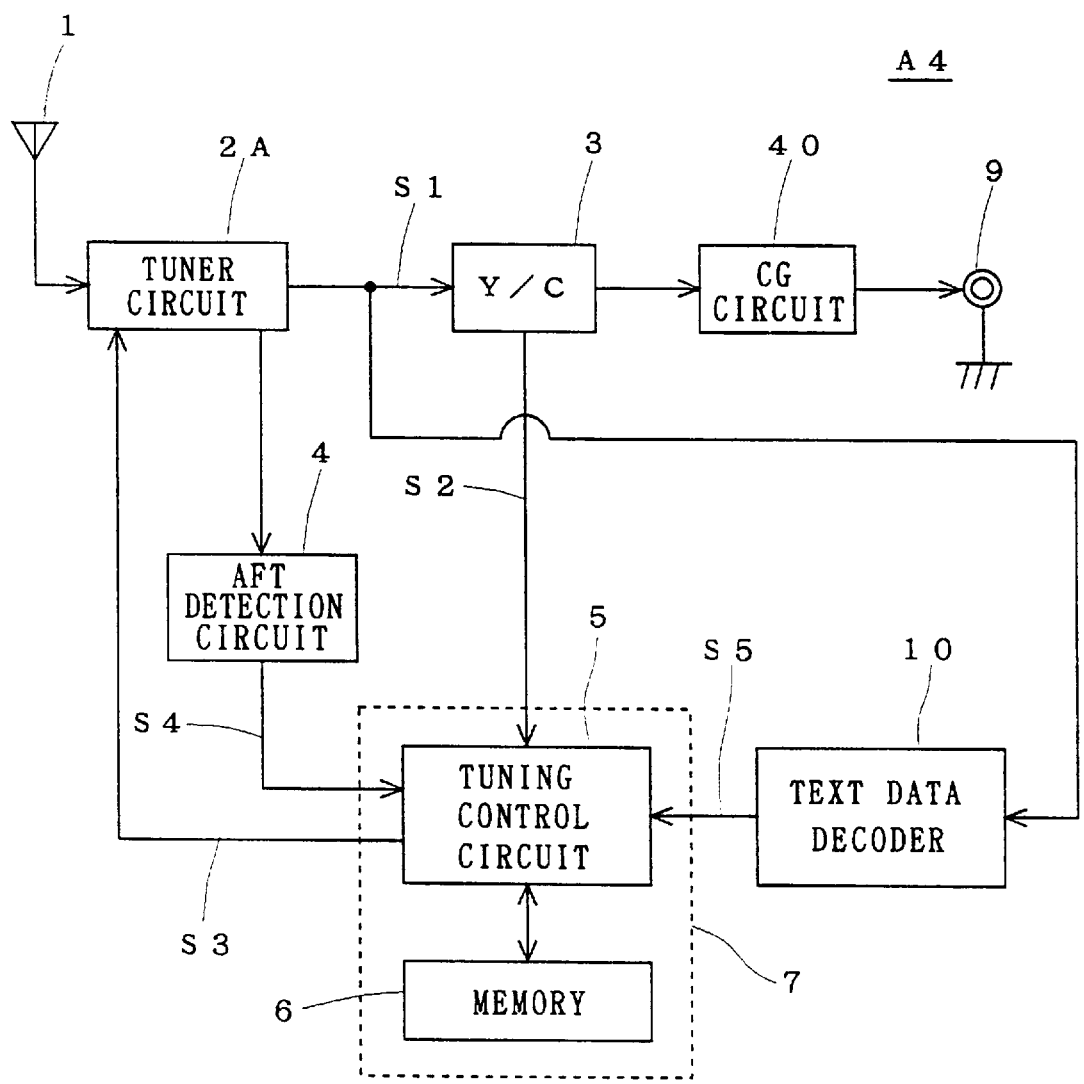
FIG. 10 illustrates the structure of an automatic tuning apparatus according to a fourth embodiment of the present invention.

FIG. 10 illustrates the structure of an automatic tuning apparatus A4 for a VTR according to a fourth embodiment of the present invention. Referring to FIG. 10, a character generator circuit (hereinafter referred to as a CG circuit) 40 for superposing data on a video signal S1 for displaying characters etc. on a screen is connected to a video signal processing circuit 3, so that an output of the CG circuit 40 is supplied to a video signal output terminal 9. The other structural parts of this embodiment are identical to those of the automatic tuning apparatus A1 shown in FIG. 1, and hence the same are denoted by the same reference numerals, to omit redundant description.

The operation of the automatic tuning apparatus A4 is now described. When a command for auto tuning is received from the user, a tuning operation similar to that of the automatic tuning apparatus A1 is carried out along the flow chart shown in FIG. 3, while a teletext signal S5 is extracted from a received broadcasting station signal through a text data decoder circuit 10, so that broadcasting station information is stored in a memory 6 of a system controller 7 with data related to the frequency.

When the broadcasting information is read from the memory 6 with the data related to the frequency again after completion of the auto tuning, the broadcasting information is superposed on a video signal through the CG circuit 40 and displayed on a receiver screen.

The CG circuit 40, which is formed by a ROM, stores characters, symbols etc. consisting of matrices of prescribed dots. This structure is generally well known in the art, and hence redundant description is omitted.

Figure 11:
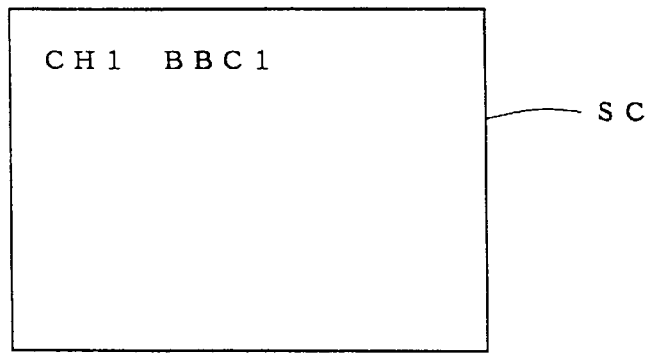
FIG. 11 illustrates an exemplary operation of the automatic tuning apparatus according to the fourth embodiment of the present invention.

FIG. 11 illustrates exemplary display of broadcasting information on a receiver screen SC. Referring to FIG. 11, the name of the currently received broadcasting station is displayed as "BBC1" on the receiver screen SC. Thus, the user can recognize the received broadcasting station information.

While the broadcasting station information is outputted on the receiver screen after completion of the auto tuning according to this embodiment, the same may alternatively be displayed in the auto tuning. Further, the same may not be outputted on the receiver screen, but a fluorescent display tube, a light emitting diode or a liquid crystal display may be provided on a portion out of the receiver screen, to display the broadcasting station information.

While the screen display content is the broadcasting station information in the automatic tuning apparatus A4 shown in FIG. 10 since the teletext signal S5 is extracted from the broadcasting station signal through the text data decoder circuit 10, the noise detection circuit 20 for detecting the noise quantity of the received signal described with reference to the second embodiment, for example, may be provided in place of the text data decoder circuit 10 so that noise data S6 outputted therefrom is stored in the memory 6 along with the data related to the frequency, and noise data 106 can be read from the memory 6 at need to be displayed on the receiver screen.

Figure 12:
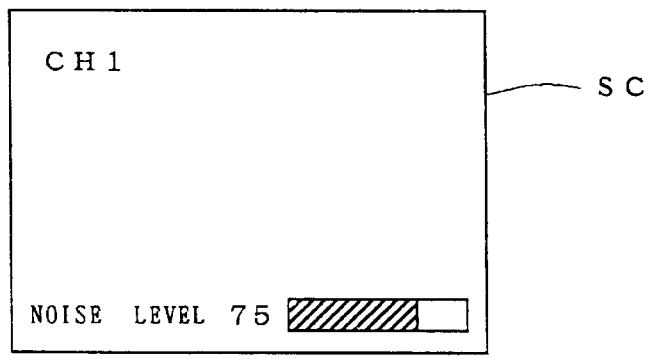
FIG. 12 illustrates an exemplary operation of a modification of the automatic tuning apparatus according to the fourth embodiment of the present invention.

FIG. 12 shows exemplary display of noise data on a receiver screen SC. Referring to FIG. 12, the noise level of the received signal is shown on the receiver screen SC with a numerical value and a graph. Thus, the user can recognize the noise level of the received signal.

The picture definition detection circuit 30 for detecting the noise quantity of the received signal described with reference to the third embodiment, for example, may be provided in place of the text data decoder circuit 10 so that picture definition data S7 outputted therefrom is stored in the memory 6 along with the data related to the frequency, and the picture definition data S7 can be read from the memory 6 at need to be displayed on the receiver screen.

Figure 13:
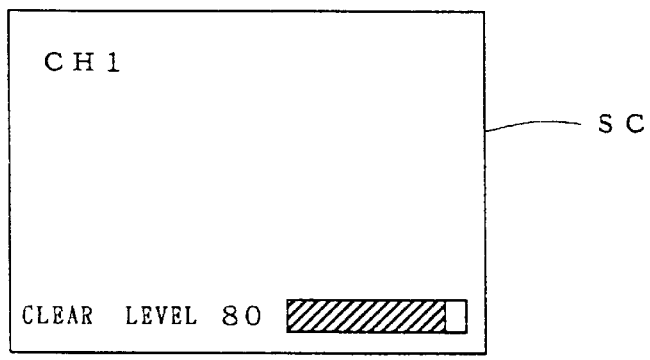
FIG. 13 illustrates an exemplary operation of a modification of the automatic tuning apparatus according to the fourth embodiment of the present invention.

FIG. 13 shows exemplary display of noise data on a receiver screen SC. Referring to FIG. 13, the picture definition of a received signal is shown on the receiver screen SC with a numerical value and a graph. Thus, the user can recognize the picture definition (clear level) of the video signal, to recognize the optimum direction of an indoor/outdoor antenna with reference to the screen display of the picture definition data, for example.

\<Fifth Embodiment\>

Figure 14:
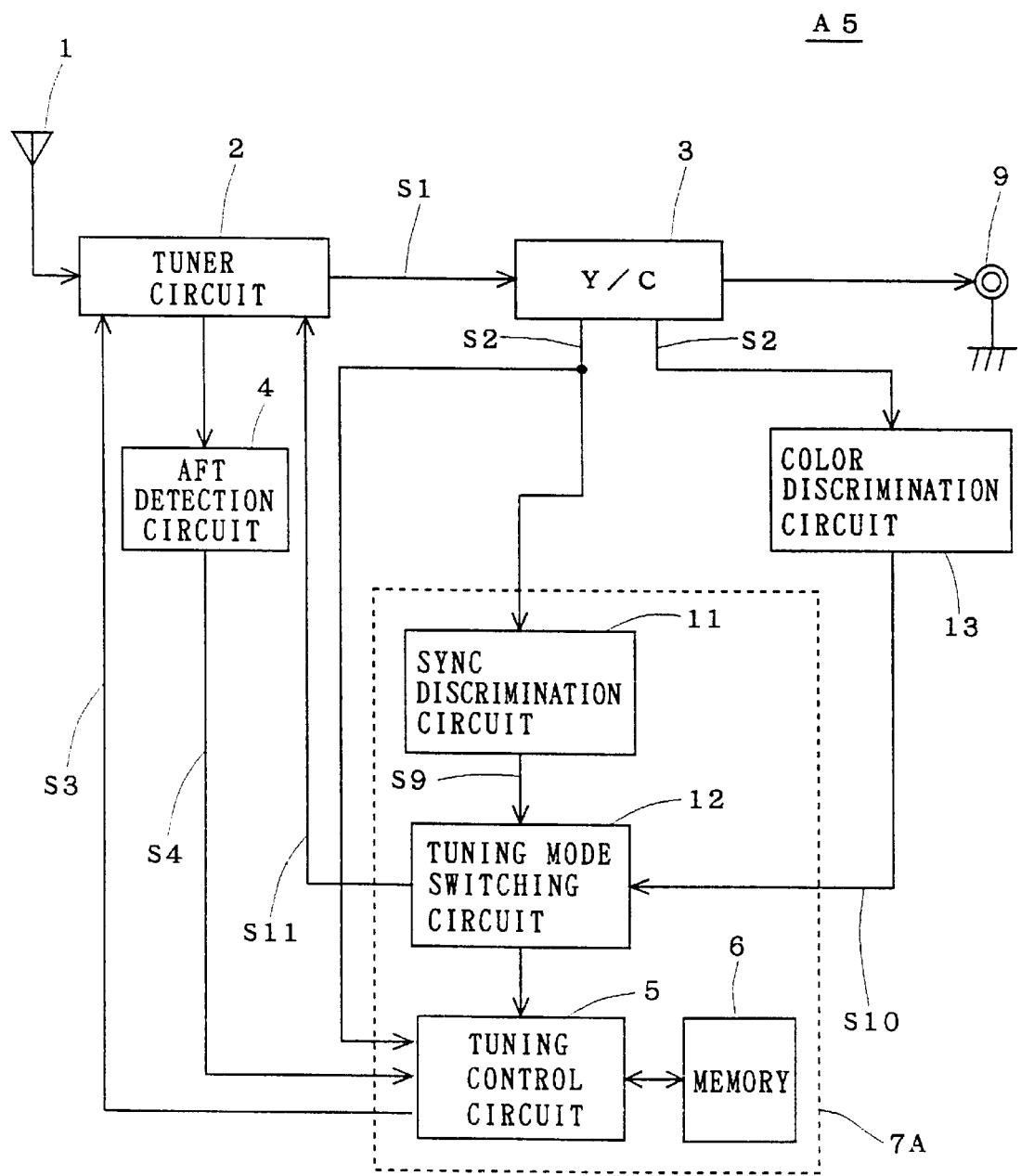
FIG. 14 illustrates the structure of an automatic tuning apparatus according to a fifth embodiment of the present invention.

FIG. 14 illustrates the structure of an automatic tuning apparatus A5 for a VTR according to a fifth embodiment of the present invention. Referring to FIG. 14, numeral 2 denotes a tuner circuit which is connected to an antenna 1 for allowing switching in correspondence to an input signal system by an external control signal, numeral 3 denotes a video signal processing circuit including a SYNC separation circuit which receives a composite video signal S1 from the tuner circuit 2 for carrying out signal processing, numeral 4 denotes an AFT detection circuit which receives a signal from the tuner circuit 2 for detecting presence/absence of a broadcasting station, numeral 5 denotes a tuning control circuit which controls a tuning operation of the tuner circuit 2, numeral 6 denotes a memory which is connected to the tuning control circuit, numeral 11 denotes a SYNC discrimination circuit which receives a SYNC signal S2 outputted from the video signal processing circuit 3 for discriminating whether the video signal system is the NTSC system or another system through the number of the SYNC signal, and numeral 12 denotes a tuning mode switching circuit which receives a mode switching circuit first control signal S9 outputted from the SYNC discrimination circuit 11 and outputs a mode switching signal S11 to the tuner circuit 2 for switching the tuning mode. A system controller 7A is formed by the tuning control circuit 5, the memory 6, the SYNC discrimination circuit 11 and the tuning mode switching circuit 12. Further, a color discrimination circuit 13 is provided for receiving a color burst signal (identic signal) S8, which is one of outputs of the video signal processing circuit 3, discriminating whether the video signal system is the PAL system or the SECAM system, and supplying the result to the tuning mode switching circuit 12 as a mode switching circuit second control signal S10.

The SYNC discrimination circuit 11 has a structure of counting the number (pulse number) of SYNC per second by a microcomputer or the like, and makes a discrimination on the NTSC system when 60 SYNCs are counted in one second (60 Hz), or the SECAM system or the PAL system when 50 SYNCs are counted in one second.

Figure 15:
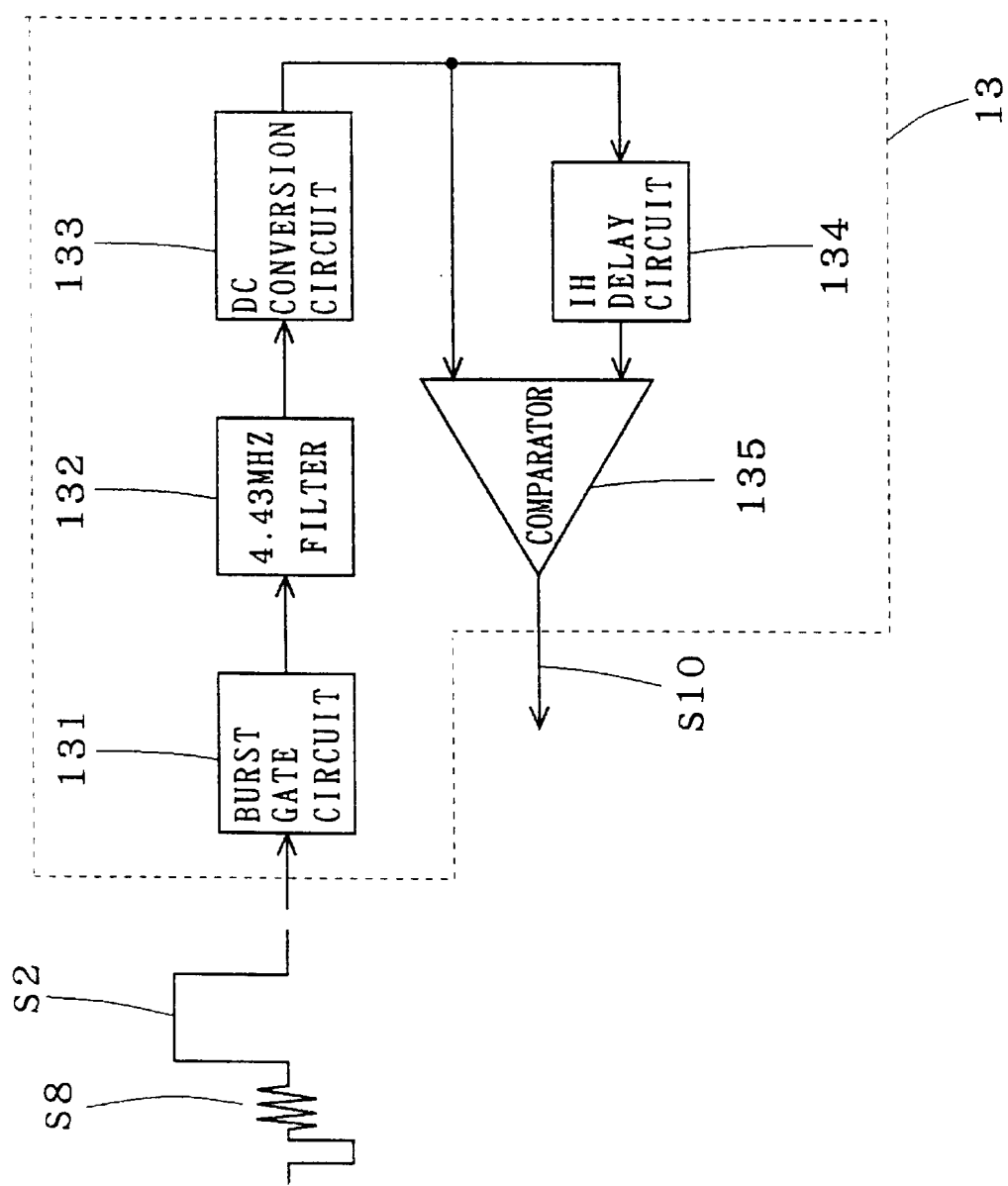
FIG. 15 illustrates a partial structure of the automatic tuning apparatus according to the fifth embodiment of the present invention.

The color discrimination circuit 13 is now described. FIG. 15 is a block diagram showing the structure of the color discrimination circuit 13. Referring to FIG. 15, the color discrimination circuit 13 comprises a burst gate circuit 131 which passes the color bust signal S8 every 1H, a frequency filter 132 which is connected to the burst gate circuit 131 for extracting only a color burst signal (identic signal) S8 having a frequency of 4.43 MHz, a DC conversion circuit 133 which DC-converts the signal passed through the frequency filter 132, and a comparator 135 which compares a DC signal outputted from the DC conversion circuit 133 with another DC signal obtained by delaying the output of the DC conversion circuit 133 by 1H through a delay circuit 134.

The operation is now described. The color burst signal (identic signal in the SECAM system) S8 is present behind the SYNC signal S2 in general in either one of the SECAM system and the PAL system as shown in FIG. 15 and its frequency is entirely 4.43 MHz in the case of the PAL system, while signals of 4.25 MHz and 4.41 MHz alternately appear every 1H in the case of the SECAM system. Therefore, the burst gate circuit 131 and the frequency filter 132 are employed to extract the frequency of the color bust signal S8 per 1H by the filter, convert the same to a DC value by the DC conversion circuit 132 and compare the DC level per 1H by the comparator 135, thereby making a discrimination on the PAL system if the DC level per 1H is identical or on the SECAM system if the DC level per 1H is different.

Figure 16:
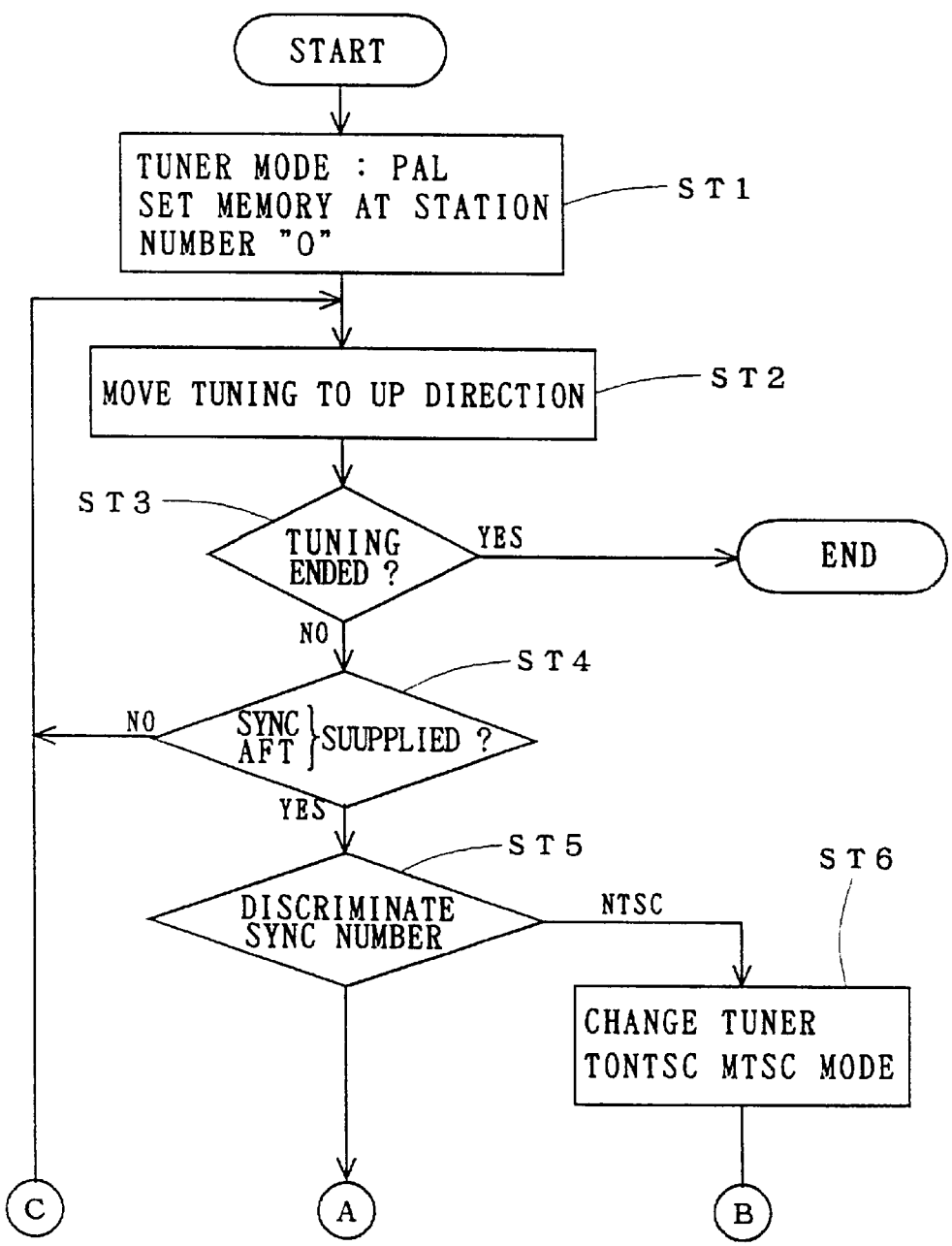
FIG. 16 is a flow chart for illustrating the operation of the automatic tuning apparatus according to the fifth embodiment of the present invention.
Figure 17:
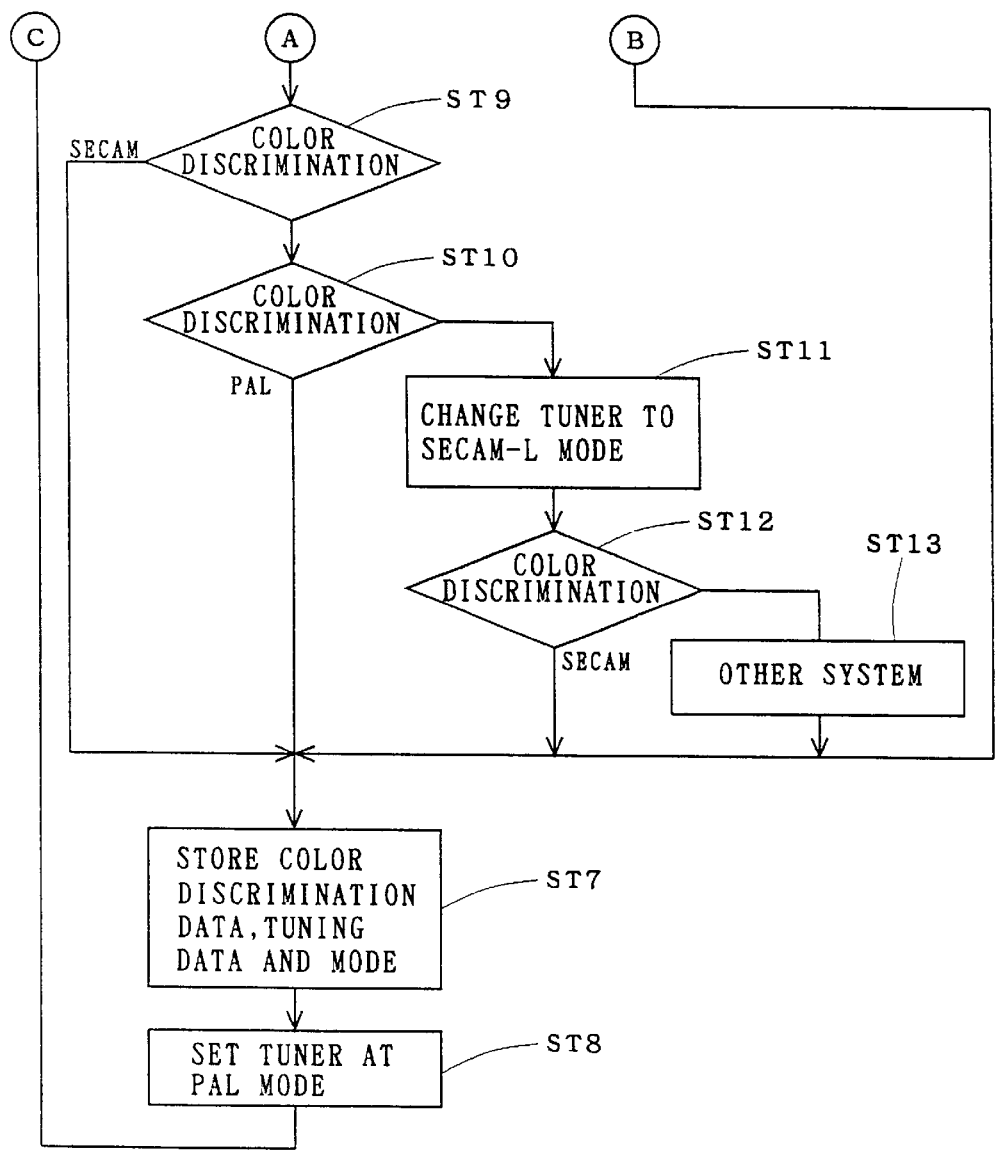
FIG. 17 is a flow chart for illustrating the operation of the automatic tuning apparatus according to the fifth embodiment of the present invention.

With reference to flow charts shown in FIGS. 16 and 17, the operation of the automatic tuning apparatus A5 is now described. When a command for auto tuning is received from the user, a system controller 7 sets the tuning mode of the tuner circuit 2 at a PAL system, and sets the memory address of a memory 6 at a station number "0" as initialization (step ST1).

Then, a tuning control signal S3 is transmitted to the tuner circuit 2, to control the same in a direction for increasing the tuning frequency by a constant amount (step ST2).

At this time, a discrimination is made as to whether or not the current frequency reaches the upper limit of the tuning frequency, i.e., whether or not the tuning is ended (step ST3), so that the tuning is ended if the current frequency reaches the upper limit of the tuning frequency, otherwise an AFT signal S4 which is outputted from an AFT detection circuit 4 and a SYNC signal S2 indicating presence/absence of a signal separated by a video signal processing circuit 3 are inputted in the tuning control circuit 5, in order to detect presence/absence of a broadcasting station transmitting a signal of the frequency (step ST4).

If both of the AFT signal S4 and the SYNC signal S2 are supplied at this time, the tuning control circuit 5 determines that the signal from the broadcasting station can be received and executes a next step S5. If both of the AFT signal S4 and the SYNC signal S2 are not supplied, on the other hand, the tuning frequency is increased by a constant amount at the step ST2.

At a step ST5, the SYNC signal S2 from the video signal processing circuit 3 is transmitted to the SYNC discrimination circuit 11 in the system controller 7A, so that the SYNC discrimination circuit 11 outputs the mode switching circuit first control signal S9 and supplies the same to the tuning mode switching circuit 12 when the SYNC signal S2 is supplied at 60 Hz, to change the tuner circuit 2 to the NTSC mode by the mode switching signal S11 (step ST6). If the SYNC signal is supplied at 50 Hz, on the other hand, it is discriminated as being other than the NTSC system.

When the tuner circuit 2 is set at the NTSC mode, the current tuning data (data related to the frequency) is stored in the address of the station number "0" of the memory 6 while information that the current video signal system is the NTSC system is also stored, and the address of the memory 6 is incremented by one to a station number "1" in order to store next tuning data (step ST7).

Then, the tuning mode of the tuner circuit 2 is set at the PAL mode at a step ST8, the tuning frequency is increased by a constant amount at the step ST2 to enter a next tuning operation, the operations through the steps ST2 to ST8 are repeated, and the tuning is ended upon reaching the upper limit of the tuning frequency. The tuning data obtained by the tuning is supplied to a system for channel selection from the address of the memory 6, so that a position number for channel selection is allotted thereto and the tuning mode is ended.

When a discrimination is made on a system other than the NTSC system at the step ST5, the color discrimination circuit 13 receiving the color burst signal S8 from the video signal processing circuit 3 makes a color discrimination, to discriminate the system to the SECAM system and another system (step ST9). In the case of the SECAM-L system, the video signal S1 is hunting since the same is tuned in the PAL mode and frequency change of the color burst signal S8 cannot be correctly discriminated, and hence a system other than the SECAM system is assumed.

When a discrimination on the SECAM system is made at the step ST9, the current tuning data (data related to the frequency) is stored in the address of the station number "0" of the memory 6 in a state maintaining the tuning mode at the PAL mode, while information that the current video signal system is the SECAM system is also stored, and the address of the memory 6 is incremented by one to a station number "1", for storing next tuning data (step ST7). In the case of the SECAM system, tuning is possible in the PAL mode.

The tuning mode of the tuner circuit 2, which is the PAL mode, may not be re-set at the step ST8, and the tuning frequency is then increased at the step ST2 by a constant amount to enter a next tuning operation, so that the operations through the steps ST2 to ST5, ST9 and ST7 are repeated and the tuning is ended upon reaching the upper limit of the tuning frequency.

When a determination on a system other than the SECAM system is made at the step ST9, on the other hand, the color discrimination circuit 13 receiving the color burst signal S8 from the video signal processing circuit 3 again makes a color discrimination, to discriminate the system to the SECAM system and other system (step ST10). The discrimination at the step ST10 is made on the assumption of the PAL system when the color burs signal S8 is 4.43 MHz, otherwise on a system other than the PAL system.

When a discrimination on the PAL system is made at the step ST10, the tuner circuit 2 stores the current tuning data (data related to the frequency) in the address of the station number "0" of the memory 6 while also storing information that the current video signal system is the PAL system in a state maintaining the PAL mode, and increments the address of the memory 6 by one to a station number "1" for storing next tuning data (step ST7).

The tuning mode of the tuner circuit 2, which is the PAL mode, may not be re-set at the step ST8, and the tuning frequency is then increased at the step ST2 by a constant amount to enter a next tuning operation, so that the operations through the steps ST2 to ST5, ST9 and ST7 are repeated and the tuning is ended upon reaching the upper limit of the tuning frequency.

When the discrimination at the step ST10 is on a system other than the PAL system, on the other hand, the color discrimination circuit 13 outputs the mode switching circuit second control signal S10 and supplies the same to the tuning mode switching circuit 12, to change the tuner circuit 2 to the SECAM-L mode by the mode switching signal S11 (step ST11).

Then, the color discrimination circuit 13 receiving the color burst signal S8 from the video signal processing circuit 3 makes a color discrimination at a step ST12, to again discriminate the system to the SECAM system and other mode.

When a discrimination on the SECAM system is made at the step ST12, the current tuning data (data related to the frequency) is stored in the address of the station number "0" of the memory 6 in a state maintaining the tuning mode in the SECAM-L mode, while information that the current video signal system is the SECAM system is also stored, and the address of the memory 6 is incremented by one to a station number "1", for storing next tuning data (step ST7).

Then, the tuning mode of the tuner circuit 2 is set at the PAL mode at a step ST8, the tuning frequency is increased by a constant amount at the step ST2 to enter a next tuning operation, the operations through the steps ST2 to ST5, ST9, ST10, ST11, ST12, ST8 and ST8 are repeated, and the tuning is ended upon reaching the upper limit of the tuning frequency. The tuning data obtained by the tuning is supplied to a system for channel selection from the address of the memory 6, so that a position number for channel selection is allotted thereto and the tuning mode is ended.

When the discrimination at the step ST12 is on a system other than the SECAM system, on the other hand, the tuning mode is maintained at the SECAM-L mode (step ST13), so that the current tuning data (data related to the frequency) is stored in the address of the station number "0" of the memory 6 and information that the current video signal system is an undiscriminable other system is also stored, and the address of the memory 6 is incremented by one to the station number "1", for storing next tuning data (step ST7).

Then, the tuning mode of the tuner circuit 2 is set at the PAL mode at the step ST8, the tuning frequency is increased by a constant amount at the step ST2 to enter a next tuning operation, the operations through the steps ST2 to ST5, ST9, ST10, ST11, ST12, ST7 and ST8 are repeated, and the tuning is ended upon reaching the upper limit of the tuning frequency. The tuning data obtained by the tuning is supplied to the system for channel selection from the address of the memory 6, so that a position number for channel selection is allotted thereto and the tuning mode is ended.

The operation following the step ST12 is a system for not stopping the tuning operation also when an undiscriminable signal such as a ghost signal is received, and the user can arbitrarily designate the video signal system after the tuning by storing the undiscriminable signal. This is also effective in the case where the signal field is so weak that the color discrimination circuit 13 cannot discriminate the video signal system.

As hereinabove described, the automatic tuning apparatus A5 shown in FIG. 14 comprises the SYNC discrimination circuit 11 and the color discrimination circuit 13 to discriminate to which one of the PAL system, the SECAM system, the SECAM-L system and the NTSC system the receiving signal belongs so that the tuning mode of the tuner circuit 2 can be automatically switched, whereby the user may not carry out a switching operation in response to the video signal system by himself.

Further, it is possible to obtain an automatic tuning apparatus whose tuning operation is not stopped also when an undiscriminable signal such as a ghost signal is received or the signal field is so weak that the color discrimination circuit 13 cannot discriminate the video signal system.

The data of the video signal system stored in the memory 6 may be read from the memory 6 at need during and after completion of the auto tuning to be used for switching of a chromatic circuit or a tuner circuit or sorting of channel positions, for example.

While the frequency is increased from the lower side to the higher side in the auto tuning operation of the aforementioned automatic tuning apparatus A5, the frequency may alternatively be reduced from the higher side to the lower side. When there are various frequency bands for VHF, UHF and the like, tuning may be carried out from any frequency band or only in a specific frequency band. Further, the tuning direction may be varied with the frequency band.

<Sixth Embodiment>

Figure 18:
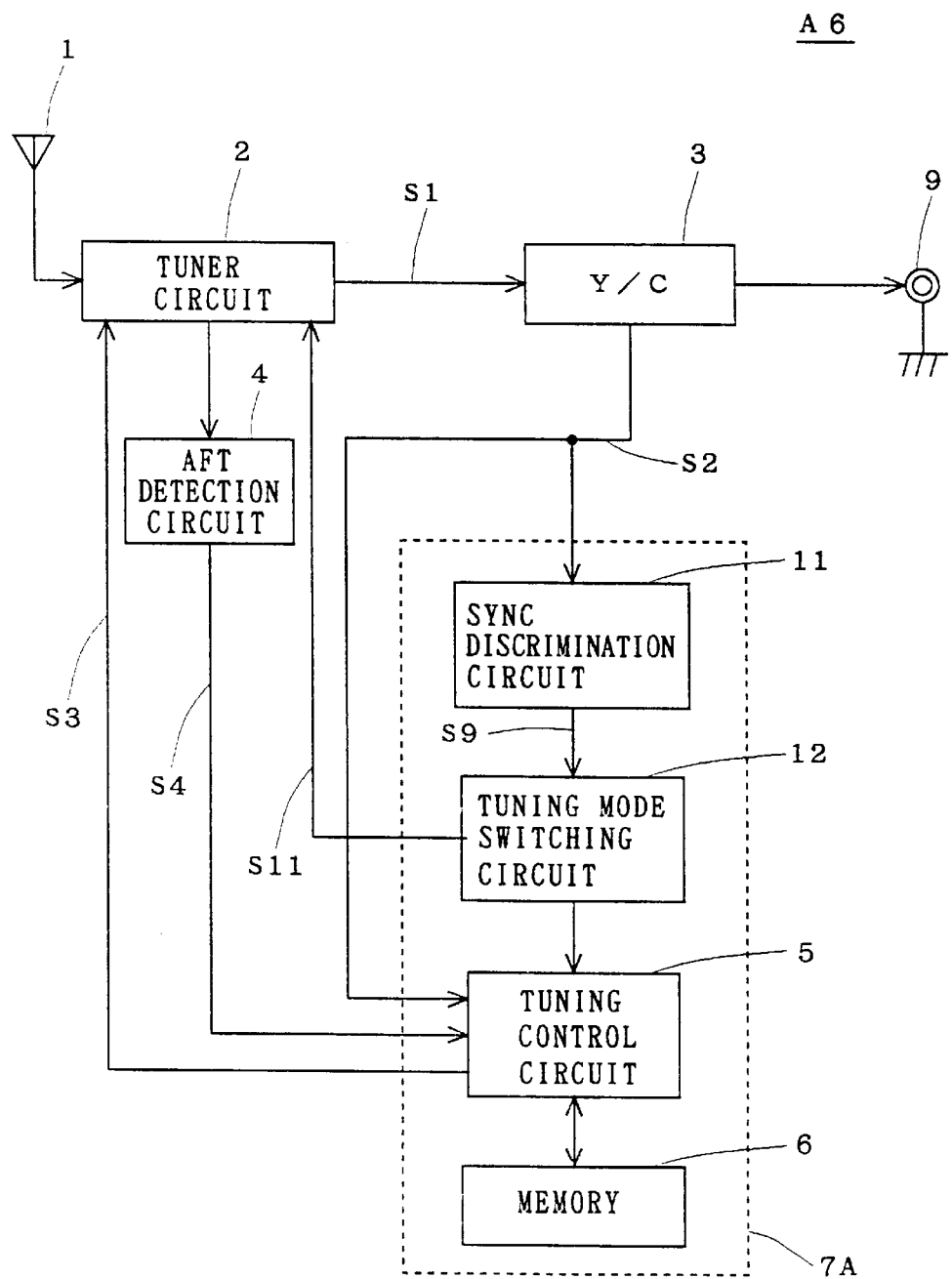
FIG. 18 illustrates the structure of an automatic tuning apparatus according to a sixth embodiment of the present invention.

FIG. 18 illustrates the structure of an automatic tuning apparatus A6 for a VTR according to a sixth embodiment of the present invention. Referring to FIG. 18, structural parts which are identical to those of the automatic tuning apparatus A5 described with reference to FIG. 14 are denoted by the same reference numerals, to omit redundant description.

As understood from FIG. 18, the automatic tuning apparatus A6 has such a structure that the color discrimination circuit 13 is removed from the automatic tuning apparatus A5. Thus, the automatic tuning apparatus A6 is an apparatus having a function of discriminating whether the video signal system of a received signal is the PAL system or the NTSC system.

Figure 19:
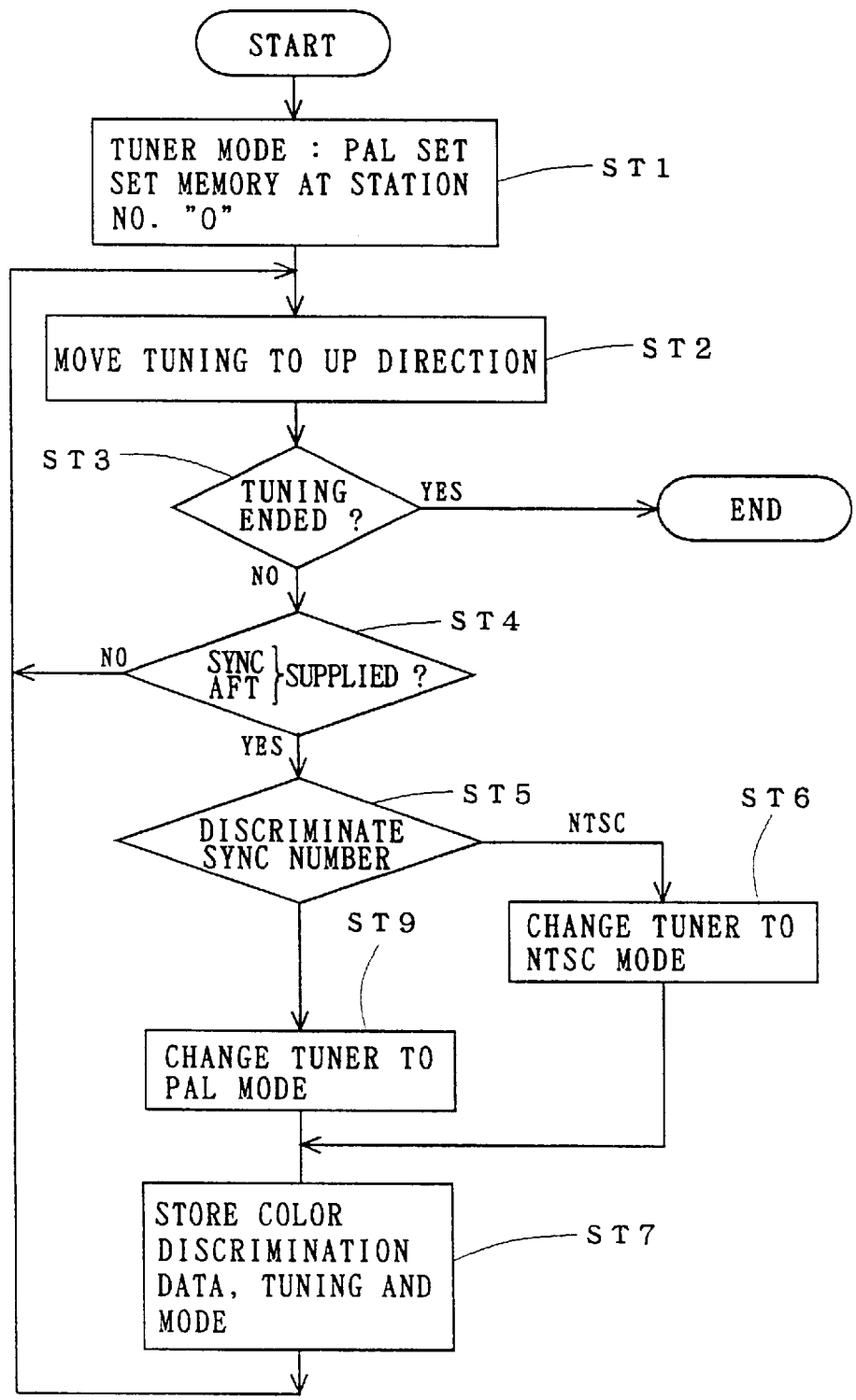
FIG. 19 is a flow chart for illustrating the operation of the automatic tuning apparatus according to the sixth embodiment of the present invention.

With reference to a flow chart shown in FIG. 19, the operation of the automatic tuning apparatus A6 is now described. When a command for auto tuning is received from the user, a system controller 7A sets the tuning mode of a tuner circuit 2 at the PAL system, and sets the memory address of a memory 6 at a station number "0" as initialization (step ST1).

Then, a tuning control signal S3 is transmitted to the tuner circuit 2, to control the same in a direction for increasing the tuning frequency by a constant amount (step ST2).

At this time, a discrimination is made as to whether or not the current frequency reaches the upper limit of the tuning frequency, i.e., whether or not the tuning is ended (step ST3), so that the tuning is ended if the current frequency reaches the upper limit of the tuning frequency, otherwise an AFT signal S4 which is outputted from an AFT detection circuit 4 and a SYNC signal S2 indicating presence/absence of a signal separated by a video signal processing circuit 3 are inputted in the tuning control circuit 5, in order to detect presence/absence of a broadcasting station transmitting the signal of the frequency (step ST4).

If both of the AFT signal S4 and the SYNC signal S2 are supplied at this time, the tuning control circuit 5 determines that the signal from the broadcasting station can be received and executes a next step S5. If both of the AFT signal S4 and the SYNC signal S2 are not supplied, on the other hand, the tuning frequency is increased by a constant amount at the step ST2.

At a step ST5, the SYNC signal S2 from the video signal processing circuit 3 is transmitted to a SYNC discrimination circuit 11 in the system controller 7A, so that the SYNC discrimination circuit 11 outputs a mode switching circuit first control signal S9 and supplies the same to a tuning mode switching circuit 12 when the SYNC signal S2 is supplied at 60 Hz, to change the tuner circuit 2 to the NTSC mode by a mode switching signal S11 (step ST6). If the SYNC signal is supplied at 50 Hz, on the other hand, a discrimination is made on a system other than the NTSC system.

When the tuner circuit 2 is set at the NTSC mode, current tuning data (data related to the frequency) is stored in the address of the station number "0" of the memory 6 while information that the current video signal system is the NTSC system is also stored, and the address of the memory 6 is incremented by one to a station number "1" in order to store next tuning data (step ST7).

Then, the tuning frequency is increased by a constant amount at the step ST2 to enter a next tuning operation, the operations through the steps ST2 to ST7 are repeated, and the tuning is ended upon reaching the upper limit of the tuning frequency. The tuning data obtained by the tuning is supplied to a system for channel selection from the address of the memory 6, so that a position number for channel selection is allotted thereto and the tuning mode is ended.

When a discrimination on a system other than the NTSC system is made at the step ST5, the mode switching circuit first control signal S9 is outputted and supplied to the tuning mode switching circuit 12, to change the tuner circuit 2 to the PAL mode by the mode switching signal S11 (step ST6). Since the tuning mode of the tuner circuit 2 is set at the PAL mode as initialization, this step ST6 is unnecessary if the tuning mode is not changed to the NTSC mode.

When the tuner circuit 2 is set at the PAL mode, the current tuning data (data related to the frequency) is stored in the address of the station number "0" of the memory 6 while information that the current video signal system is the PAL system is also stored, and the address of the memory 6 is incremented by one to a station number "1" in order to store next tuning data (step ST7).

Then, the tuning frequency is increased by a constant amount at the step ST2 to enter a next tuning operation, the operations through the steps ST2 to ST7 are repeated, and the tuning is ended upon reaching the upper limit of the tuning frequency. The tuning data obtained by the tuning is supplied to the system for channel selection from the address of the memory 6, so that a position number for channel selection is allotted thereto and the tuning mode is ended.

As hereinabove described, the automatic tuning apparatus A6 shown in FIG. 18 comprises the SYNC discrimination circuit 11 to discriminate whether the video signal system of the received signal is the PAL system or the NTSC system so that the tuning mode of the tuner circuit 2 can be automatically switched, whereby the user may not carry out a switching operation in response to the video signal system by himself.

The remaining functions are similar to those of the automatic tuning apparatus A5, and hence redundant description is omitted.

<Seventh Embodiment>

Figure 20:
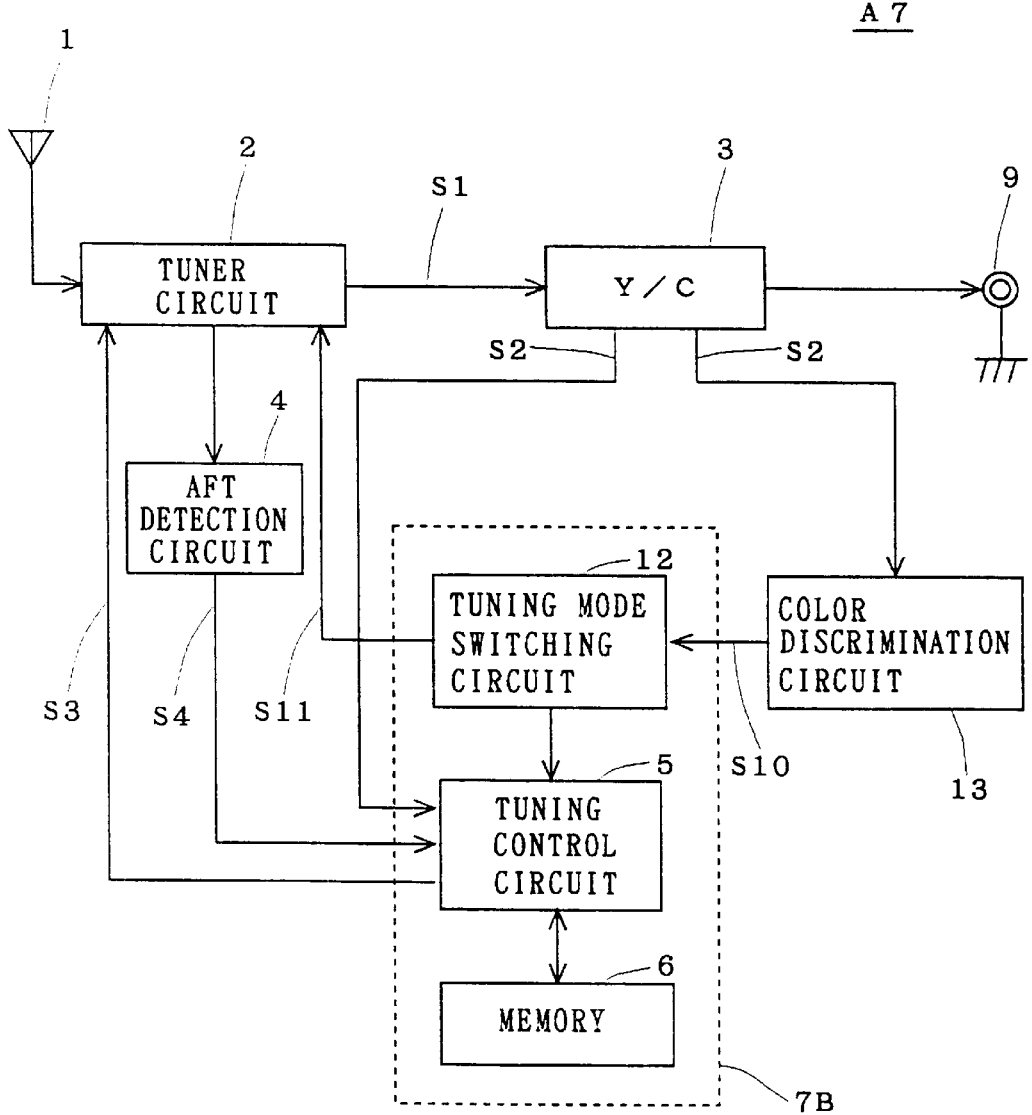
FIG. 20 illustrates the structure of an automatic tuning apparatus according to a seventh embodiment of the present invention.

FIG. 20 illustrates the structure of an automatic tuning apparatus A7 for a VTR according to a seventh embodiment of the present invention. Referring to FIG. 20, a system controller 7B comprising a tuning control circuit 5, a memory circuit 6 and a tuning mode switching circuit 12 is provided in place of the system controller 7A of the automatic tuning apparatus A5 described with reference to FIG. 14. The remaining structural parts which are identical to those of the automatic tuning apparatus A5 are denoted by the same reference numerals, to omit redundant description.

As understood from FIG. 20, the automatic tuning apparatus A7 has such a structure that the SYNC discrimination circuit 11 is removed from the automatic tuning apparatus A5. Thus, the automatic tuning apparatus A7 is an apparatus having a function of discriminating to which one of the PAL system, the SECAM system and the SECAM-L system the video signal system of a received signal belongs.

Figure 21:
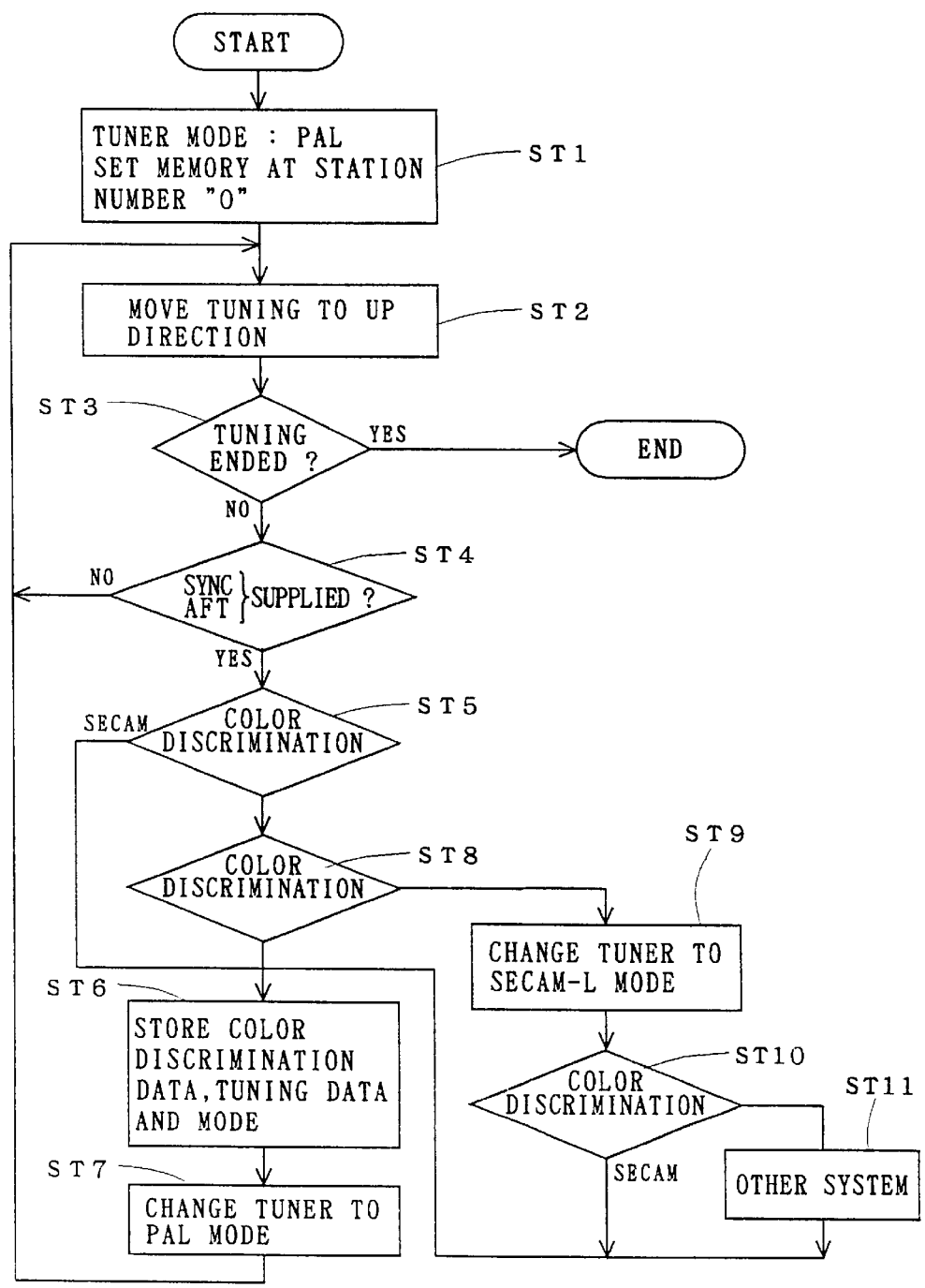
FIG. 21 is a flow chart for illustrating the operation of the automatic tuning apparatus according to the seventh embodiment of the present invention.

With reference to a flow chart shown in FIG. 21, the operation of the automatic tuning apparatus A7 is now described. When a command for auto tuning is received from the user, the system controller 7B sets the tuning mode of a tuner circuit 2 at the PAL system, and sets the memory address of the memory 6 at a station number "0" as initialization (step ST1).

Then, a tuning control signal S3 is transmitted to the tuner circuit 2, to control the same in a direction for increasing the tuning frequency by a constant amount (step ST2).

At this time, a discrimination is made as to whether or not the current frequency reaches the upper limit of the tuning frequency, i.e., whether or not the tuning is ended (step ST3), so that the tuning is ended if the current frequency reaches the upper limit of the tuning frequency, otherwise an AFT signal S4 which is outputted from an AFT detection circuit 4 and a SYNC signal S2 indicating presence/absence of a signal separated by a video signal processing circuit 3 are inputted in the tuning control circuit 5, in order to detect presence/absence of a broadcasting station transmitting a signal of the frequency (step ST4).

If both of the AFT signal S4 and the SYNC signal S2 are supplied at this time, the tuning control circuit 5 determines that the signal from the broadcasting station can be received and executes a next step S5. If both of the AFT signal S4 and the SYNC signal S2 are not supplied, on the other hand, the tuning frequency is increased by a constant amount at the step ST2.

At a step ST5, a color discrimination circuit 13 receiving a color burst signal S8 from the video signal processing circuit 3 carries out a color discrimination, to discriminate the system to the SECAM system and another system. In the case of the SECAM-L system, a video signal S1 is hunting since the same is tuned in the PAL mode and frequency change of the color burst signal S8 cannot be correctly discriminated, and hence the system is assumed to be that other than the SECAM system.

When a discrimination on the SECAM system is made at the step ST5, on the other hand, current tuning data (data related to the frequency) is stored in the address of the station number "0" of the memory 6 while information that the current video signal system is the SECAM system is also stored, and the address of the memory 6 is incremented by one to a station number "1" in order to store next tuning data (step ST6). In the case of the SECAM system, tuning is possible in the PAL mode.

No re-setting at the step ST7 is required at a step ST7 since the tuning mode of the tuner circuit 2 is the PAL mode, and the tuning frequency is then increased by a constant amount at the step ST2 to enter a next tuning operation, the operations through the steps ST2 to ST7 are repeated and the tuning is ended upon reaching the upper limit of the tuning frequency.

When a determination on a system other than the SECAM system is made at the step ST5, on the other hand, the color discrimination circuit 13 receiving the color burst signal S8 from the video signal processing circuit 3 again makes a color discrimination, to discriminate the system to the PAL system and another system (step ST8). The discrimination at the step ST8 is made on the assumption of the PAL system when the color burst signal S8 is 4.43 MHz, otherwise on a system other than the PAL system.

When the PAL system is discriminated at the step ST8, the tuner circuit 2 stores the current tuning data (data related to the frequency) in the address of the station number "0" of the memory 6 while also storing information that the current video signal system is the PAL system in a state maintaining the PAL mode, and increments the address of the memory 6 by one to a station number "11" for storing next tuning data (step ST6).

No re-setting at the step ST7 is required since the tuning mode of the tuner circuit 2 is the PAL mode, and the tuning frequency is then increased by a constant amount at the step ST2 to enter a next tuning operation, the operations through the steps ST2 to ST5, ST8, ST6 and ST7 are repeated and the tuning is ended upon reaching the upper limit of the tuning frequency.

When a discrimination on a system other than the PAL system is made at the step ST8, on the other hand, the color discrimination circuit 13 outputs a mode switching circuit second control signal S10 and supplies the same to the tuning mode switching circuit 12, to change the tuner circuit 2 to the SECAM-L mode by a mode switching signal S11 (step ST9).

Then, the color discrimination circuit 13 receiving the color bust signal S8 from the video signal processing circuit 3 carries out a color discrimination to again discriminate the system to the SECAM system and another system at a step ST10.

When the SECAM system is discriminated at the step ST10, the current tuning data (data related to the frequency) is stored in the address of the station number "0" of the memory 6 while information that the current video signal system is the SECAM system is also stored in a state maintaining the tuning mode in the SECAM-L mode, and the address of the memory 6 is incremented by one to a station number "1" for storing next tuning data (step ST6).

Then, the tuning mode of the tuner circuit 2 is set at the PAL mode at the step ST7, the tuning frequency is increased by a constant amount at the step ST2 to enter a next tuning operation, the operations through the steps ST2 to ST5, ST8, ST9, St10, ST6 and ST7 are repeated, and the tuning is ended upon reaching the upper limit of the tuning frequency. The tuning data obtained by the tuning is supplied to a system for channel selection from the address of the memory 6, so that a position number for channel selection is allotted thereto and the tuning mode is ended.

When a discrimination on a system other than the SECAM system is made at the step ST10, on the other hand, the tuning mode is maintained at the SECAM-L mode (step ST11) and the current tuning data (data related to the frequency) is stored in the address of the station number "0" of the memory 6 and information that the current video signal system is an undiscriminable other system is also stored, and the address of the memory 6 is incremented by one to the station number "1" for storing next tuning data (step ST6).

Then, the tuning mode of the tuner circuit 2 is set at the PAL mode at the step ST7, the tuning frequency is increased by a constant amount at the step ST2 to enter a next tuning operation, the operations through the steps ST2 to ST5, ST8, ST9, St10, ST6 and ST7 are repeated, and the tuning is ended upon reaching the upper limit of the tuning frequency. The tuning data obtained by the tuning is supplied to the system for channel selection from the address of the memory 6, so that a position number for channel selection is allotted thereto and the tuning mode is ended.

The operation following the step ST10 is a system for not stopping the tuning operation also when an undiscriminable signal such as a ghost signal is received, and the user can arbitrarily designate the video signal system after the tuning by storing the undiscriminable signal. This is also effective in the case where the signal field is so weak that the color discrimination circuit 13 cannot discriminate the video signal system.

As hereinabove described, the automatic tuning apparatus A7 shown in FIG. 20 comprises the color discrimination circuit 13 to discriminate to which one of the PAL system, the SECAM system and the SECAM-L system the video signal system of the received signal belongs so that the tuning mode of the tuner circuit 2 can be automatically switched, whereby the user may not carry out a switching operation in response to the video signal system by himself.

Further, it is possible to obtain an automatic tuning apparatus whose tuning operation is not stopped also when an undiscriminable signal such as a ghost signal is received or the signal field is so weak that the color discrimination circuit 13 cannot discriminate the picture signal system.

The remaining functions are similar to those of the automatic tuning apparatus A5, and hence redundant description is omitted.

<Modifications>

The structures of the automatic tuning apparatus A1 to A4 according to the first to fourth embodiments may be added to the aforementioned automatic tuning apparatus A5 to A7 according to the fifth to seventh embodiments of the present invention for storing broadcasting station information, noise data and picture definition data in the memories and displaying the same on the receiver screens.

In a structure therefor, the text data decoder circuit 10, the noise detection circuit 20 and the picture definition detection circuit 30 are provided to receive the video signal S1 outputted from the tuner circuit 2 and outputs are supplied to the tuning control circuit 5, while the CG circuit 40 is provided between the output of the video signal processing circuit 3 and the video signal output terminal 9.

<Eighth Embodiment>

Figure 22:
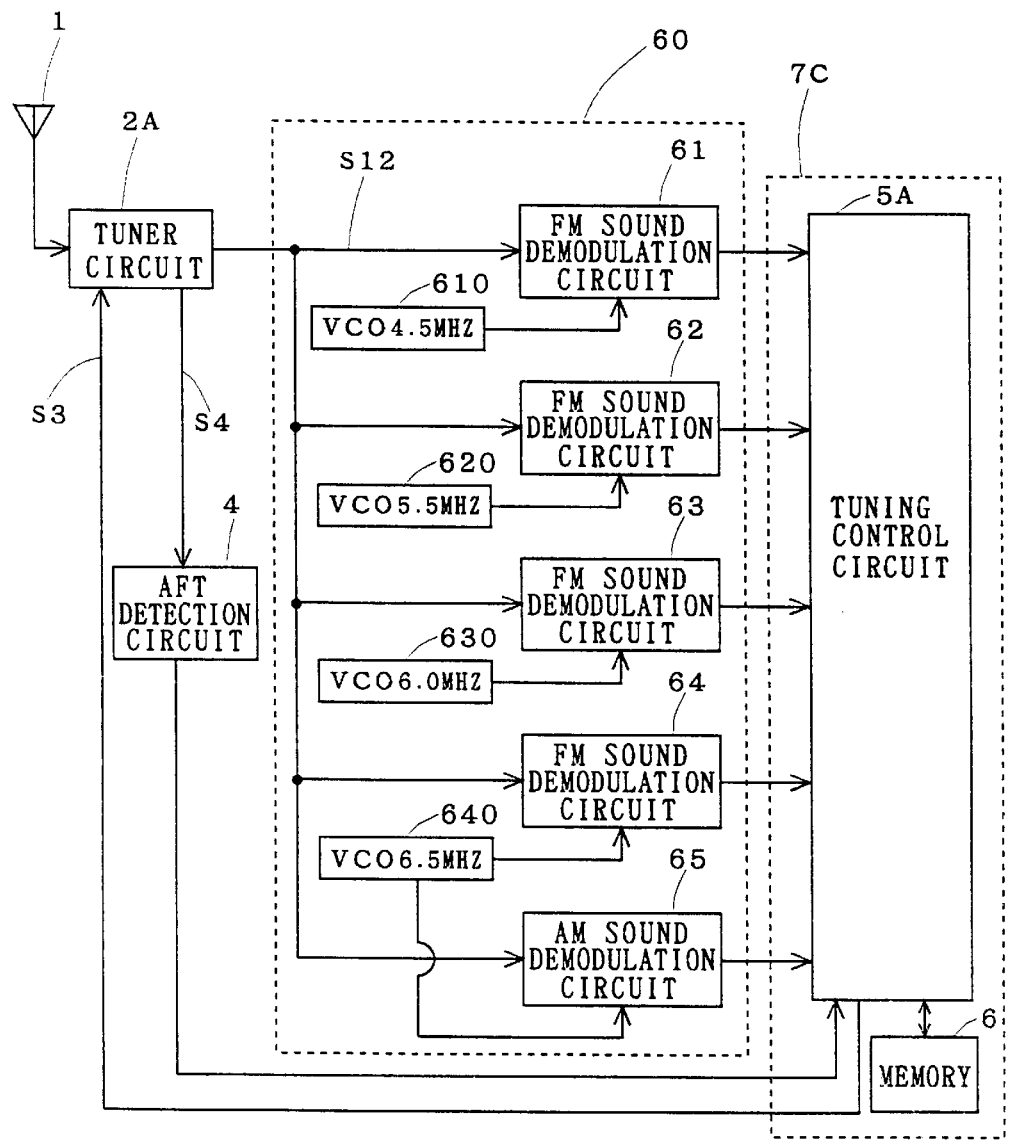
FIG. 22 illustrates the structure of an automatic tuning apparatus according to an eighth embodiment of the present invention.

FIG. 22 illustrates the structure of an automatic tuning apparatus A8 for a VTR according to an eighth embodiment of the present invention. Referring to FIG. 22, numeral 2A denotes a tuner circuit which is connected to an antenna 1, numeral 4 denotes an AFT detection circuit which receives a signal from the tuner circuit 2 for detecting presence/absence of a broadcasting station, numeral 5A denotes a tuning control circuit for controlling the tuning operation of the tuner circuit 2A, and numeral 6 denotes a memory which is connected to the tuning control circuit 5A, and a system control circuit 7C is formed by the tuning control circuit 5A and the memory 6. A sound processor 60 is connected to the tuner circuit 2A.

The sound processor 60 is formed by sound demodulation circuits receiving a sound intermediate frequency signal (hereinafter referred to as an SIF signal) S12 which is outputted from the tuner circuit 2A and demodulating the same to a sound, and voltage control oscillators (hereinafter referred to as VCOs).

The sound processor 60 is provided therein with FM sound demodulation circuits 61, 62, 63 and 64 carrying out FM detection and an AM sound demodulation circuit 65 carrying out AM detection so that the SIF signal is supplied thereto in parallel with each other, a VCO 610 having an oscillation frequency of 4.5 MHz is connected to the FM sound demodulation circuit 61, a VCO 620 having an oscillation frequency of 5.5 MHz is connected to the FM sound demodulation circuit 62, a VCO 630 having an oscillation frequency of 6.0 MHz is connected to the FM sound demodulation circuit 63, a VCO 640 having an oscillation frequency of 6.5 MHz is connected to the FM sound demodulation circuit 64 and the AM sound demodulation circuit 65, and outputs of the FM sound demodulation circuits 61, 62, 63 and 64 and the AM sound demodulation circuit 65 are supplied to the tuning control circuit 5A.

The FM sound demodulation circuits 61, 62, 63 and 64 are formed by FM detection circuits of a quadrature system or the like while the AM sound demodulation circuit 65 is formed by an AM detection circuit, and redundant description is omitted since both are well-known circuits. Redundant description is omitted also as to the VCOs, which are in general structures.

Figure 23:
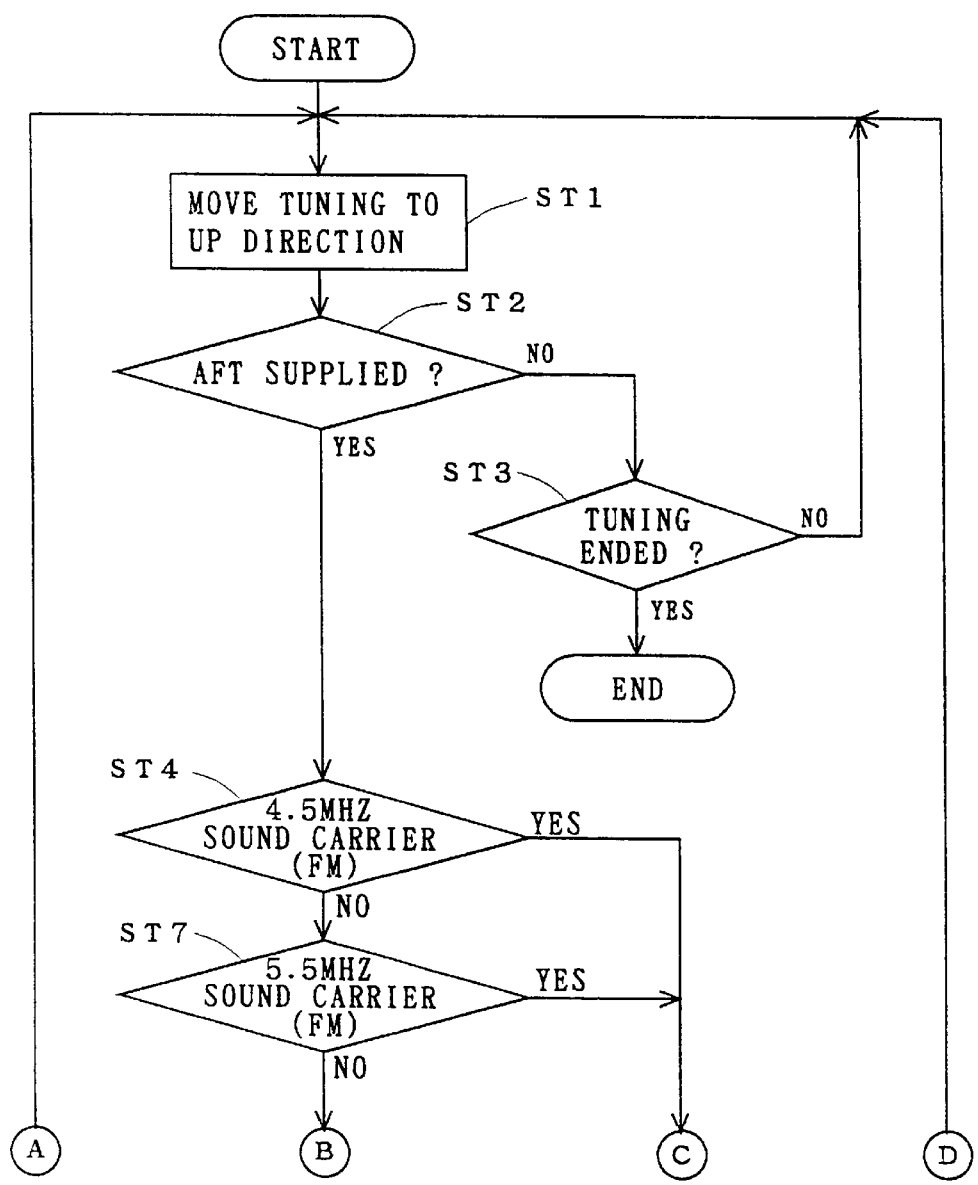
FIG. 23 is a flow chart for illustrating the operation of the automatic tuning apparatus according to the eighth embodiment of the present invention.
Figure 24:
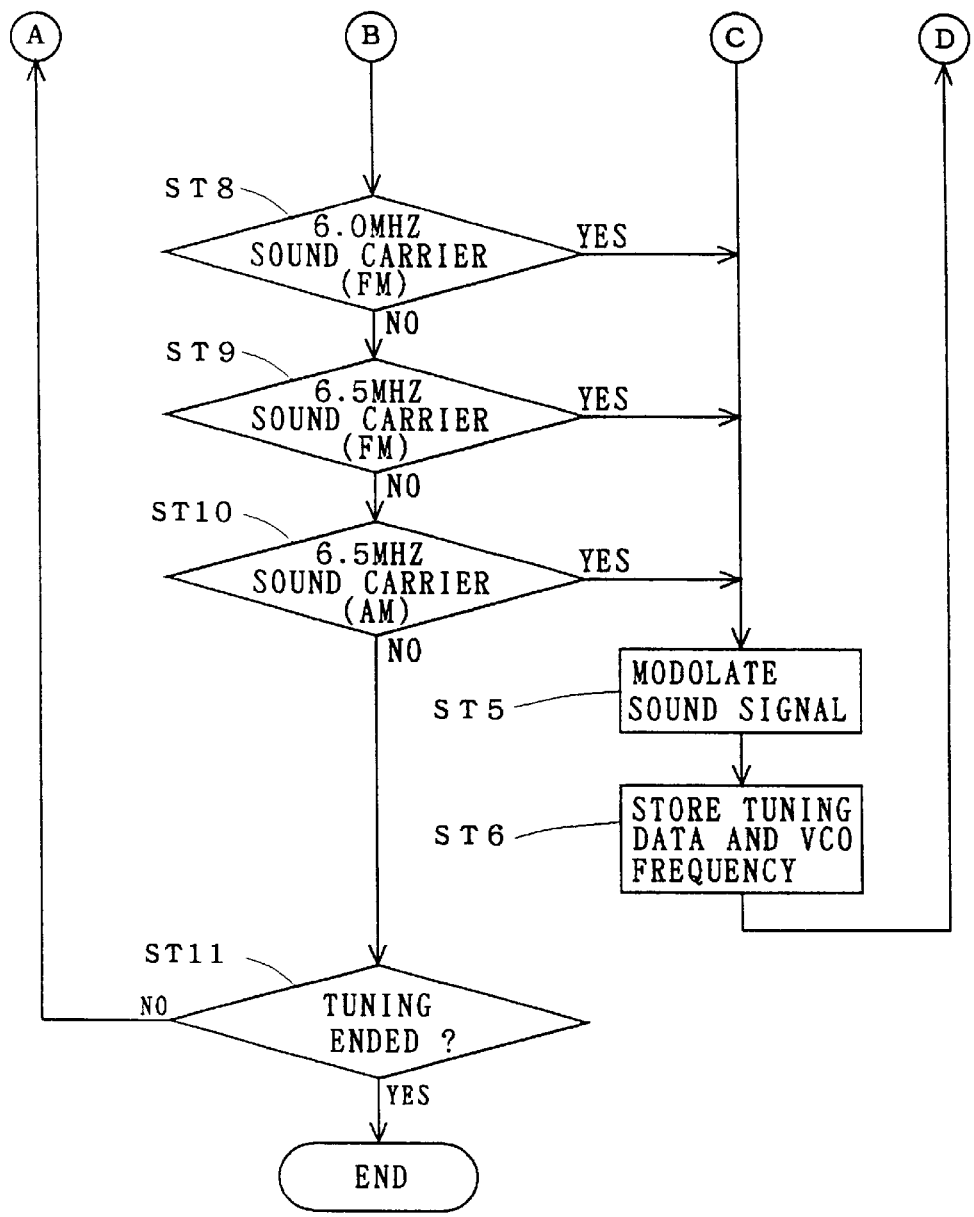
FIG. 24 is a flow chart for illustrating the operation of the automatic tuning apparatus according to the eighth embodiment of the present invention.

With reference to flow charts shown in FIG. 23 and 24, the operation of the automatic tuning apparatus A8 is now described. When a command for automatic tuning is received from the user, the tuning control circuit 5A transmits a tuning control signal S3 to the tuner circuit 2A, to control the same to a direction for increasing the tuning frequency by a constant amount (step ST1).

In order to detect presence/absence of a sound signal (sound carrier) of a broadcasting station received by the antenna 1, an AFT signal S4 which is outputted from the AFT detection circuit 4 is inputted in the tuning control circuit 5A (step ST2).

If no AFT signal S4 is supplied at the step ST2, a discrimination is made as to whether or not the current frequency reaches the upper limit of the tuning frequency, i.e., whether or not the tuning is ended (step ST3), to complete the tuning if the current frequency reaches the upper limit of the tuning frequency, otherwise carrying out the operation at the step ST1 again.

If the AFT signal S4 is supplied at the step ST2, on the other hand, the SIF signal S12 which is outputted from the tuner circuit 2A is supplied to the FM sound demodulation circuit 61 (step ST4). The VCO 610 having the oscillation frequency of 4.5 MHz is connected to the FM sound demodulation circuit 61, and the sound signal is demodulated if a sound carrier matching with the frequency 4.5 MHz of the VCO 610 is present in the supplied SIF signal S12 (step ST5), and transmitted to the system controller 7C, and the current VCO frequency is stored in the memory 6 with the tuning data (step ST6), and operations following the step ST1 are carried out.

If there is no sound carrier matching with the frequency 4.5 MHz of the VCO 610 in the supplied SIF signal S12, on the other hand, the FM sound demodulation circuit 62 makes a determination as to presence/absence of a sound carrier matching with the frequency 5.5 MHz of the VCO 620 in the supplied SIF signal S12 (step ST7), so that the sound signal is demodulated if the sound carrier is present (step ST5) and transmitted to the system controller 7C, and the current VCO frequency is stored in the memory 6 with the tuning data (step ST6), and the operations following the step ST1 are carried out.

If there is no sound carrier matching with the frequency 5.5 MHz of the VCO 620 in the supplied SIF signal S12, the FM sound demodulation circuit 63 makes a determination as to presence/absence of a sound carrier matching with the frequency 6.0 MHz of the VCO 630 in the supplied SIF signal S12 (step ST8), so that the sound signal is demodulated if the sound carrier is present (step ST5) and transmitted to the system controller 7C, and the current VCO frequency is stored in the memory 6 with the tuning data (step ST6), and the operations following the step ST1 are carried out, similarly to the above.

If there is no sound carrier matching with the frequency 6.0 MHz of the VCO 630 in the supplied SIF signal S12, the FM sound demodulation circuit 64 makes a determination as to presence/absence of a sound carrier matching with the frequency 6.5 MHz of the VCO 640 in the supplied SIF signal S12 (step ST9), so that the sound signal is demodulated if the sound carrier is present (step ST5) and transmitted to the system controller 7C, and the current VCO frequency is stored in the memory 6 with the tuning data (step ST6), and the operations following the step ST1 are carried out, similarly to the above.

If there is no sound carrier matching with the frequency 6.5 MHz of the VCO 640 in the supplied SIF signal S12, the AM sound demodulation circuit 65 makes a determination as to presence/absence of a sound carrier matching with the frequency 6.5 MHz of the VCO 640 in the supplied SIF signal S12 (step ST10), so that the sound signal is demodulated if the sound carrier is present (step ST5) and transmitted to the system controller 7C, and the current VCO frequency is stored in the memory 6 with the tuning data (step ST6), and the operations following the step ST1 are carried out, similarly to the above.

If there are no sound carriers matching with the frequencies of the respective VCOs at the steps ST4 to ST8, a determination is made as to whether or not the tuning frequency reaches the upper limit (step ST11) to end the tuning operation if the tuning frequency reaches the upper limit while repeating the operation at the step ST1 if the same does not reach the upper limit.

Thus, the sound signal system of the received signal can be detected depending on with which one of the FM sound demodulation circuits 61 to 64 and the AM sound demodulation circuit 65 the frequency of the SIF signal S12 matches. When the video signal system is the PAL system or the SECAM system, for example, an output of 6.0 MHz appears when the sound signal system is the I system, an output of 5.5 MHz appears when the sound signal system is the B/G system, and an output of 6.5 MHz appears when the sound signal system is the D/K system. Further, an output of 4.5 MHz appears when the sound signal system is an M system, and the current video signal system is the NTSC system.

According to the automatic tuning apparatus A8 of this embodiment, therefore, it is possible to further finely classify the received signal by discriminating not only the video signal system but the sound signal system. Due to such function, it is possible to automatically cope with each broadcasting station in receiving around the boundary, for example, when a plurality of broadcasting stations of the same video signal system are present and respective sound signal systems are different from each other.

Further, the apparatus comprises a plurality of sound demodulation circuits and VCOs having different oscillation frequencies provided for the respective ones of the sound demodulation circuits, whereby discriminations of the sound signal systems are so parallel-processed that the time required for the discriminations can be reduced.

While a discrimination of the video signal system is not mentioned as to the aforementioned automatic tuning apparatus A8, the discrimination of the video signal system is enabled by combining the same with the automatic tuning apparatus A5 to A7 shown in the fifth to seventh embodiments according to the present invention.

The result of the sound signal system may be read from the memory 6 during or after completion of the auto tuning to be used for switching of a chromatic circuit or a video system tuner circuit or sorting of channel positions, for example, and this discriminating operation is not restricted to the auto tuning but may be carried out anytime if necessary.

<Ninth Embodiment>

Figure 25:
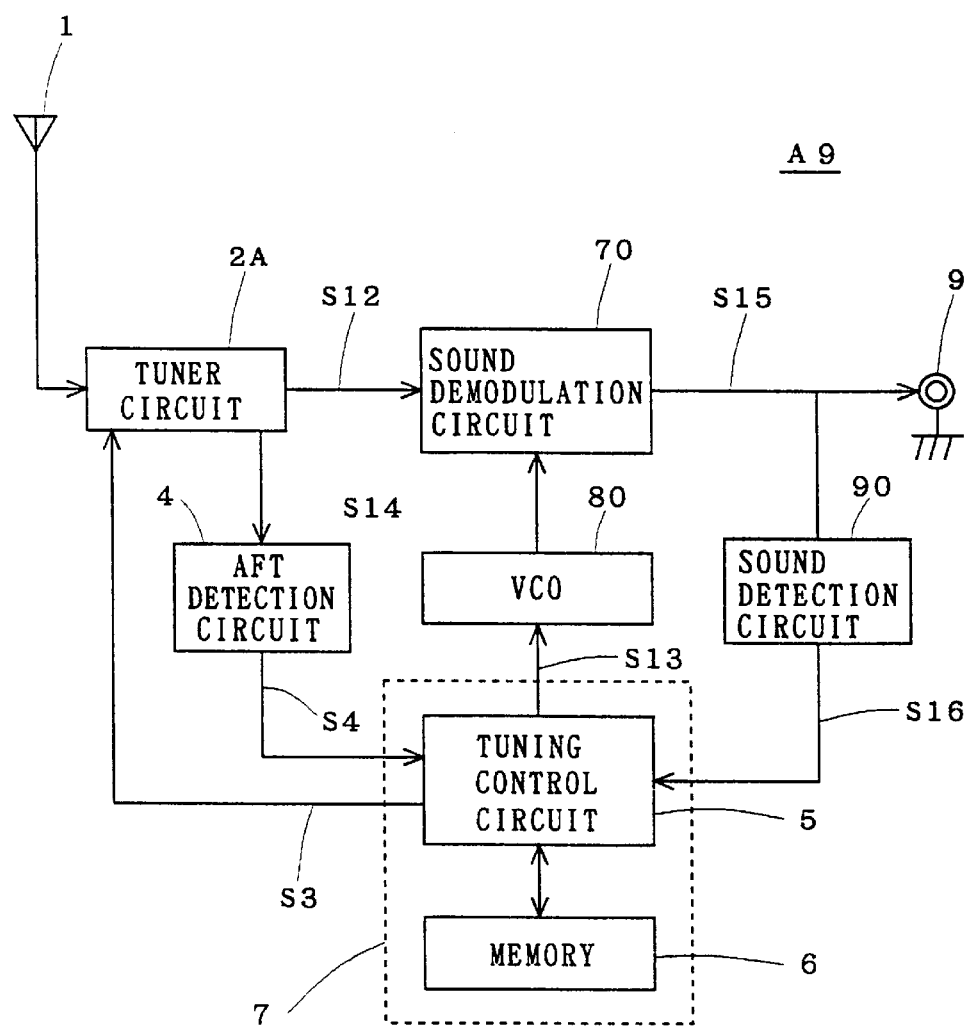
FIG. 25 illustrates the structure of an automatic tuning apparatus according to a ninth embodiment of the present invention.

FIG. 25 illustrates the structure of an automatic tuning apparatus A9 for a VTR according to a ninth embodiment of the present invention. Referring to FIG. 25, numeral 2A denotes a tuner circuit which is connected to an antenna 1, numeral 4 denotes an AFT detection circuit which receives a signal from the tuner circuit 2A for detecting presence/absence of a broadcasting station, numeral 5 denotes a tuning control circuit for controlling the tuning operation of the tuner circuit 2A, and numeral 6 denotes a memory circuit which is connected to the tuning control circuit 5, and a system control circuit 7 is formed by the tuning control circuit 5 and the memory 6. A sound demodulation circuit 70 receiving an SIF signal S12 and demodulating the same to a sound is connected to the tuner circuit 2A, while a VCO 80 which is controlled by a VCO control signal S13 outputted from the tuning control circuit 5 for outputting a clock signal S14 of a prescribed frequency is connected to the sound demodulation circuit 70. A sound signal S15 outputted from the sound demodulation circuit 70 is supplied to a sound detection circuit 90, and a detected sound detection signal S16 is supplied to the tuning control circuit 5.

The sound demodulation circuit 70 is a known circuit which is formed by an FM detection circuit of the quadrature system or the like, and hence redundant description is omitted. As to the VCO 80 outputting the clock signal S14 in the range of 5.5 MHz to 7.0 MHz, redundant description is omitted since its structure is general.

Figure 26:
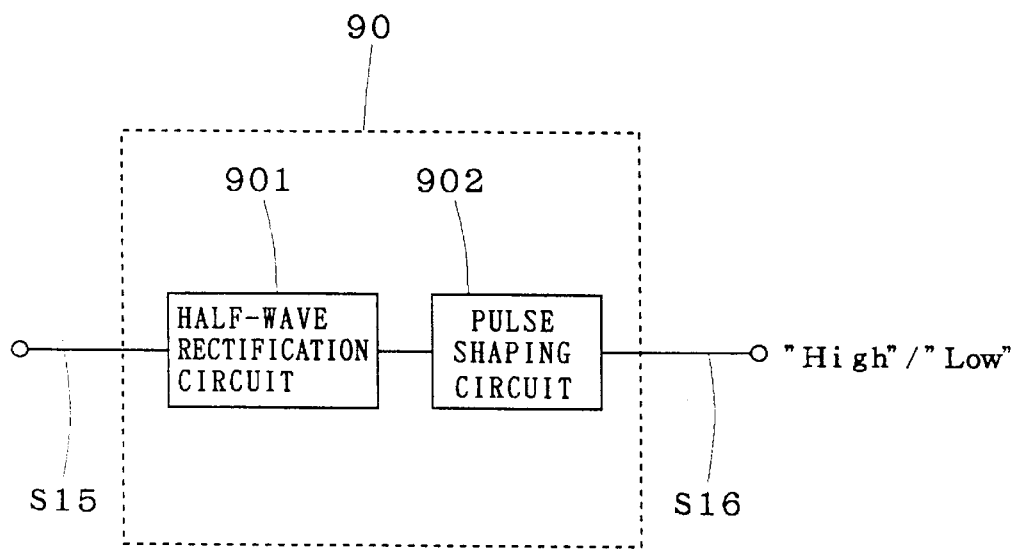
FIG. 26 illustrates a partial structure of the automatic tuning apparatus according to the ninth embodiment of the present invention.

FIG. 26 shows the structure of the sound detection circuit 90. As shown in FIG. 26, the sound detection circuit 90 is formed by a half-wave rectification circuit 901 and a pulse shaping circuit 902, so that the (demodulated) sound signal S15 is half-wave rectified by the half-wave rectification circuit 901 and supplied to the pulse shaping circuit 902. The pulse shaping circuit 902 pulses the half-wave rectified sound signal and outputs the same as a "high" or "low" dc voltage signal (sound detection signal S16).

Figure 27:
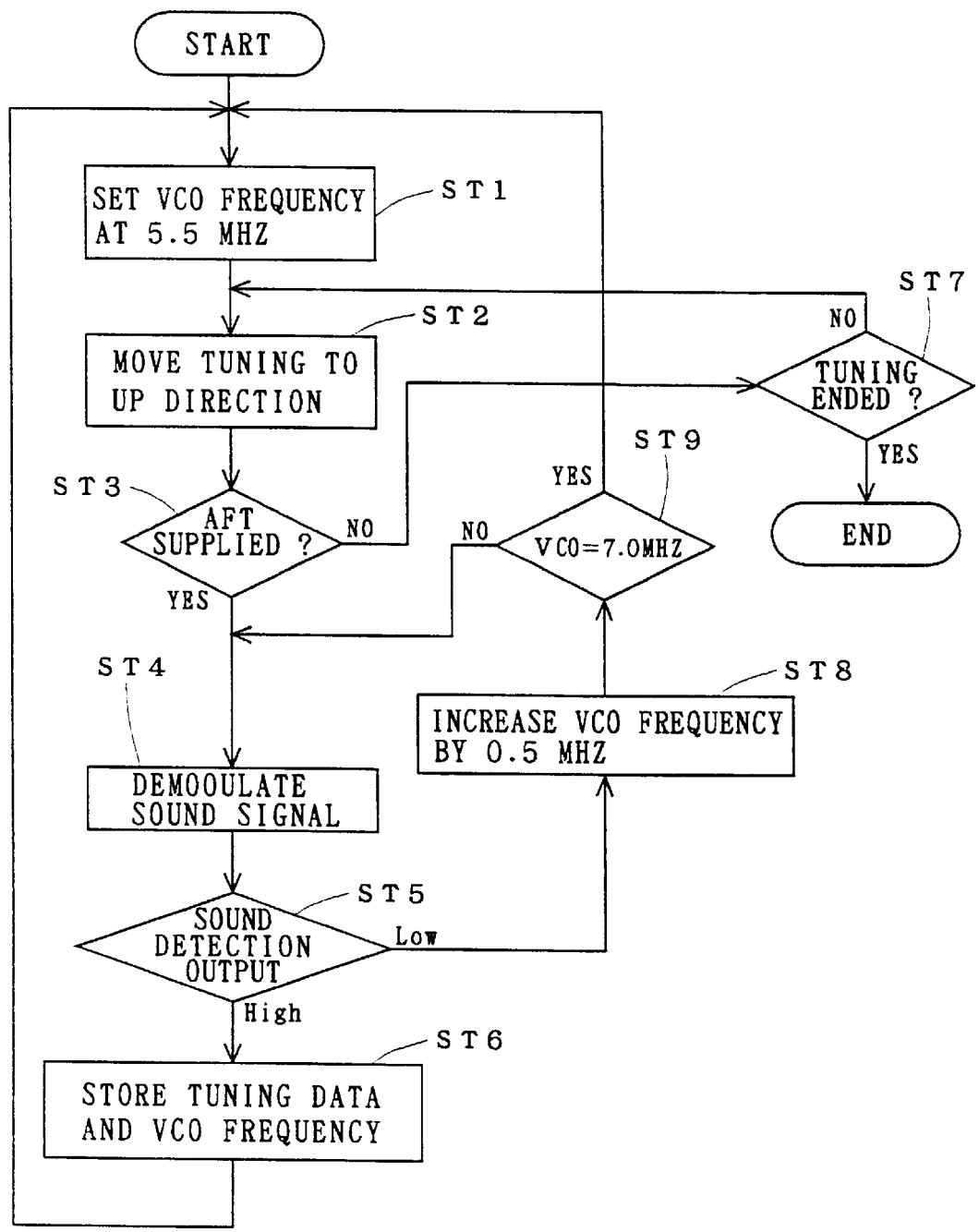
FIG. 27 is a flow chart for illustrating the operation of the automatic tuning apparatus according to the ninth embodiment of the present invention.

With reference to a flow chart shown in FIG. 27, the operation of the automatic tuning apparatus A9 is now described. The tuning control circuit 5 which receives a command for automatic tuning from the user first sets the oscillation frequency of the VCO 80 at 5.5 MHz as initialization (step ST1).

Then the tuning control circuit 5 transmits a tuning control signal S3 to the tuner circuit 2A, to control the same in a direction for increasing the tuning frequency by a constant amount (step ST2).

Then, an AFT signal S4 which is outputted from the AFT detection circuit 4 is inputted in the tuning control circuit 5, in order to detect presence/absence of a broadcasting station transmitting a signal of the frequency (step ST3).

If a sound carrier matching with the frequency 5.5 MHz of the VCO 80 is included in a supplied SIF signal S12, the same is demodulated into the sound signal S15 and outputted in a state maintaining the tuning frequency, when the AFT signal S4 is supplied (step ST4).

The demodulated sound signal S15 is transmitted to the sound detection circuit 90, and pulsed to be transmitted to the system controller 7 as the sound detection signal S16 (step ST5).

If the sound detection signal S16 is "high", the current tuning data and the oscillation frequency of the VCO 80 are stored in the memory 6 of the system controller 7 as address data, and the address for storage is then incremented by one to continue the tuning operation (step ST6).

The operations through the steps ST1 to ST6 are carried until the upper limit of the tuning frequency is reached, and the tuning mode is ended upon reaching the upper limit (step ST7).

If the sound detection signal S16 is "low" at the step ST5, on the other hand, the oscillation frequency of the VCO 80 is increased by 0.5 MHz (step ST8), and the sound signal S15 demodulated by the sound demodulation circuit 70 is transmitted to the sound detection circuit 90 if the current oscillation frequency of the VCO 80 is not 7.0 MHz (step ST9), so that the sound signal S15 is pulsed. When the sound detection signal S16 is converted to "high" by changing the oscillation frequency of the VCO 80, the current tuning data and the oscillation frequency of the VCO 80 are stored in the memory 6 of the system controller 7 as address data, and the address for storage is then incremented by one to continue the tuning operation (step ST6).

If the sound detection signal S16 remains "low" upon change of the oscillation frequency of the VCO 80, the process returns to the step ST1 when the frequency of the VCO reaches 7.0 MHz, to end the tuning.

As hereinabove described, the automatic tuning apparatus A9 comprises the VCO 80 outputting the clock signal S14 in the range of 5.5 MHz to 7.0 MHz and the sound detection circuit 90, whereby the system of the sound signal can be discriminated without providing a plurality of the sound demodulation circuits 70, and the apparatus is suitable for miniaturization with a small number of elements.

Further, discrimination of the video signal system is also enabled by combining the automatic tuning apparatus A9 with the automatic tuning apparatus A5 to A7 according to the fifth to seventh embodiments of the present invention.

While the AFT signal S4 which is outputted from the AFT detection circuit 4 is employed in the aforementioned embodiment in order to detect presence/absence of the broadcasting station, determination accuracy in the tuning can be improved by employing an SIF signal S12 outputted from the tuner circuit 2A.

The result of the discrimination of the sound carrier system may be read from the memory 6 in or after completion of the automatic tuning to be used for switching of a chromatic circuit or a video system tuner circuit or sorting of channel positions, for example, and this discriminating operation is not restricted to the automatic tuning but may be carried out anytime if necessary.

<Tenth Embodiment>

Figure 28:
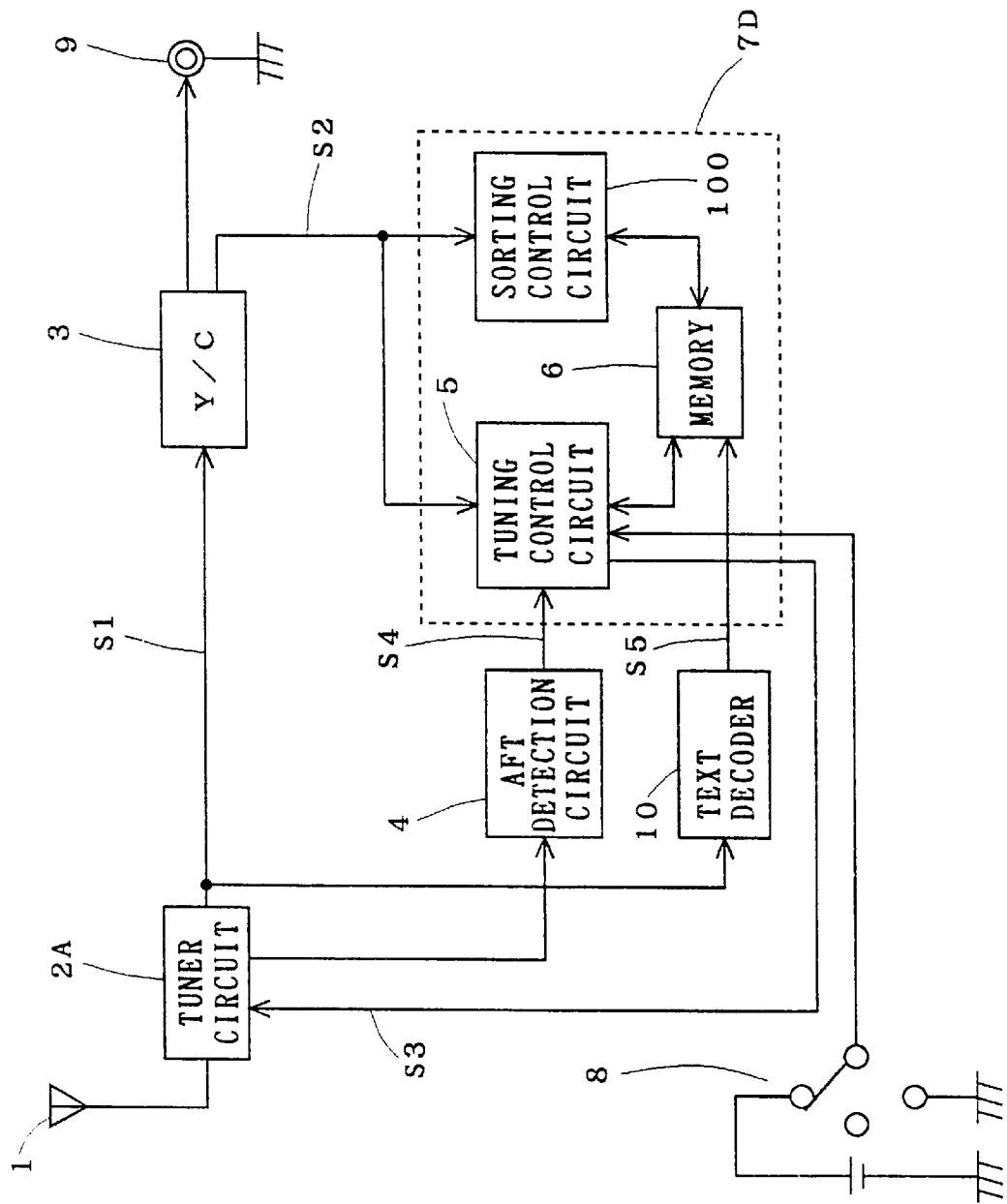
FIG. 28 illustrates the structure of an automatic tuning apparatus according to a tenth embodiment of the present invention.

FIG. 28 shows the structure of an automatic tuning apparatus A10 for a VTR according to a tenth embodiment of the present invention. Referring to FIG. 28, numeral 2A denotes a tuner circuit which is connected to an antenna 1, numeral 3 denotes a video signal processing circuit including a SYNC separation circuit which receives a composite video signal S1 from the tuner circuit 2A for carrying out signal processing, numeral 4 denotes an AFT detection circuit receiving a signal from the tuner circuit 2A for detecting presence/absence of a broadcasting station, numeral 5 denotes a tuning control circuit for controlling the tuning operation of the tuner circuit 2A, numeral 6 denotes a memory which is connected to the tuning control circuit 5, and numeral 100 denotes a sorting control circuit for sorting tuning data stored in the memory 6 along prescribed position numbers, which is controlled by a SYNC signal S2 from the video signal processing circuit 3.

A system controller 7D is formed by the tuning control circuit 5, the memory 6 and the sorting control circuit 100. Numeral 10 denotes a text data decoder circuit which receives the video signal S1 and extracts a teletext signal S5, which is information from the broadcasting station, from the video signal S1 for supplying the same to the memory 6. Numeral 8 denotes an input signal system switch for switching the operation of the tuning control circuit 5 in response to the video signal system of the input signal.

Figure 29:
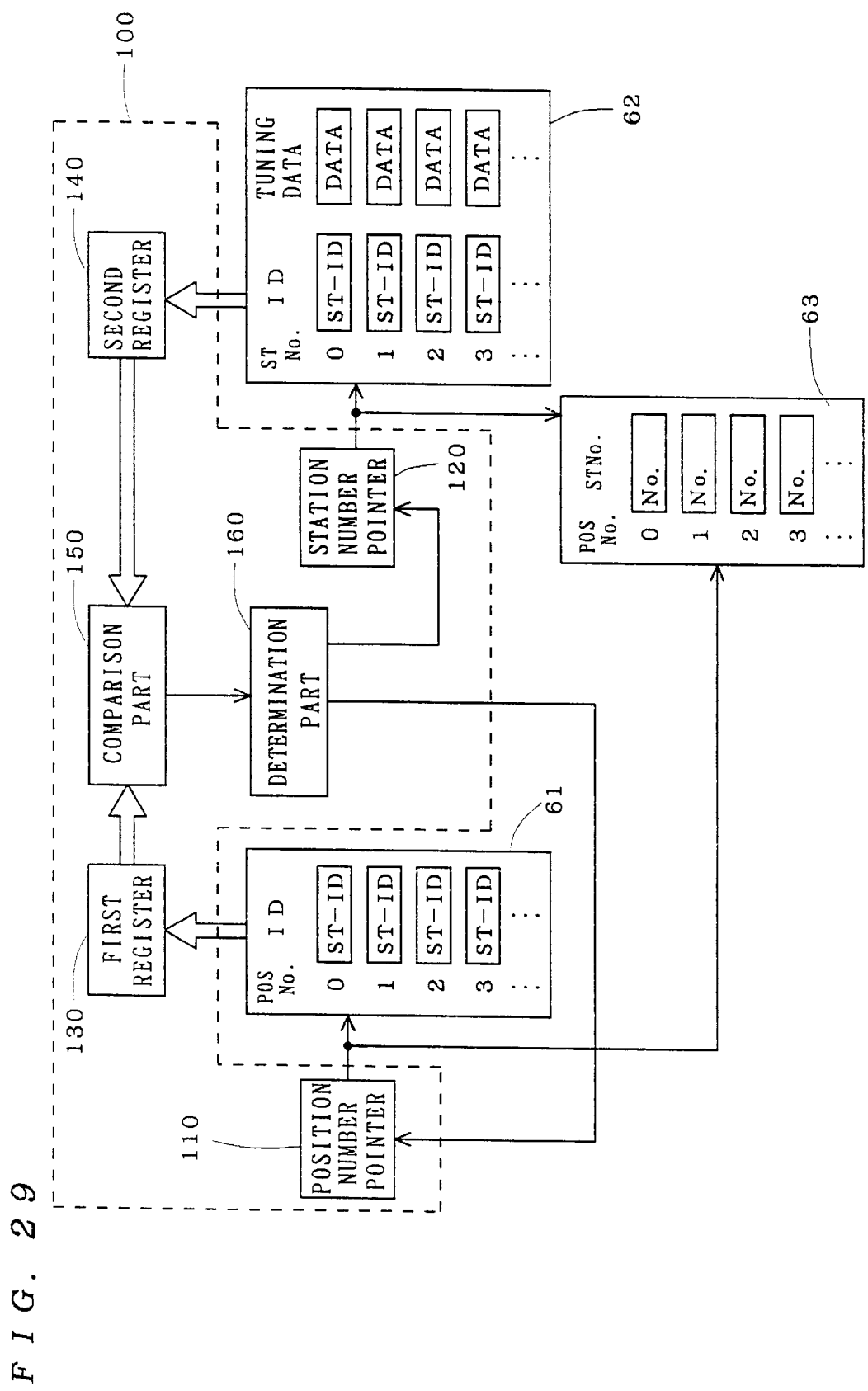
FIG. 29 illustrates a partial structure of the automatic tuning apparatus according to the tenth embodiment of the present invention.

With reference to FIG. 29, the structure of the sorting control circuit 100 is now described. The sorting control circuit 100, which is formed by software, is indicated as hardware in FIG. 29.

Referring to FIG. 29, the sorting control circuit 100 comprises a position number pointer 110 for providing a position number for channel selection, a station number pointer 120 for providing a broadcasting station number (station number), a first register 130 reading broadcasting station information (station ID) from a sorting reference memory 61 which is previously provided in the memory 6, a second register 140 reading the station ID from a tuning data memory 62 stored in the memory 6 by a tuning operation, a comparison part 150 comparing the station IDs read by the first and second registers 130 and 140 respectively with each other, and a determination part 160 determining the result of the comparison and instructing provision numbers to the position number pointer 110 and the station number pointer 120, for storing a sorting result having corresponding position and station numbers by sorting in a sorting result memory 63 provided in the memory 6.

Figure 30:
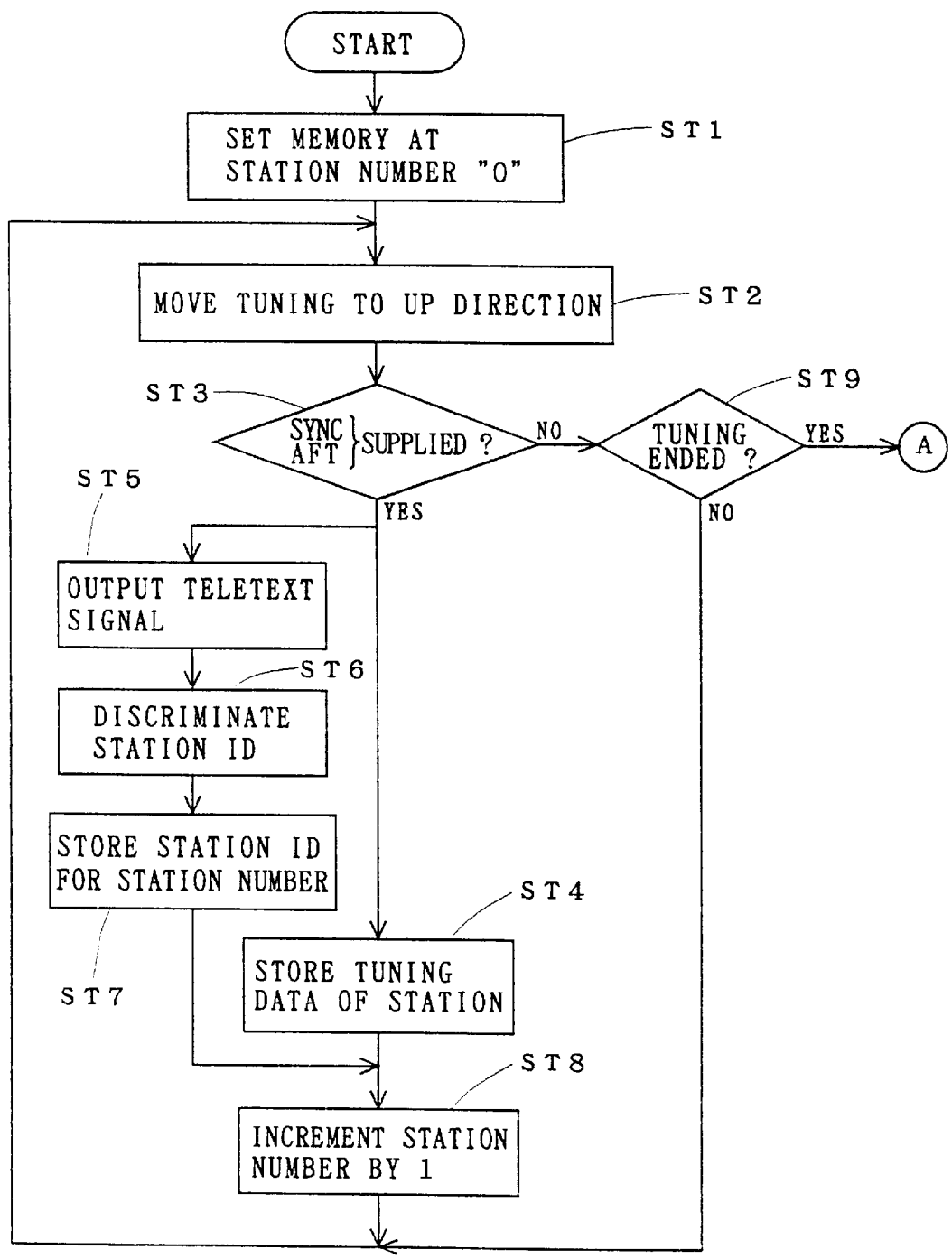
FIG. 30 is a flow chart for illustrating the operation of the automatic tuning apparatus according to the tenth embodiment of the present invention.
Figure 31:
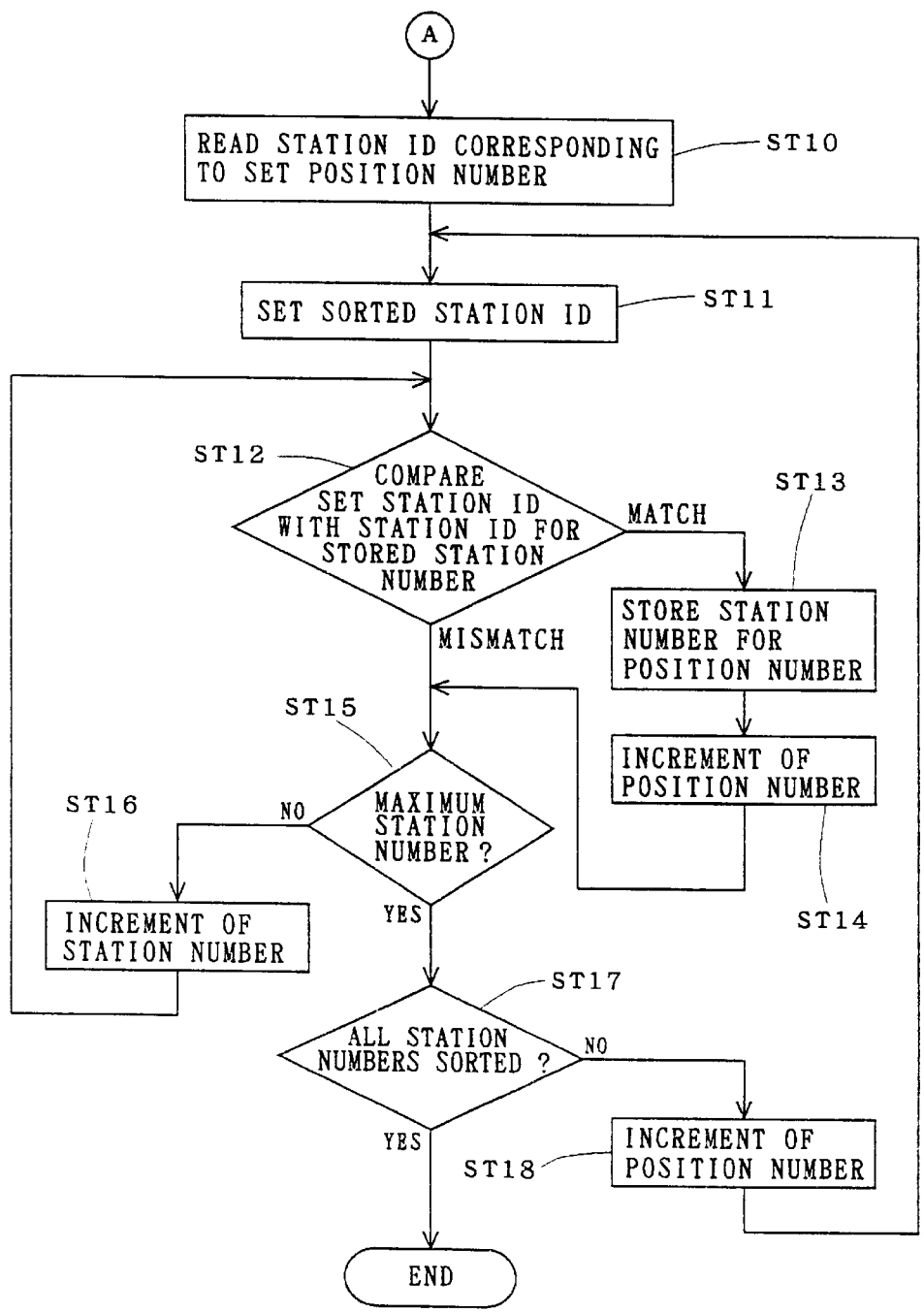
FIG. 31 is a flow chart for illustrating the operation of the automatic tuning apparatus according to the tenth embodiment of the present invention.

With reference to flow charts shown in FIGS. 30 and 31, the operation of the automatic tuning apparatus A10 is now described. When a command for auto tuning is received from the user, the system controller 7D sets the memory address of the memory 6 at a station number "0" (step ST1).

Then, a tuning control signal S3 is transmitted to the tuner circuit 2A, to control the same in a direction for increasing the tuning frequency by a constant amount (step ST2). At this time, an AFT signal S4 which is outputted from an AFT detection circuit 4 and a SYNC signal S2 indicating presence/absence of a signal separated by the video signal processing circuit 3 are inputted in the tuning control circuit 5 for detecting presence/absence of a broadcasting station transmitting a signal of the frequency, to make a discrimination (step ST3).

When both of the AFT signal S4 and the SYNC signal S2 are supplied at this point of time, the tuning control circuit 5 determines that the signal from the broadcasting station can be received, and the current tuning data is stored in the address of the station number "0" in the memory 6 (step ST4).

At the same time, the text data decoder circuit 10 decodes text information which is superposed on a blanking period of the signal from the composite video signal S1, so that the decoded teletext signal S5 is inputted in the tuning control circuit 5 (step ST5).

The tuning control circuit 5 extracts and discriminates broadcasting station information (station ID) from the teletext signal S5 (step ST6), and stores the same in the address of the station number "0" in the memory 6, similarly to the data related to the frequency (step ST7).

Then, the address of the memory 6 is incremented by one to a station number "1" in order to store next tuning data, for entering a next tuning operation (step ST8).

If both of the AFT signal S4 and the SYNC signal S2 are not supplied at the step ST3, on the other hand, a discrimination is made as to whether or not the current frequency reaches the upper limit of the tuning frequency, i.e., whether or not the tuning is ended (step ST9).

If the current frequency does not reach the upper limit of the tuning frequency, the operation at the step ST2 is carried out again and the operations through the steps ST2 to ST8 are repeated until the upper limit of the tuning frequency is reached.

If the upper limit of the tuning frequency is reached at the step ST9, on the other hand, the process enters a sorting operation of the sorting control circuit 100. First, the sorting reference memory 61 in the memory 6 is activated, a station ID corresponding to a previously set position number is read (step ST10), and the station ID indicated by the position number pointer 110 is loaded in the first register 130 (step ST11).

Then, the tuning data memory 62 in the memory 6 is activated, a station ID corresponding to the station number is read, and a station ID indicated by the station number pointer 120 is loaded in the second register 140, so that the comparison part 150 compares the station IDs which are loaded in the first and second registers 130 and 140 respectively with each other and the determination part 160 makes a determination (step ST12).

When the station IDs match with each other at the step ST12, the station number is stored in the sorting result memory 63 in the memory 6 in correspondence to the position number (step ST13).

Then, the position number is incremented by one in the position number pointer 110 (step ST14).

Then, the station number pointer 120 determines whether or not the current station number reaches the upper limit (step ST15).

Also when the station IDs mismatch with each other at the step ST12, the operation at the step ST15 is carried out.

If the current station number does not reach the upper limit at the step ST15, the station number is incremented by one in the station number pointer 120, to carry out the operation following the step ST12 again (step ST16).

When the current station number reaches the upper limit, on the other hand, the position number pointer 110 determines whether or not all station IDs are sorted, i.e., whether or not the position number reaches the upper limit (step ST17).

If a determination is made at the step ST17 that all station IDs are sorted, the sorting operation is ended.

If all station IDs are not sorted, on the other hand, the position number pointer 110 increments the position number by one, to carry out the operation following the step ST11 again (step ST18).

The aforementioned automatic tuning apparatus A10 comprises the sorting control circuit 100 so that a broadcasting station of a predetermined station ID is automatically set for each position number by a sorting operation and the user may not set the broadcasting station in correspondence to the position number, whereby the burden imposed on the user can be reduced.

When no station ID corresponding to the station number is found in the aforementioned sorting operation, this position is not selected but processing such as skipping is carried out.

<Eleventh Embodiment>

Figure 32:
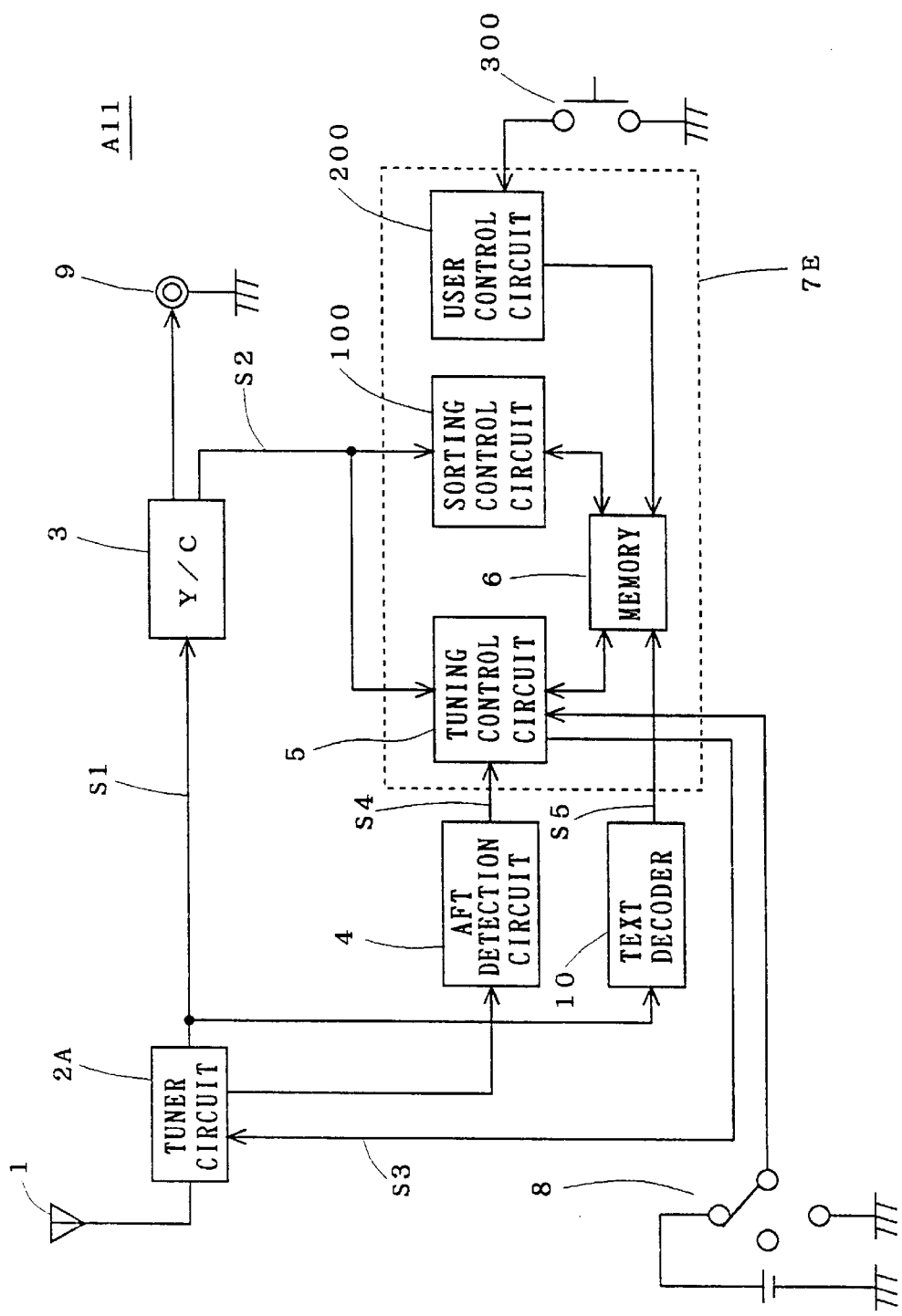
FIG. 32 illustrates the structure of an automatic tuning apparatus according to an eleventh embodiment of the present invention.

FIG. 32 shows the structure of an automatic tuning apparatus A11 for a VTR according to an eleventh embodiment of the present invention. Referring to FIG. 32, structural parts identical to those of the automatic tuning apparatus A10 described with reference to FIG. 28 are denoted by the same reference numerals, to omit redundant description.

Referring to FIG. 32, a user input control circuit 200 provided for the user for setting sorting order is connected to a memory 6, and a system controller 7E is formed by a tuning control circuit 5, the memory 6, a sorting control circuit 100 and the user input control circuit 200. A key input unit 300 for the user for inputting setting is connected to the user input control circuit 200.

Figure 33:
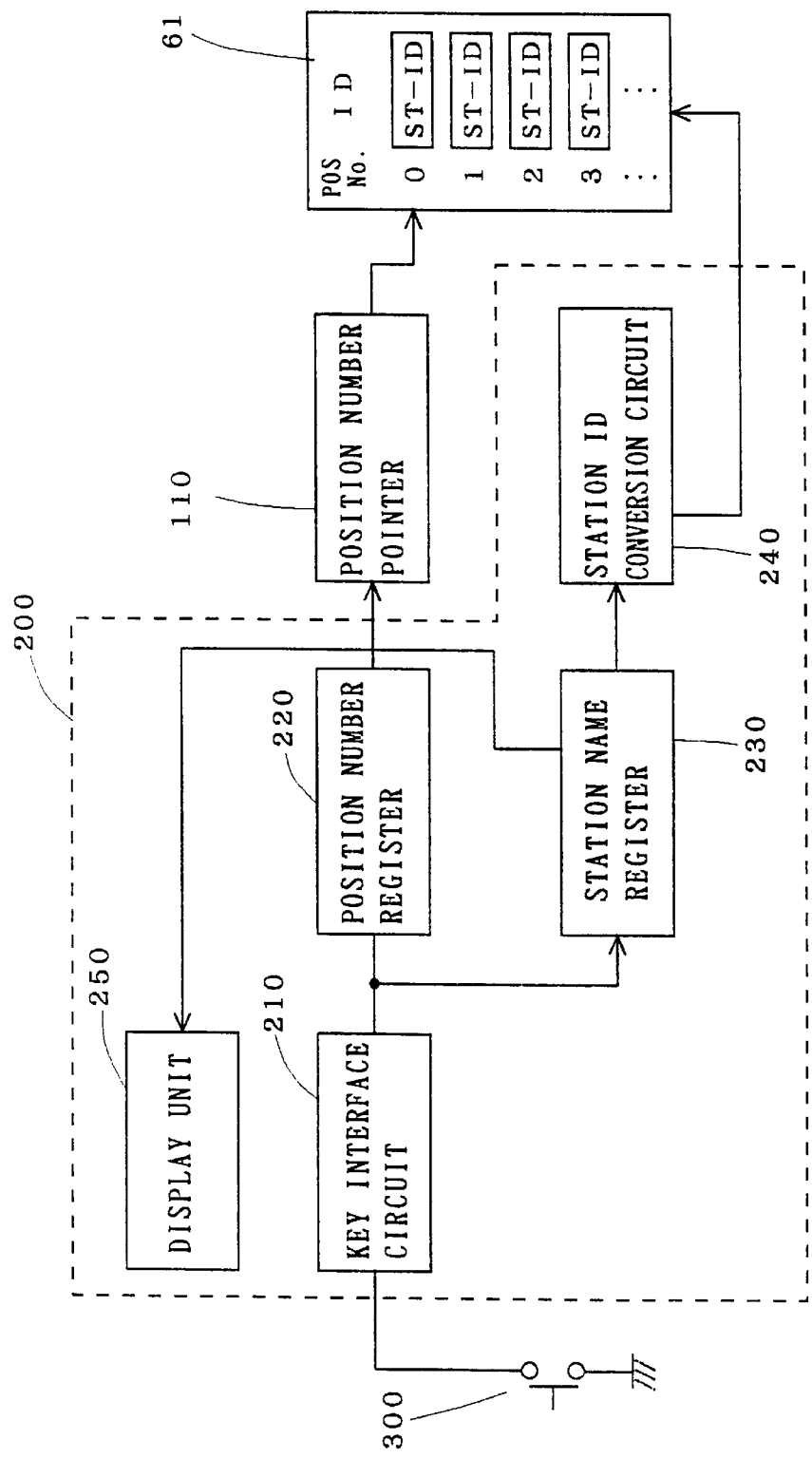
FIG. 33 illustrates a partial structure of the automatic tuning apparatus according to the eleventh embodiment of the present invention.

With reference to FIG. 33, the structure of the user input control circuit 200 is now described. Referring to FIG. 33, the user input control circuit 200 comprises a key interface circuit 210 for transferring signals with the key input unit 300, a position number register 220 and a station name register 230 which are connected to the key interface circuit 210, and a station ID conversion circuit 240 and a display unit 250 which are connected to the station name register 230, while the position number register 220 is connected to a sorting reference memory 61 of the memory 6 through a position number pointer 110 of the sorting control circuit 100 and the station ID conversion circuit 240 is also connected to the sorting reference memory 61.

The operation of the user input control circuit 200 is now described. When the user inputs broadcasting station information (the broadcasting station name, the broadcasting station name code etc.) from the key input unit 300 in correspondence to the position number, the position number and the broadcasting information are supplied to the position number register 220 and the station name register 230 respectively, so that the position number is supplied to the sorting reference memory 61 by the position number pointer 110 and the broadcasting station information is converted to a station ID by the station ID conversion circuit 240 and supplied to the sorting reference memory 61 to be stored therein. The broadcasting station information is displayed on the display unit 250.

Figure 34:
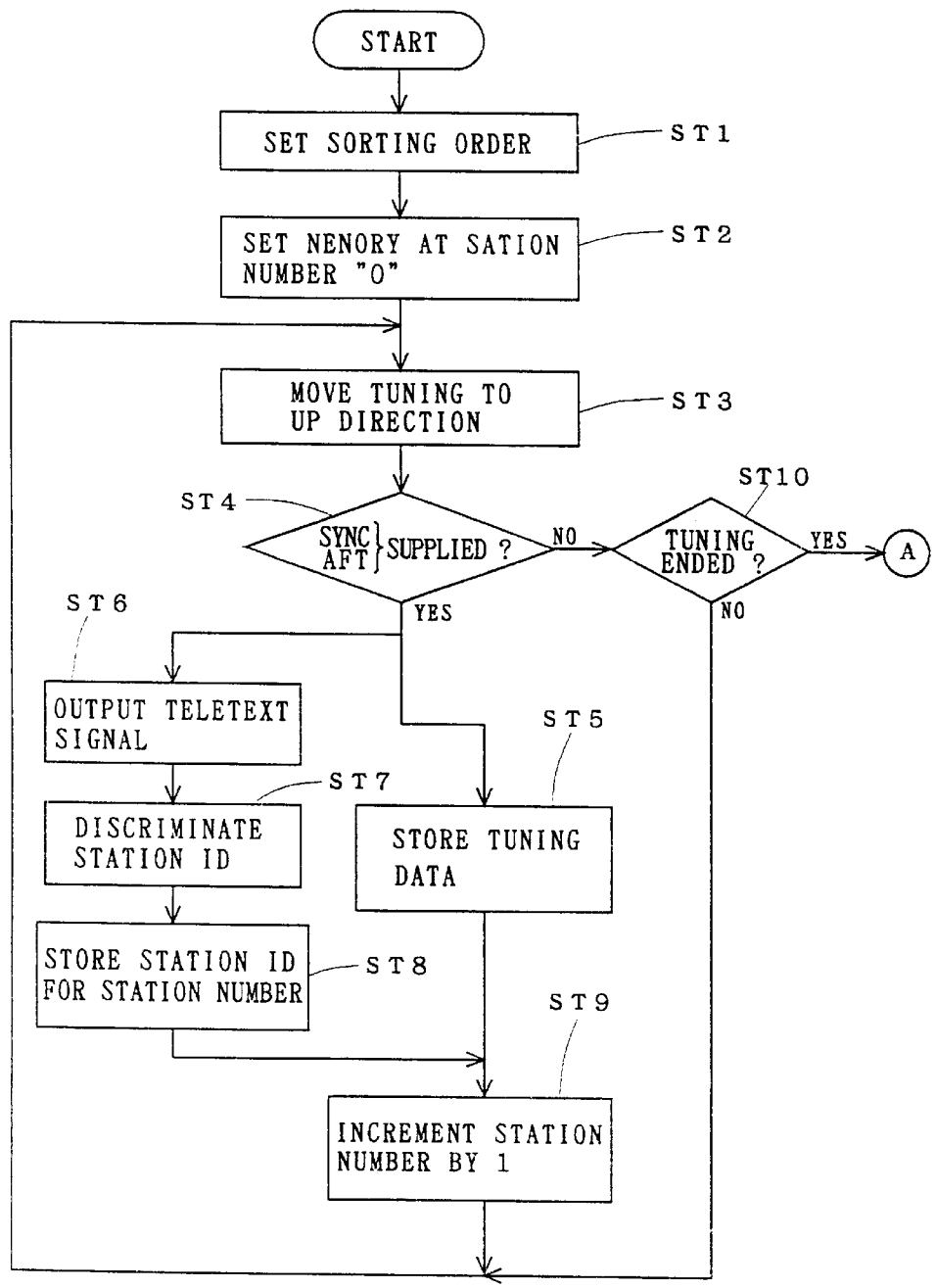
FIG. 34 is a flow chart for illustrating the operation of the automatic tuning apparatus according to the eleventh embodiment of the present invention.
Figure 35:
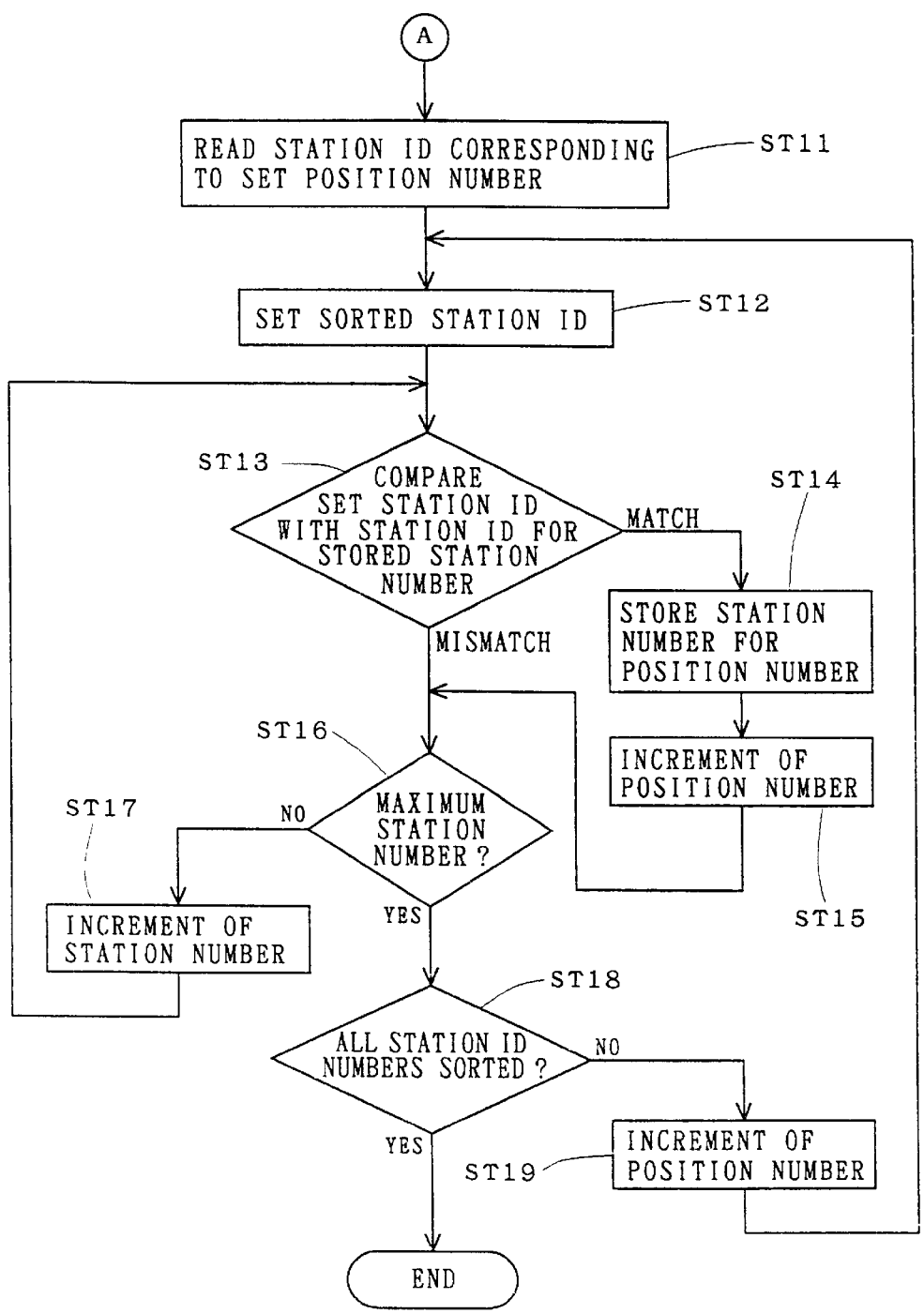
FIG. 35 is a flow chart for illustrating the operation of the automatic tuning apparatus according to the eleventh embodiment of the present invention.

With reference to flow charts shown in FIGS. 34 and 35, the operation of the automatic tuning apparatus A11 is now described. First, the user inputs broadcasting station information (the broadcasting station name, the broadcasting station name code etc.) through the key input unit 300 in correspondence to the position number, and sets the sorting order (step ST1).

Then, the system controller 7E receives a command for auto tuning and sets the memory address of the memory 6 at a station number "0" (step ST2).

Then, a tuning control signal S3 is transmitted to a tuner circuit 2A, to control the same in a direction for increasing the tuning frequency by a constant amount (step ST3). At this time, an AFT signal S4 which is outputted from an AFT detection circuit 4 and a SYNC signal S2 indicating presence/absence of a signal separated by a video signal processing circuit 3 are inputted in the tuning control circuit 5 for detecting presence/absence of a broadcasting station transmitting a signal of the frequency, to make a discrimination (step ST4).

When both of the AFT signal S4 and the SYNC signal S2 are supplied at this point of time, the tuning control circuit 5 determines that the signal from the broadcasting station can be received, and the current tuning data is stored in the address of the station number "0" in the memory 6 (step ST5).

At the same time, a text data decoder circuit 10 decodes text information which is superposed on a blanking period of a composite video signal S1, so that a decoded teletext signal S5 is inputted in the tuning control circuit 5 (step ST6).

The tuning control circuit 5 extracts and discriminates broadcasting station information (station ID) from the teletext signal S5 (step ST7), and stores the same in the address of the station number "0" in the memory 6, similarly to data related to the frequency (step ST8).

Then, the address of the memory 6 is incremented by one to a station number "1" in order to store next tuning data, for entering a next tuning operation (step ST9).

If both of the AFT signal S4 and the SYNC signal S2 are not supplied at the step ST4, on the other hand, a discrimination is made as to whether or not the current frequency reaches the upper limit of the tuning frequency, i.e., whether or not the tuning is ended (step ST10).

If the current frequency does not reach the upper limit of the tuning frequency, the operation at the step ST3 is carried out again and the operations through the steps ST3 to ST9 are repeated until the upper limit of the tuning frequency is reached.

If the upper limit of the tuning frequency is reached at the step ST10, on the other hand, the process enters a sorting operation of the sorting control circuit 100. First, the sorting reference memory 61 in the memory 6 is activated, a station ID corresponding to a previously set position number is read (step ST11), and a station ID indicated by the position number pointer 110 is loaded in the first register 130 (step ST12).

Then, the tuning data memory 62 in the memory 6 is activated, a station ID corresponding to the station number is read, and a station ID indicated by the station number pointer 120 is loaded in the second register 140, so that the comparison part 150 compares the station IDs which are loaded in the first and second registers 130 and 140 respectively with each other and the determination part 160 makes a determination (step ST13).

When the station IDs match with each other at the step ST13, the station number is stored in the sorting result memory 63 in the memory 6 in correspondence to the position number (step ST14).

Then, the position number is incremented by one in the position number pointer 110 (step ST15).

Then, the station number pointer 120 determines whether or not the current station number reaches the upper limit (step ST16).

Also when the station IDs mismatch with each other at the step ST13, the operation at the step ST16 is carried out.

If the current station number does not reach the upper limit at the step ST15, the station number is incremented by one in the station number pointer 120, to carry out the operation following the step ST12 again (step ST17).

When the current station number reaches the upper limit, on the other hand, the position number pointer 110 determines whether or not all station IDs are sorted, i.e., whether or not the position number reaches the upper limit (step ST18).

If a determination is made at the step ST18 that all station IDs are sorted, the sorting operation is ended.

If all station IDs are not sorted, on the other hand, the position number pointer 110 increments the position number by one, to carry out the operation following the step ST12 again (step ST19).

The aforementioned automatic tuning apparatus A11 comprises the user input control circuit 200 so that the user sorts desired broadcasting stations along the sorting order set by him, whereby the broadcasting stations of the station IDs desired by the user are automatically set at the respective position numbers. Although a burden is imposed on the user in the point that he must set the position numbers and the broadcasting station information, a broadcasting station to be automatically tuned at the user's necessity can be set from receivable broadcasting stations in an area where receivable broadcasting stations are limited.

<Twelfth Embodiment>

Figure 36:
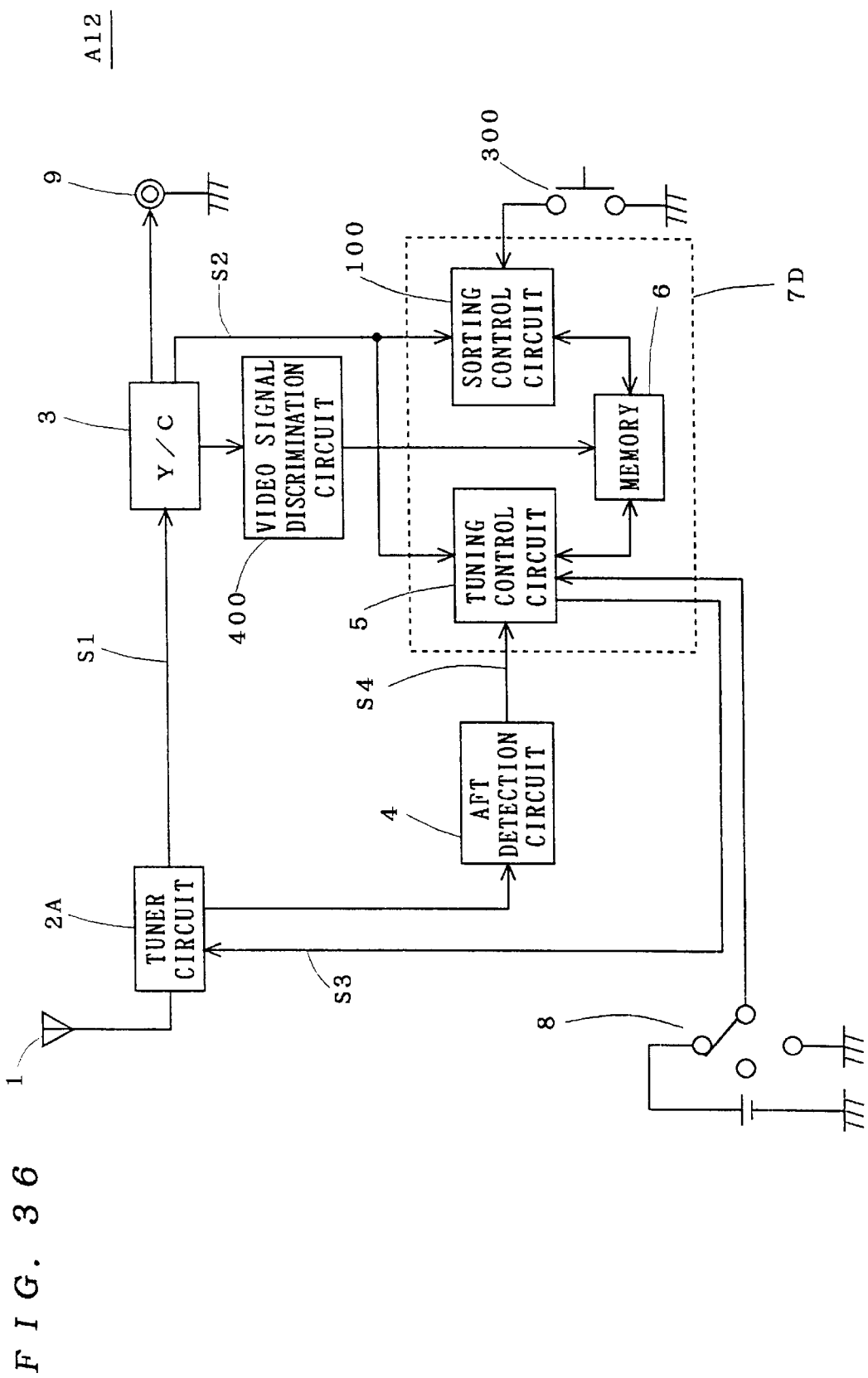
FIG. 36 illustrates the structure of an automatic tuning apparatus according to a twelfth embodiment of the present invention.

FIG. 36 shows the structure of an automatic tuning apparatus A12 for a VTR according to a twelfth embodiment of the present invention. Referring to FIG. 36, structural parts identical to those of the automatic tuning apparatus A10 described with reference to FIG. 28 are denoted by the same reference numerals, to omit redundant description.

Referring to FIG. 36, a video signal system discrimination circuit 400 receiving a SYNC signal S2 outputted from a video signal processing circuit 3 and a color burst signal (identic signal) S8 for discriminating to which one of the NTSC system, the PAL system, the SECAM system and the SECAM-L system the video signal system belongs is connected to a memory 6.

A system controller 7D is formed by a tuning control circuit 5, the memory 6 and a sorting control circuit 100.

The video signal system discrimination circuit 400 is formed by a SYNC discrimination circuit 11, which is shown in the automatic tuning apparatus A5 described with reference to the fifth embodiment of the present invention, for discriminating whether the picture signal system is the NTSC system or another system through the number of the SYNC signal, and a color discrimination circuit 13 receiving a color bust signal (identic signal) S8 which is one of outputs of the video signal processing circuit 3 for discriminating whether the video signal system is the PAL system or the SECAM system, and redundant description is omitted since the details of the SYNC discrimination circuit 11 and the color discrimination circuit 13 have already been described, while the output of the video signal system discrimination circuit 400 is referred to as "discrimination result of the video signal system" in the following description. Further, the sorting control circuit 100 employs the video signal system in place of broadcasting station information (station ID), and hence "station ID" in the automatic tuning apparatus A10 described with reference to the tenth embodiment of the present invention is re-read as "video signal system".

Figure 37:
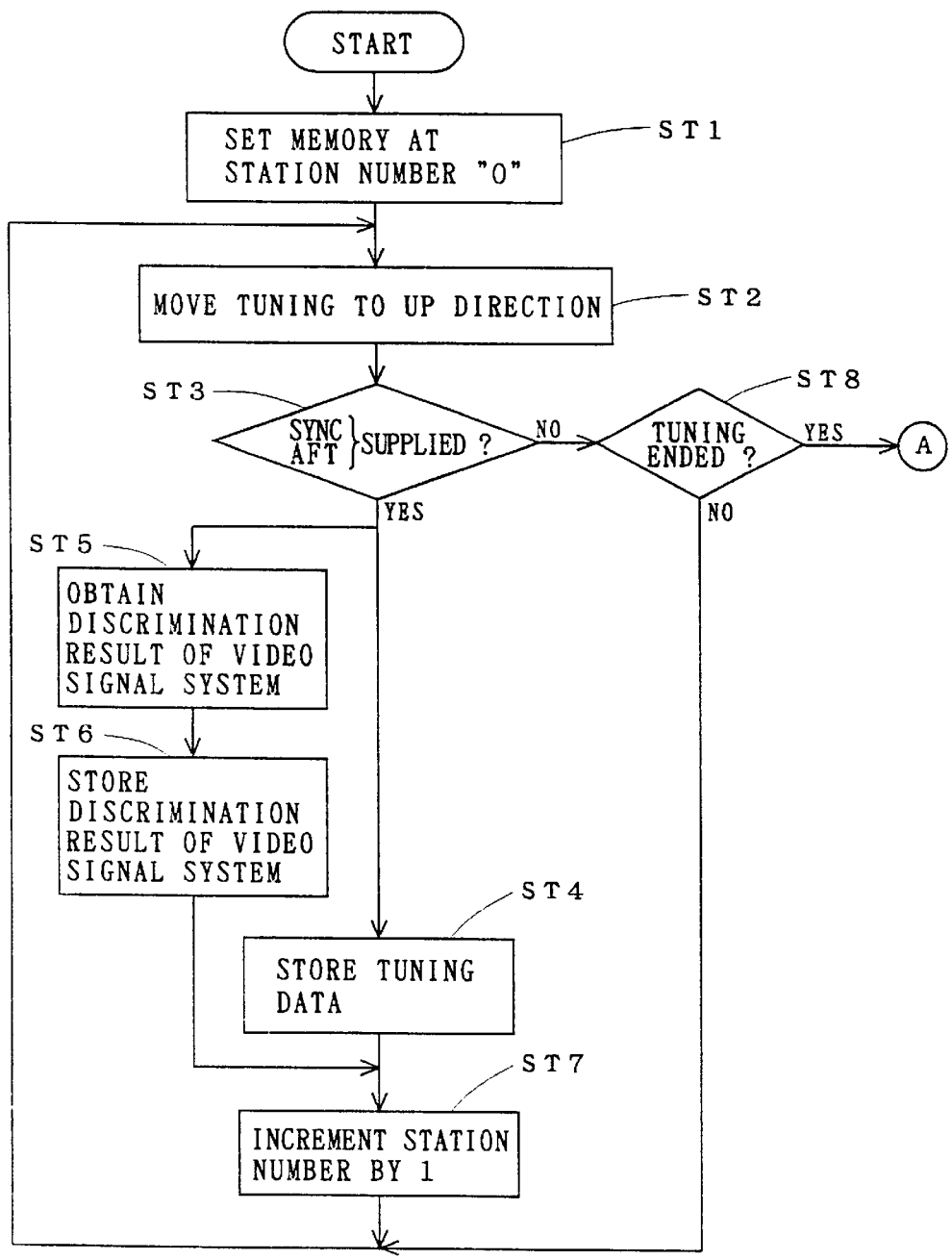
FIG. 37 is a flow chart for illustrating the operation of the automatic tuning apparatus according to the twelfth embodiment of the present invention.
Figure 38:
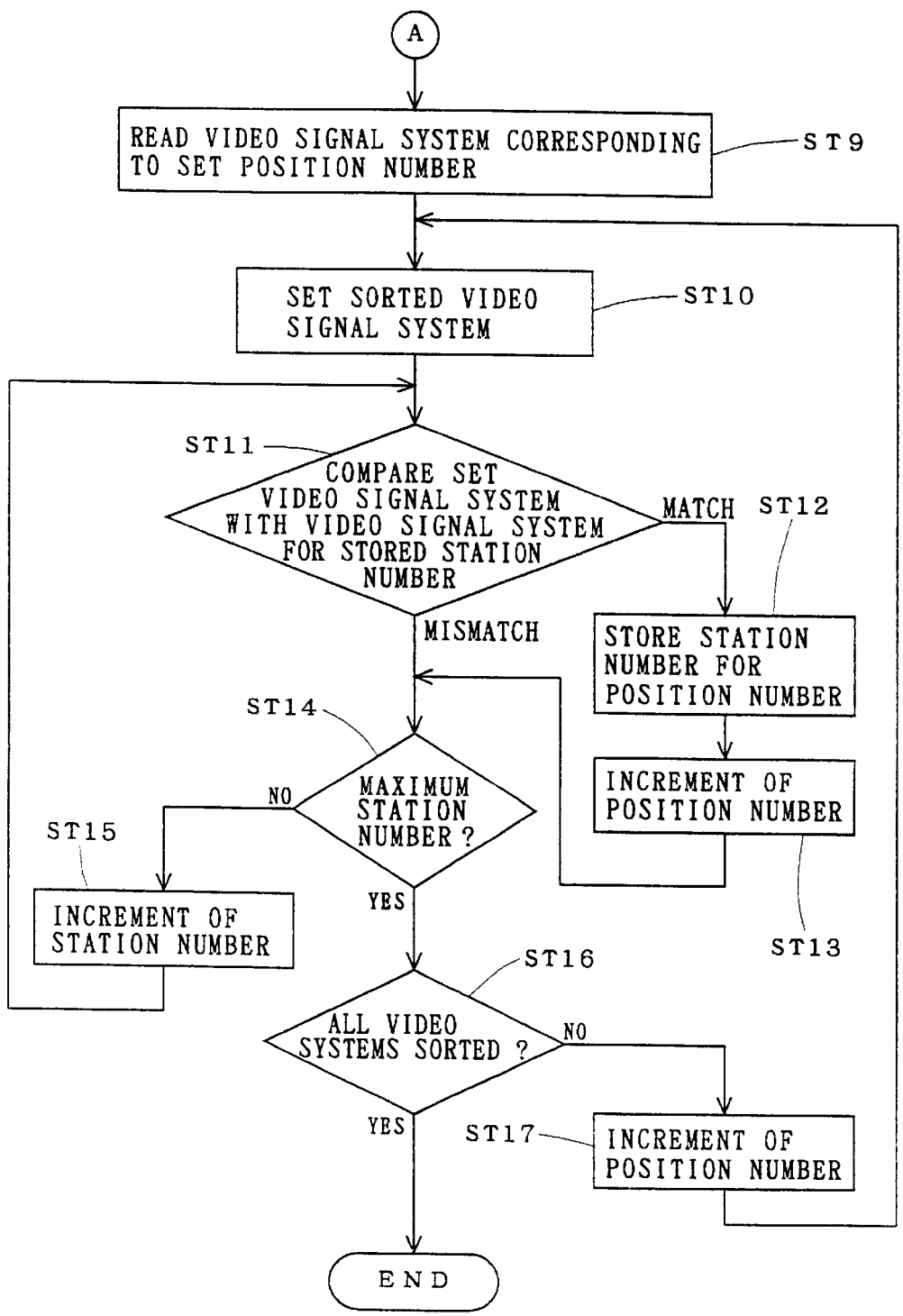
FIG. 38 is a flow chart for illustrating the operation of the automatic tuning apparatus according to the twelfth embodiment of the present invention.

With reference to flow charts shown in FIGS. 37 and 38, the operation of the automatic tuning apparatus A12 is now described. When a command for auto tuning is received from the user, the system controller 7D sets the memory address of the memory 6 at a station number "0" (step ST1).

Then, a tuning control signal S3 is transmitted to a tuner circuit 2A, to control the same in a direction for increasing the tuning frequency by a constant amount (step ST2). At this time, an AFr signal S4 which is outputted from an AFT detection circuit 4 and a SYNC signal S2 indicating presence/absence of a signal separated by the video signal processing circuit 3 are inputted in the tuning control circuit 5 for detecting presence/absence of a broadcasting station transmitting a signal of the frequency, to make a discrimination (step ST3).

When both of the AFT signal S4 and the SYNC signal S2 are supplied at this point of time, the tuning control circuit 5 determines that the signal from the broadcasting station can be received, and the current tuning data is stored in the address of the station number "0" in the memory 6 (step ST4).

At the same time, the discrimination result of the video signal system is obtained from the video signal system discrimination circuit 400 (step ST5).

The discrimination result of the video signal system is stored in the address of the station number "0" in the memory 6, similarly to data related to the frequency (step ST6).

Then, the address of the memory 6 is incremented by one to a station number "1" in order to store next tuning data for entering a next tuning operation (step ST7).

If both of the AFT signal S4 and the SYNC signal S2 are not supplied at the step ST3, on the other hand, a discrimination is made as to whether or not the current frequency reaches the upper limit of the tuning frequency, i.e., whether or not the tuning is ended (step ST8). If the current frequency does not reach the upper limit of the tuning frequency, the operation at the step ST2 is carried out again and the operations through the steps ST2 to ST7 are repeated until the upper limit of the tuning frequency is reached.

If the upper limit of the tuning frequency is reached at the step ST8, the process enters a sorting operation of the sorting control circuit 100. First, a sorting reference memory 61 in the memory 6 is activated, a video signal system corresponding to a previously set position number is read (step ST9), and a video signal system indicated by a position number pointer 110 is loaded in a first register 130 (step ST10).

Then, a tuning data memory 62 in the memory 6 is activated, a video signal system corresponding to the station number is read, and a video signal system indicated by a station number pointer 120 is loaded in a second register 140, so that a comparison part 150 compares the video signal systems which are loaded in the first and second registers 130 and 140 respectively with each other and a determination part 160 makes a determination (step ST11).

When the video signal systems match with each other at the step ST11, the station number is stored in a sorting result memory 63 in the memory 6 in correspondence to the position number (step ST12).

Then, the position number is incremented by one in the position number pointer 110 (step ST13).

Then, the station number pointer 120 determines whether or not the current station number reaches the upper limit (step ST14).

Also when the video signal systems mismatch with each other at the step ST11, the operation at the step ST14 is carried out.

If the current station number does not reach the upper limit at the step ST14, the station number is incremented by one in the station number pointer 120, to carry out the operation following the step ST11 again (step ST15).

When the current station number reaches the upper limit, on the other hand, the position number pointer 110 determines whether or not all video signal systems are sorted, i.e., whether or not the position number reaches the upper limit (step ST16).

If a determination is made at the step ST16 that all video signal systems are sorted, the sorting operation is ended.

If all video signal systems are not sorted, on the other hand, the position number pointer 110 increments the position number by one, to carry out the operation following the step ST12 again (step ST17).

The aforementioned automatic tuning apparatus A12 comprises the sorting control circuit 100 and the video signal system discrimination circuit 400 so that a broadcasting station of a predetermined video signal system is automatically set for each position number by a sorting operation and the user may not set the video signal system in correspondence to the position number, whereby the burden imposed on the user can be reduced.

<Thirteenth Embodiment>

Figure 39:
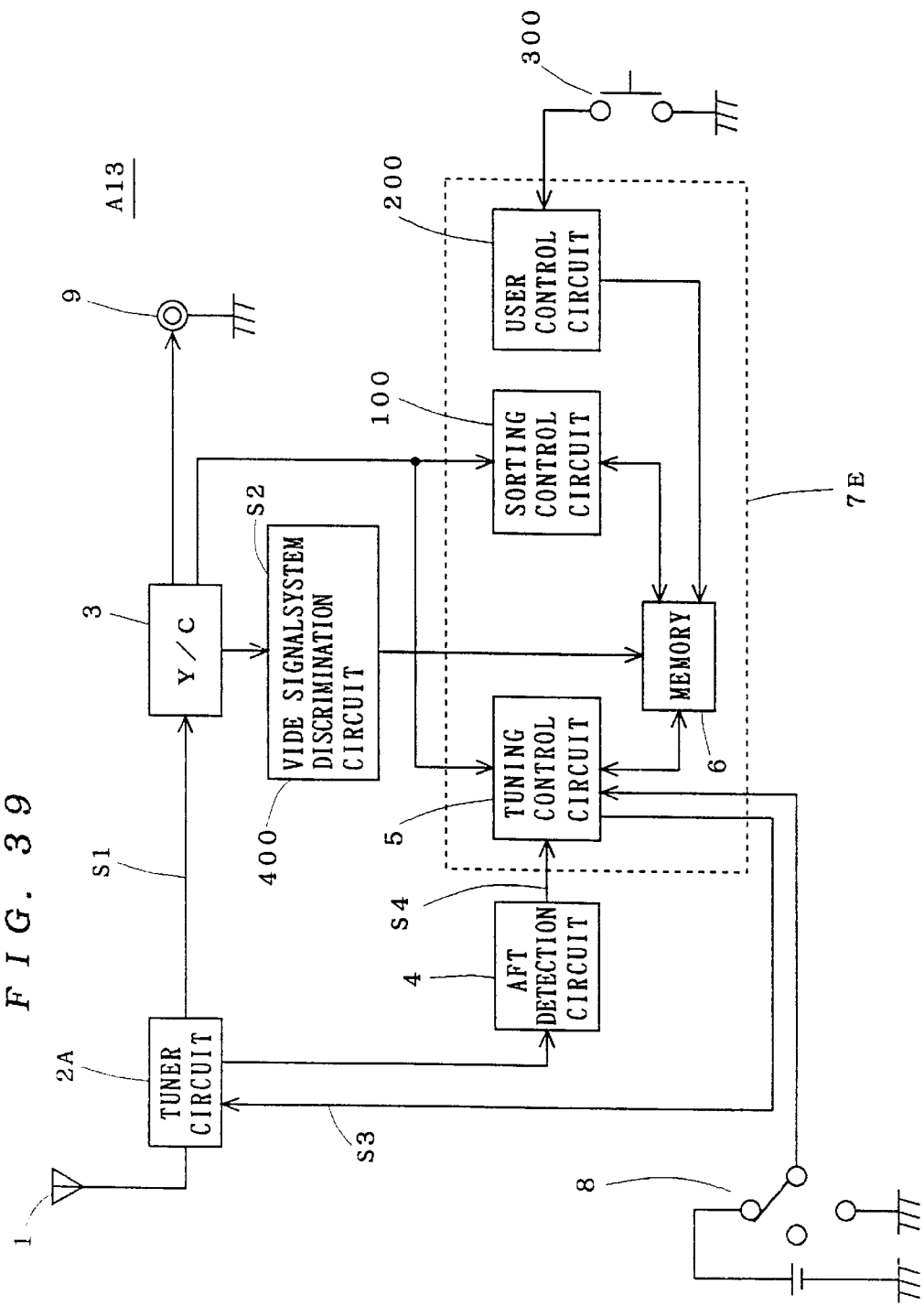
FIG. 39 illustrates a partial structure of an automatic tuning apparatus according to a thirteenth embodiment of the present invention.

FIG. 39 shows the structure of an automatic tuning apparatus A13 for a VTR according to a thirteenth embodiment of the present invention. Referring to FIG. 39, structural parts identical to those of the automatic tuning apparatus A12 described with reference to FIG. 36 are denoted by the same reference numerals, to omit redundant description.

Referring to FIG. 39, a user input control circuit 200 for the user for making setting is connected to a memory 6, and a system controller 7E is formed by a tuning control circuit 5, the memory 6, a sorting control circuit 100 and the user input control circuit 200. A key input unit 300 for the user for inputting setting is connected to the user input control circuit 200. The structures of the user input control circuit 200 and the key input unit 300 have been described with reference to the eleventh embodiment, and hence redundant description is omitted. Further, the sorting control circuit 100 and the user input control circuit 200 employ the video signal system in place of broadcasting station information (station ID), and hence "station ID" in the automatic tuning apparatus A11 described with reference to the eleventh embodiment of the present invention is re-read as "video signal system".

Figure 40:
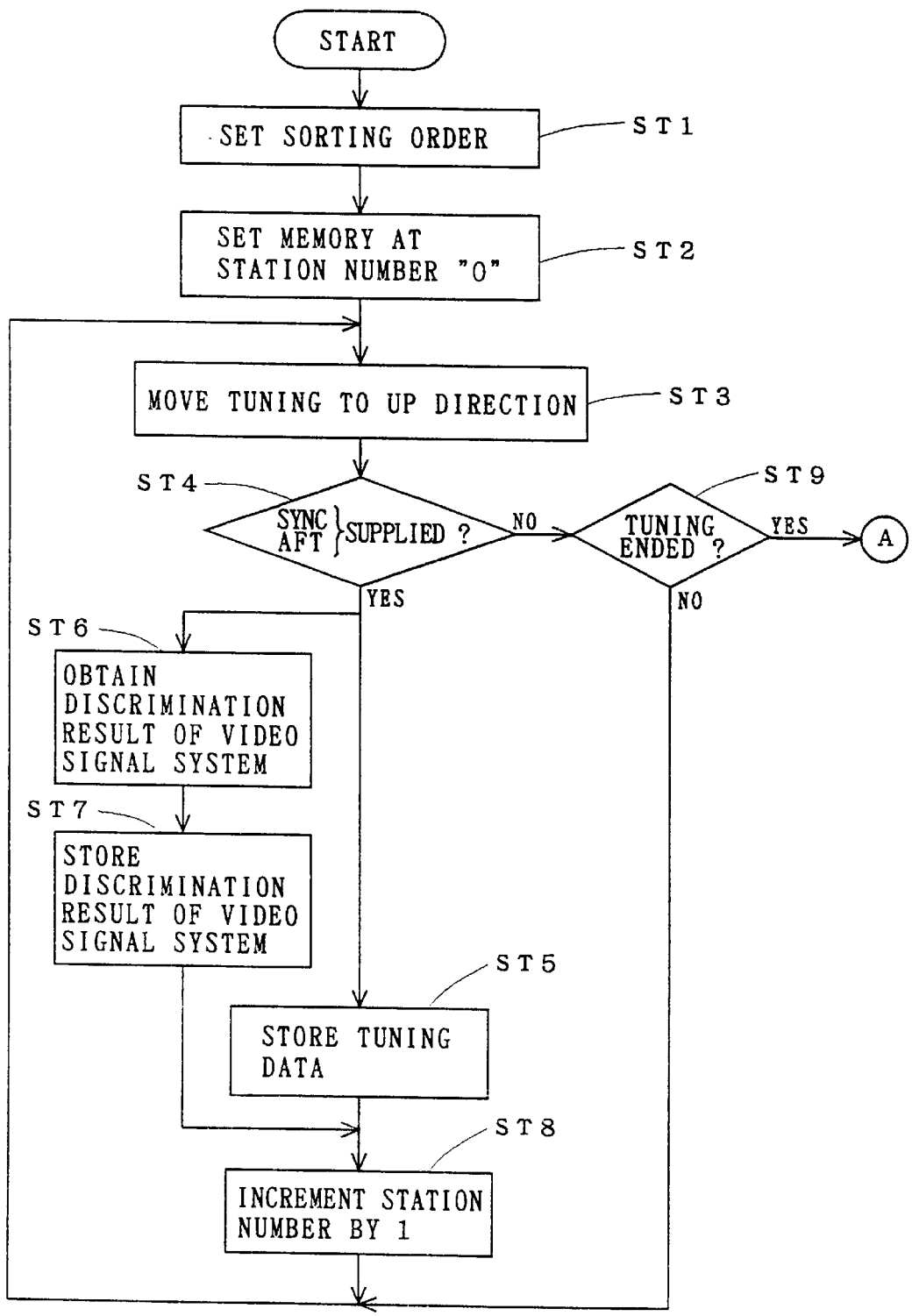
FIG. 40 is a flow chart for illustrating the operation of the automatic tuning apparatus according to the thirteenth embodiment of the present invention.
Figure 41:
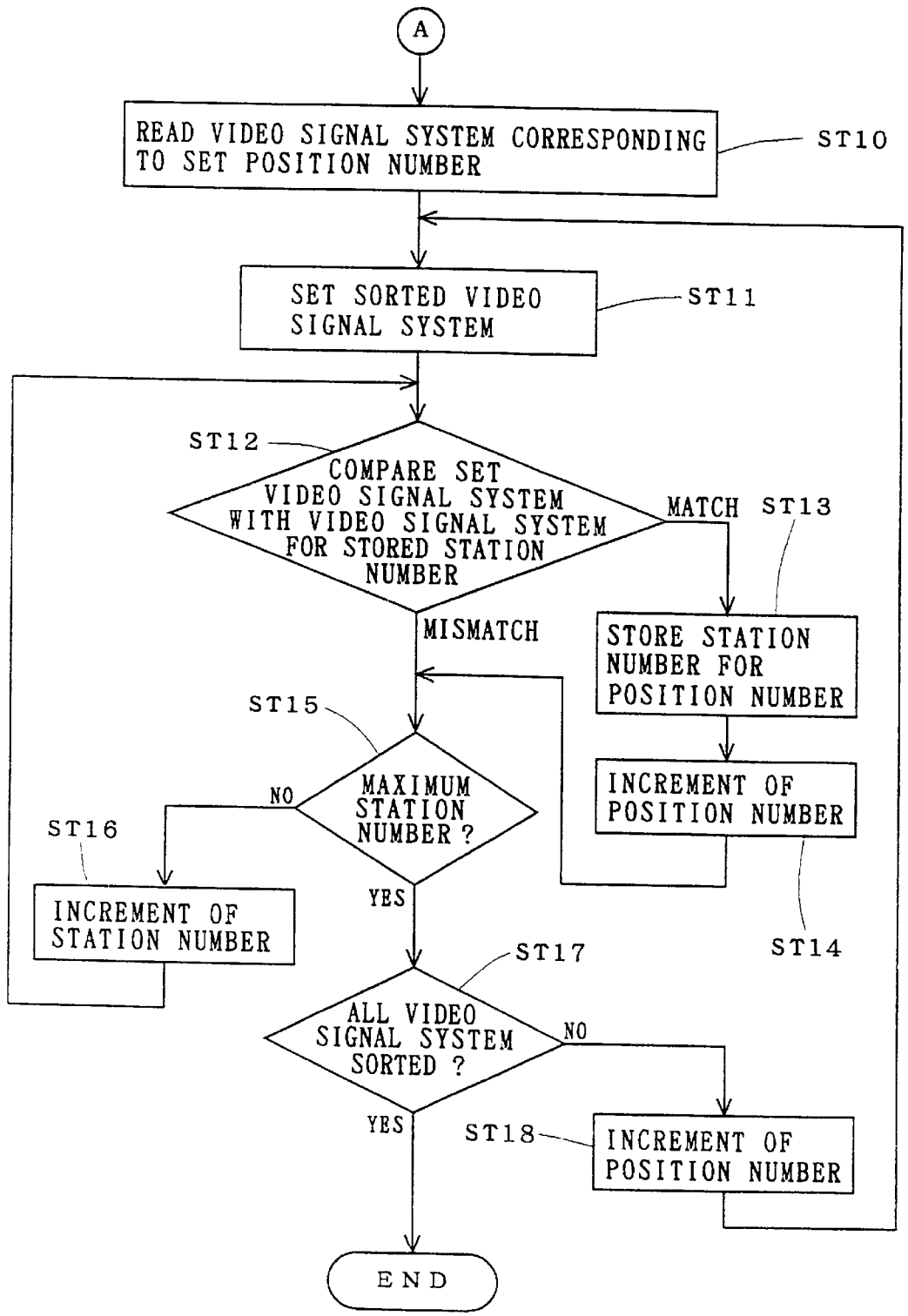
FIG. 41 is a flow chart for illustrating the operation of the automatic tuning apparatus according to the thirteenth embodiment of the present invention.

With reference to flow charts shown in FIGS. 40 and 41, the operation of the automatic tuning apparatus A13 is now described. First, the user inputs a video signal system through the key input unit 300 in correspondence to a position number, and sets the sorting order (step ST1).

Then, when a command for auto tuning is received, the system controller 7E sets the memory address of the memory 6 at a station number "0" (step ST2).

Then, a tuning control signal S3 is transmitted to a tuner circuit 2A, to control the same in a direction for increasing the tuning frequency by a constant amount (step ST3). At this time, an AFT signal S4 which is outputted from an AFT detection circuit 4 and a SYNC signal S2 indicating presence/absence of a signal separated by a video signal processing circuit 3 are inputted in the tuning control circuit 5 for detecting presence/absence of a broadcasting station transmitting a signal of the frequency, to make a discrimination (step ST4).

When both of the AFT signal S4 and the SYNC signal S2 are supplied at this point of time, the tuning control circuit 5 determines that the signal from the broadcasting station can be received, and the current tuning data is stored in the address of the station number "0" in the memory 6 (step ST5).

At the same time, the discrimination result of the video signal system is obtained from the video signal system discrimination circuit 400 (step ST6).

The discrimination result of the video signal system is stored in the address of the station number "0" in the memory 6, similarly to data related to the frequency (step ST7).

Then, the address of the memory 6 is incremented by one to a station number "1" in order to store next tuning data, for entering a next tuning operation (step ST8).

If both of the AFT signal S4 and the SYNC signal S2 are not supplied at the step ST4, on the other hand, a discrimination is made as to whether or not the current frequency reaches the upper limit of the tuning frequency, i.e., whether or not the tuning is ended (step ST8). If the current frequency does not reach the upper limit of the tuning frequency, the operation at the step ST2 is carried out again and the operations through the steps ST3 to ST8 are repeated until the upper limit of the tuning frequency is reached.

If the upper limit of the tuning frequency is reached at the step ST9, the process enters a sorting operation of the sorting control circuit 100. First, a sorting reference memory 61 in the memory 6 is activated, a video signal system corresponding to a previously set position number is read (step ST10), and a video signal system indicated by a position number pointer 110 is loaded in a first register 130 (step ST11).

Then, a tuning data memory 62 in the memory 6 is activated, a video signal system corresponding to the station number is read, and a video signal system indicated by a station number pointer 120 is loaded in a second register 140, so that a comparison part 150 compares the video signal systems which are loaded in the first and second registers 130 and 140 respectively with each other and a determination part 160 makes a determination (step ST12).

When the video signal systems match with each other at the step ST12, the station number is stored in a sorting result memory 63 in the memory 6 in correspondence to the position number (step ST13).

Then, the position number is incremented by one in the position number pointer 110 (step ST14).

Then, the station number pointer 120 determines whether or not the current station number reaches the upper limit (step ST15).

Also when the video signal systems mismatch with each other at the step ST12, the operation at the step ST15 is carried out.

If the current station number does not reach the upper limit at the step ST15, the station number is incremented by one in the station number pointer 120, to carry out the operation following the step ST12 again (step ST16).

When the current station number reaches the upper limit, on the other hand, the position number pointer 110 determines whether or not all video signal systems are sorted, i.e., whether or not the position number reaches the upper limit (step ST17).

If a determination is made at the step ST17 that all video signal systems are sorted, the sorting operation is ended.

If all video signal systems are not sorted, on the other hand, the position number pointer 110 increments the position number by one, to carry out the operation following the step ST11 again (step ST18).

The aforementioned automatic tuning apparatus A13 comprises the user input control circuit 200 in addition to the sorting control circuit 100 and the video signal system discrimination circuit 400, whereby the broadcasting stations desired by the user are automatically set at the respective position numbers by sorting the broadcasting stations along the sorting order set by the user. Although a burden is imposed on the user in the point that he must set the position numbers and the video signal systems, a broadcasting station of a video signal system which is responsive to the user's necessity can be set in an area where various video signal systems are mixed.

<Fourteenth Embodiment>

Figure 42:
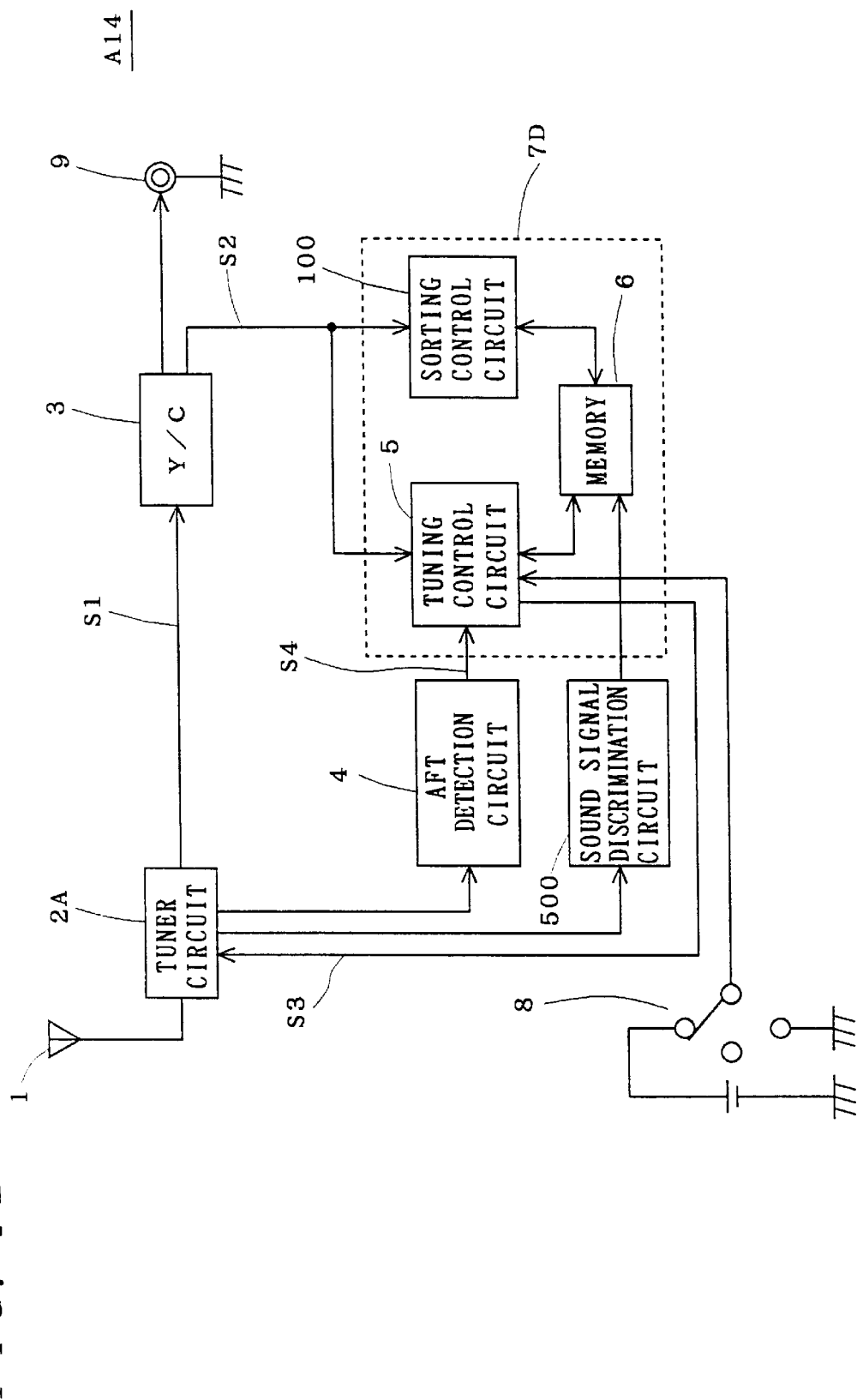
FIG. 42 illustrates the structure of an automatic tuning apparatus according to a fourteenth embodiment of the present invention.

FIG. 42 shows the structure of an automatic tuning apparatus A14 for a VTR according to a fourteenth embodiment of the present invention. Referring to FIG. 42, structural parts identical to those of the automatic tuning apparatus A10 described with reference to FIG. 28 are denoted by the same reference numerals, to omit redundant description. In the automatic tuning apparatus A14, a sound signal system discrimination circuit 500 which is connected to a tuner circuit 2A is provided in place of the text data decoder circuit 10 of the automatic tuning apparatus A10 shown in FIG. 28.

The sound signal system discrimination circuit 500 is formed by sound signal processing means which comprises the sound processor 60 of the automatic tuning apparatus A8 described with reference to FIG. 22, or the sound demodulation circuit 70, the VCO 80 and the sound detection circuit 90 of the automatic tuning apparatus A9 described with reference to FIG. 25. Redundant description is omitted since the details thereof have already been explained, and the output of the sound signal system discrimination circuit 500 is called "discrimination result of the sound system" in the following description. Further, a sorting control circuit 100 employs the sound system in place of broadcasting station information (station ID), and hence "station ID" in the automatic tuning apparatus A10 described with reference to the tenth embodiment of the present invention is re-read as "sound system".

Figure 43:
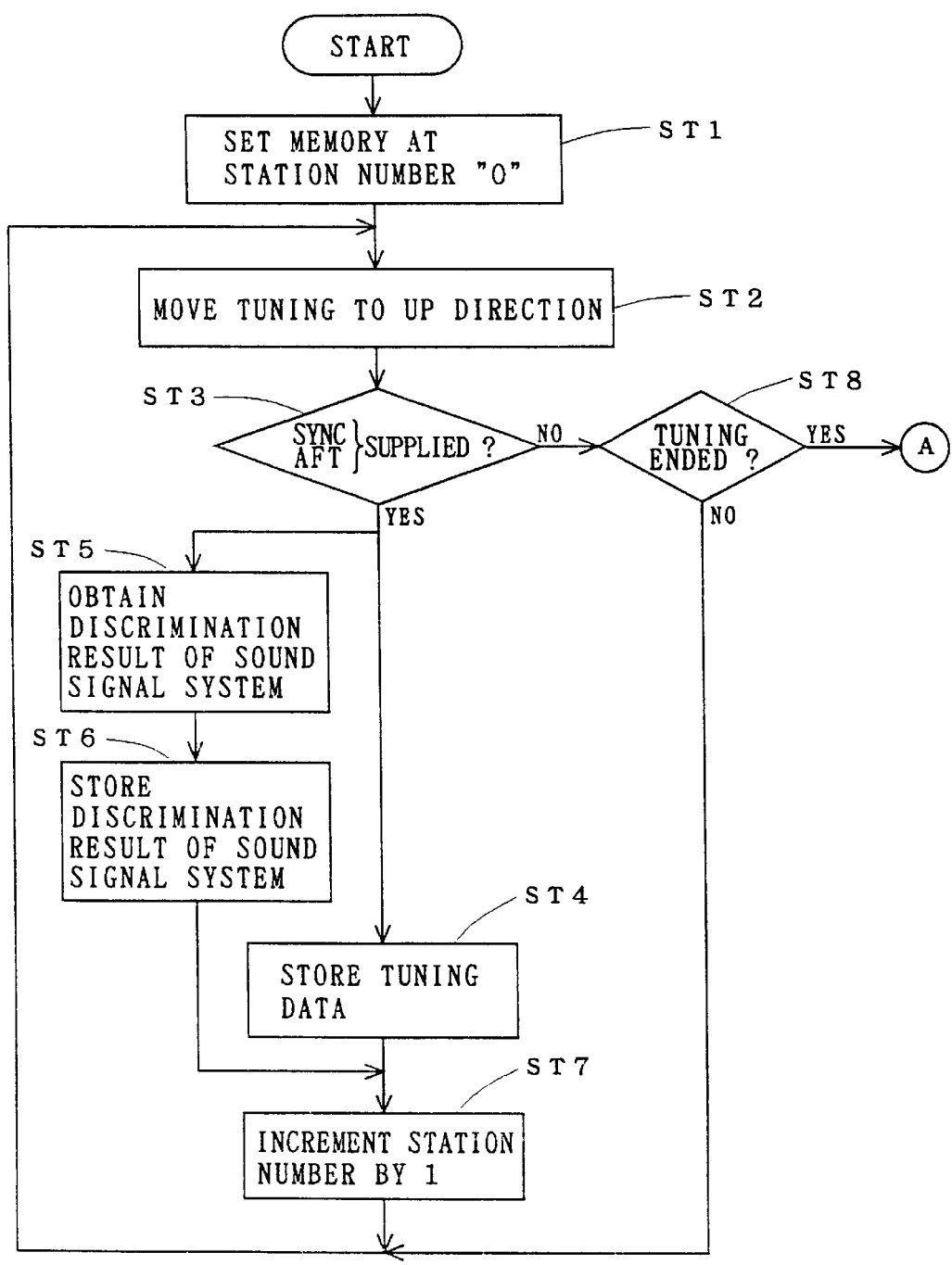
FIG. 43 is a flow chart for illustrating the operation of the automatic tuning apparatus according to the fourteenth embodiment of the present invention.
Figure 44:
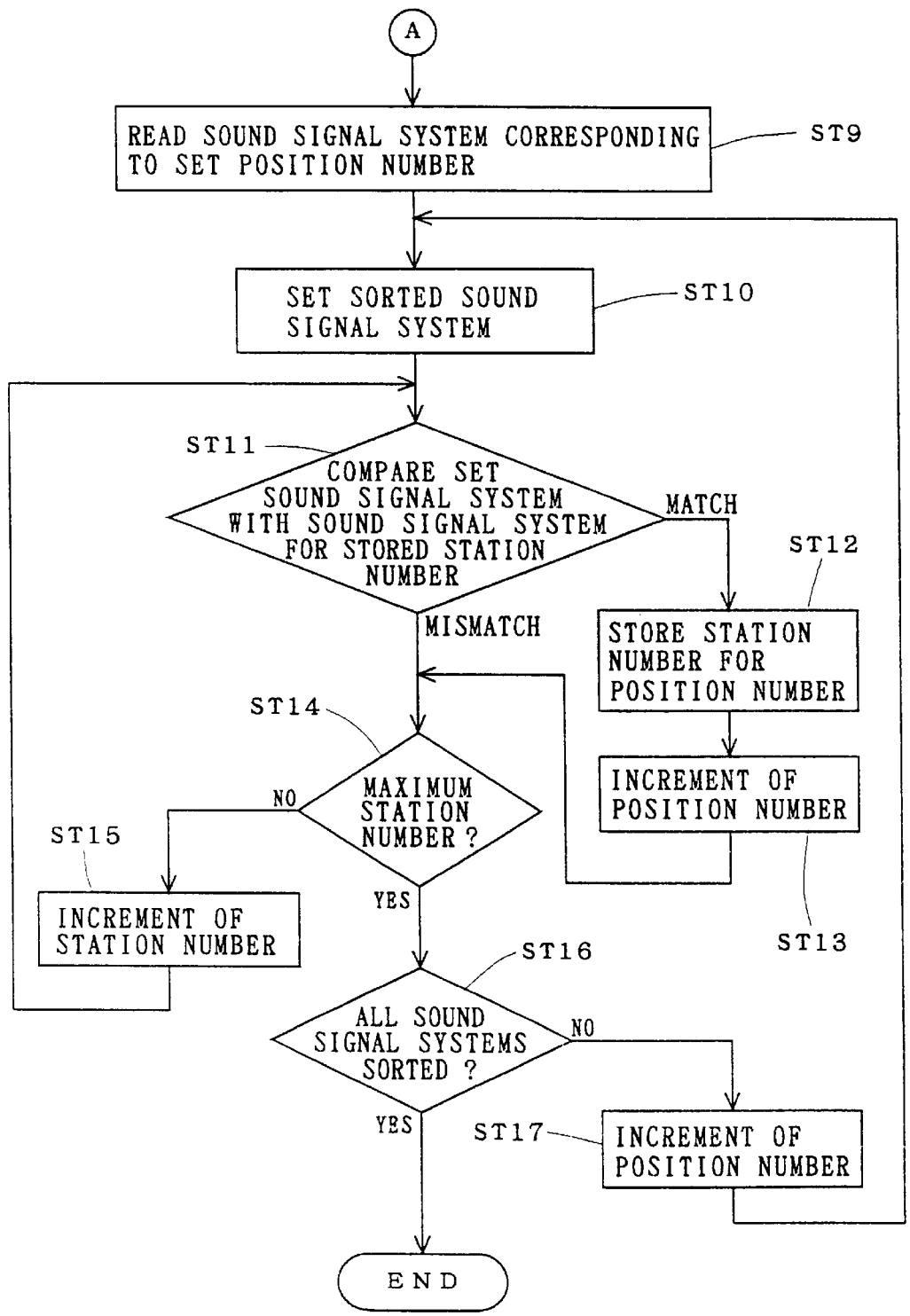
FIG. 44 is a flow chart for illustrating the operation of the automatic tuning apparatus according to the fourteenth embodiment of the present invention.

With reference to flow charts shown in FIGS. 43 and 44, the operation of the automatic tuning apparatus A14 is now described. When a command for auto tuning is received from the user, a system controller 7D sets the memory address of a memory 6 at a station number "0" (step ST1).

Then, a tuning control signal S3 is transmitted to the tuner circuit 2A, to control the same in a direction for increasing the tuning frequency by a constant amount (step ST2). At this time, an AFT signal S4 which is outputted from an AFT detection circuit 4 and a SYNC signal S2 indicating presence/absence of a signal separated by a video signal processing circuit 3 are inputted in a tuning control circuit 5 for detecting presence/absence of a broadcasting station transmitting a signal of the frequency, to make a discrimination (step ST3).

When both of the AFT signal S4 and the SYNC signal S2 are supplied at this point of time, the tuning control circuit 5 determines that the signal from the broadcasting station can be received, and the current tuning data is stored in the address of the station number "0" in the memory 6 (step ST4).

At the same time, the discrimination result of the sound system is obtained from the sound signal system discrimination circuit 500 (step ST5).

The discrimination result of the sound system is stored in the address of the station number "0" in the memory 6, similarly to data related to the frequency (step ST6).

Then, the address of the memory 6 is incremented by one to a station number "1" in order to store next tuning data, for entering a next tuning operation (step ST7).

If both of the AFT signal S4 and the SYNC signal S2 are not supplied at the step ST3, on the other hand, a discrimination is made as to whether or not the current frequency reaches the upper limit of the tuning frequency, i.e., whether or not the tuning is ended (step ST8). If the current frequency does not reach the upper limit of the tuning frequency, the operation at the step ST2 is carried out again and the operations through the steps ST2 to ST7 are repeated until the upper limit of the tuning frequency is reached.

If the upper limit of the tuning frequency is reached at the step ST8, on the other hand, the process enters a sorting operation of the sorting control circuit 100. First, a sorting reference memory 61 in the memory 6 is activated, a sound system corresponding to a previously set position number is read (step ST9), and a sound system indicated by a position number pointer 110 is loaded in a first register 130 (step ST10).

Then, a tuning data memory 62 in the memory 6 is activated, a sound system corresponding to the station number is read, and a sound system indicated by a station number pointer 120 is loaded in a second register 140, so that a comparison part 150 compares the sound systems which are loaded in the first and second registers 130 and 140 respectively with each other and a determination part 160 makes a determination (step ST11).

When the sound systems match with each other at the step ST11, the station number is stored in a sorting result memory 63 in the memory 6 in correspondence to the position number (step ST12).

Then, the position number is incremented by one in the position number pointer 110 (step ST13).

Then, the station number pointer 120 determines whether or not the current station number reaches the upper limit (step ST14).

Also when the sound systems mismatch with each other at the step ST11, the operation at the step ST14 is carried out.

If the current station number does not reach the upper limit at the step ST14, the station number is incremented by one in the station number pointer 120, to carry out the operation following the step ST11 again (step ST15).

When the current station number reaches the upper limit, on the other hand, the position number pointer 110 determines whether or not all sound systems are sorted, i.e., whether or not the position number reaches the upper limit (step ST16).

If a determination is made at the step ST16 that all sound systems are sorted, the sorting operation is ended.

If all sound systems are not sorted, on the other hand, the position number pointer 110 increments the position number by one, to carry out the operation following the step ST10 again (step ST17).

The aforementioned automatic tuning apparatus A14 comprises the sorting control circuit 100 and the sound signal system discrimination circuit 500 so that a broadcasting station of a predetermined sound system is automatically set for each position number by a sorting operation. When broadcasting stations of different sound systems of other countries are mixed around the border or the like, a broadcasting station (e.g., a broadcasting station of the user's country) which is necessary for the user can be automatically received.

<Fifteenth Embodiment>

Figure 45:
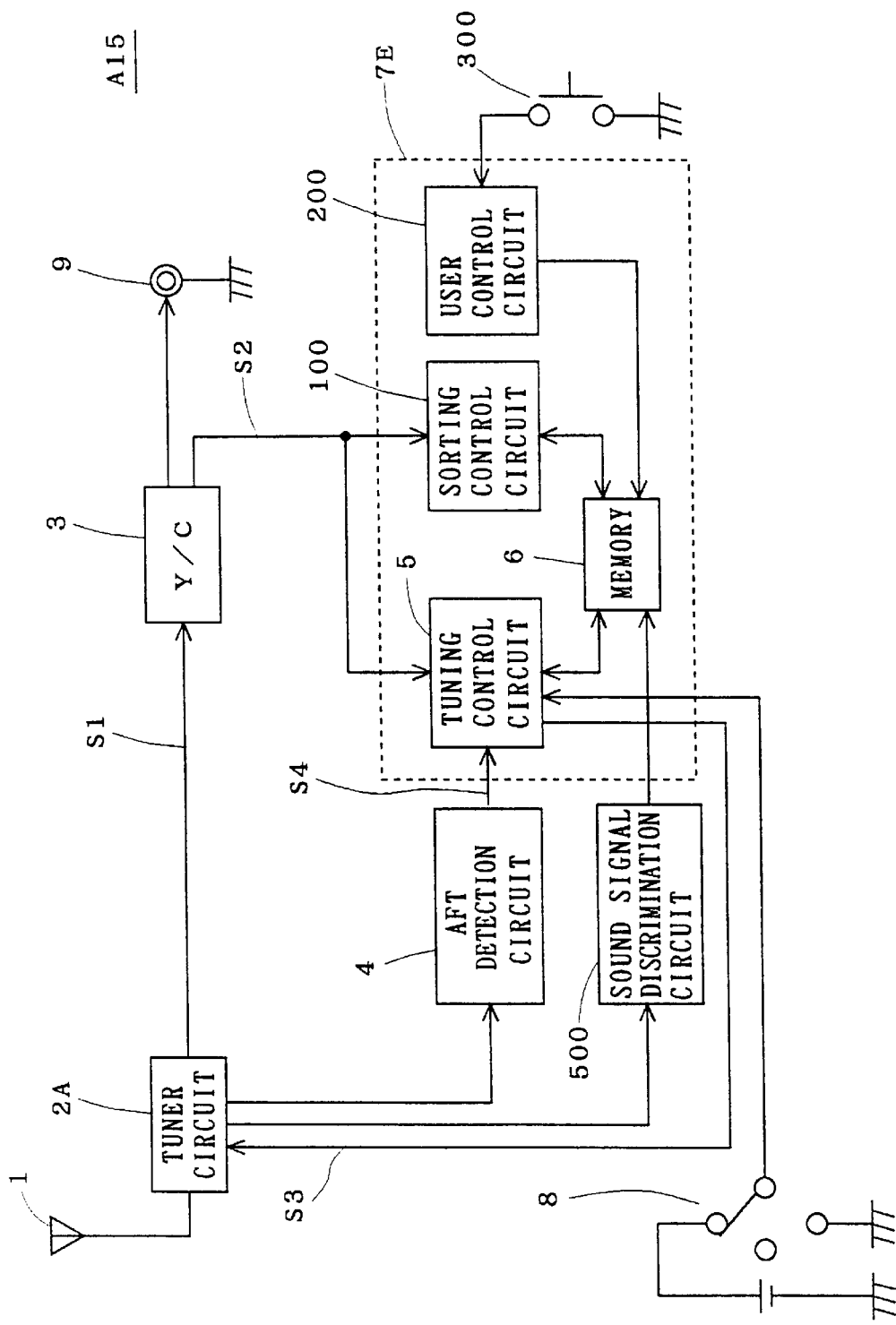
FIG. 45 illustrates the structure of an automatic tuning apparatus according to a fifteenth embodiment of the present invention.

FIG. 45 shows the structure of an automatic tuning apparatus A15 for a VTR according to a fifteenth embodiment of the present invention. Referring to FIG. 45, structural parts identical to those of the automatic tuning apparatus A14 described with reference to FIG. 42 are denoted by the same reference numerals, to omit redundant description.

Referring to FIG. 45, a user input control circuit 200 for the user for making setting is connected to a memory 6, and a system controller 7E is formed by a tuning control circuit 5, the memory 6, a sorting control circuit 100 and the user input control circuit 200. A key input unit 300 for the user for inputting setting is connected to the user input control circuit 200. The structures of the user input control circuit 200 and the key input unit 300 have been described with reference to the eleventh embodiment, and hence redundant description is omitted. Further, the sorting control circuit 100 and the user input control circuit 200 employ the sound system in place of broadcasting station information (station ID), and hence "station ID" in the automatic tuning apparatus A11 described with reference to the eleventh embodiment of the present invention is re-read as "sound system".

Figure 46:
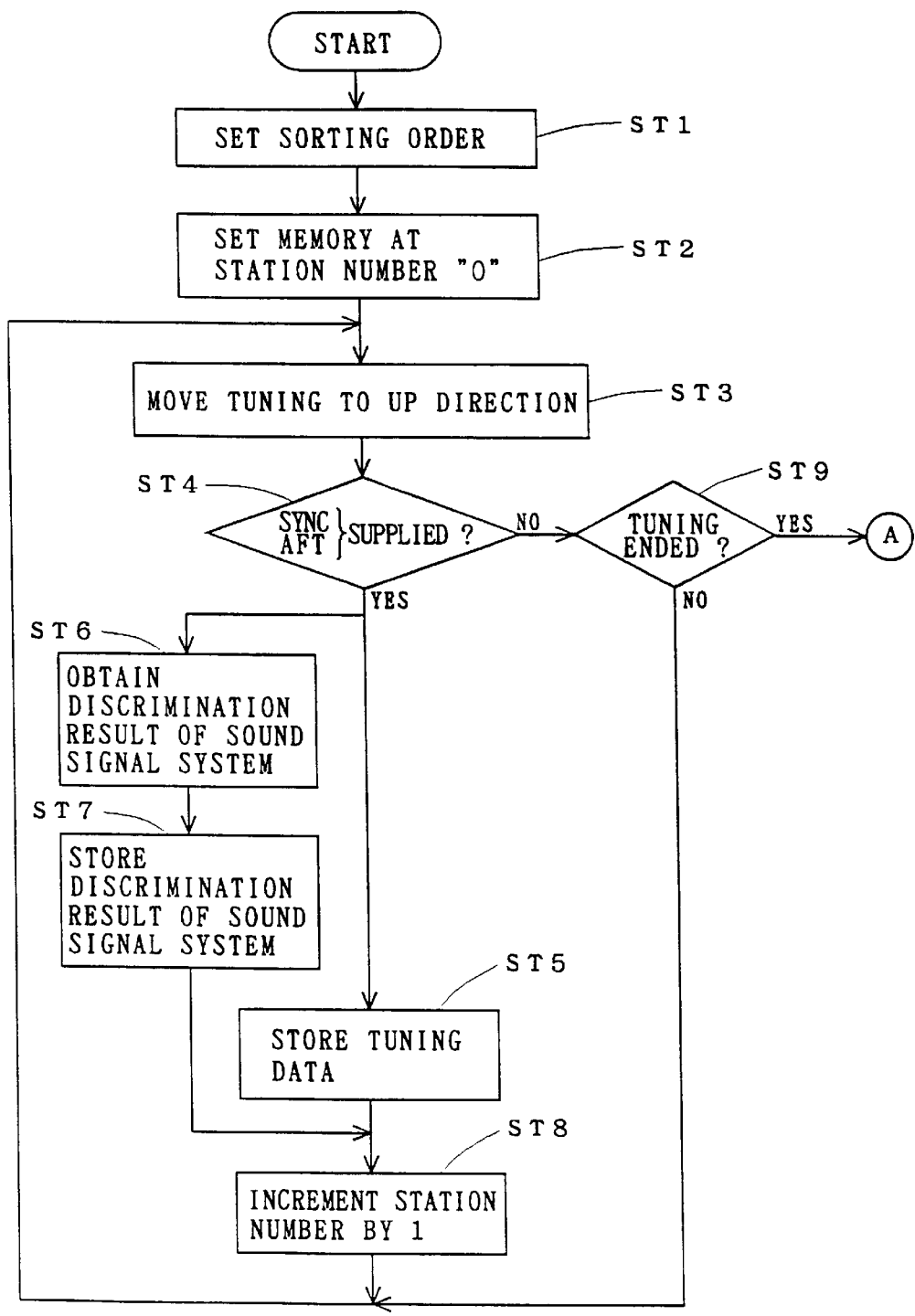
FIG. 46 is a flow chart for illustrating the operation of the automatic tuning apparatus according to the fifteenth embodiment of the present invention.
Figure 47:
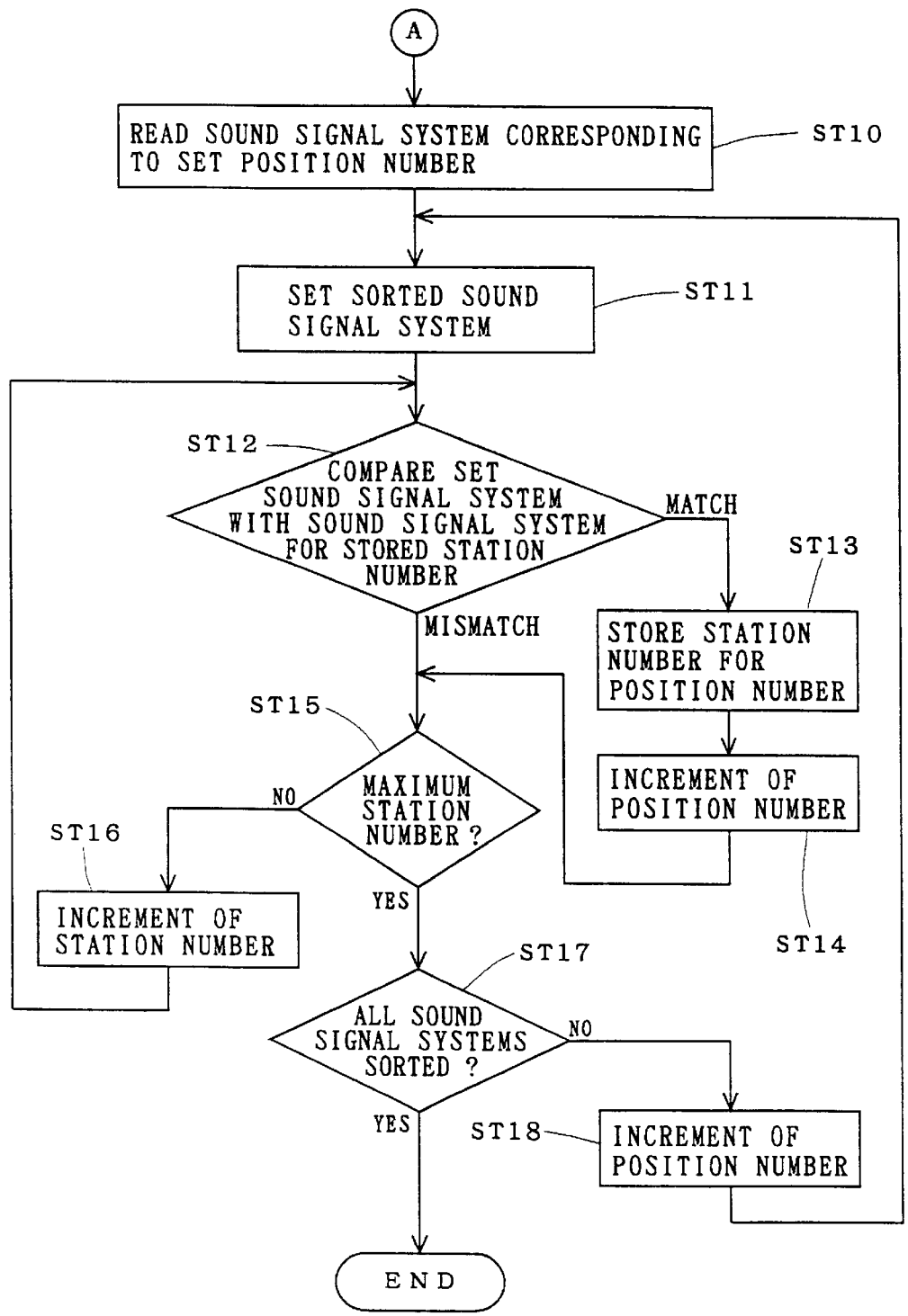
FIG. 47 is a flow chart for illustrating the operation of the automatic tuning apparatus according to the fifteenth embodiment of the present invention.

With reference to flow charts shown in FIGS. 46 and 47, the operation of the automatic tuning apparatus A15 is now described. First, the user inputs a sound system through the key input unit 300 in correspondence to the position number, and sets the sorting order (step ST1).

Then, when a command for auto tuning is received, the system controller 7E sets the memory address of the memory 6 at a station number "0" (step ST2).

Then, a tuning control signal S3 is transmitted to a tuner circuit 2A, to control the same in a direction for increasing the tuning frequency by a constant amount (step ST3). At this time, an AFT signal S4 which is outputted from an AFT detection circuit 4 and a SYNC signal S2 indicating presence/absence of a signal separated by a video signal processing circuit 3 are inputted in the tuning control circuit 5 for detecting presence/absence of a broadcasting station transmitting a signal of the frequency, to make a discrimination (step ST4).

When both of the AFT signal S4 and the SYNC signal S2 are supplied at this point of time, the tuning control circuit 5 determines that the signal from the broadcasting station can be received, and the current tuning data is stored in the address of the station number "0" in the memory 6 (step ST5).

At the same time, the discrimination result of the sound system is obtained from the sound signal system discrimination circuit 500 (step ST6).

The discrimination result of the sound system is stored in the address of the station number "0" in the memory 6 similarly to data related to the frequency (step ST7).

Then, the address of the memory 6 is incremented by one to a station number "1" in order to store next tuning data, for entering a next tuning operation (step ST8).

If both of the AFT signal S4 and the SYNC signal S2 are not supplied at the step ST4, on the other hand, a discrimination is made as to whether or not the current frequency reaches the upper limit of the tuning frequency, i.e., whether or not the tuning is ended (step ST9). If the current frequency does not reach the upper limit of the tuning frequency, the operation at the step ST3 is carried out again and the operations through the steps ST3 to ST8 are repeated until the upper limit of the tuning frequency is reached.

If the upper limit of the tuning frequency is reached at the step ST9, the process enters a sorting operation of the sorting control circuit 100. First, a sorting reference memory 61 in the memory 6 is activated, a sound system corresponding to a previously set position number is read (step ST10), and a sound system indicated by a position number pointer 110 is loaded in a first register 130 (step ST11).

Then, a tuning data memory 62 in the memory 6 is activated, a sound system corresponding to the station number is read, and a sound system indicated by a station number pointer 120 is loaded in a second register 140, so that a comparison part 150 compares the sound systems which are loaded in the first and second registers 130 and 140 respectively with each other and a determination part 160 makes a determination (step ST12).

When the sound systems match with each other at the step ST12, the station number is stored in a sorting result memory 63 in the memory 6 in correspondence to the position number (step ST13).

Then, the position number is incremented by one in the position number pointer 110 (step ST14).

Then, the station number pointer 120 determines whether or not the current station number reaches the upper limit (step ST15).

Also when the sound systems mismatch with each other at the step ST12, the operation at the step ST15 is carried out.

If the current station number does not reach the upper limit at the step ST15, the station number is incremented by one in the station number pointer 120, to carry out the operation following the step ST11 again (step ST16).

When the current station number reaches the upper limit, on the other hand, the position number pointer 110 determines whether or not all sound systems are sorted, i.e., whether or not the position number reaches the upper limit (step ST17).

If a determination is made at the step ST17 that all sound systems are sorted, the sorting operation is ended.

If all sound systems are not sorted, on the other hand, the position number pointer 110 increments the position number by one, to carry out the operation following the step ST11 again (step ST18).

The aforementioned automatic tuning apparatus A15 comprises the user input control circuit 200 in addition to the sorting control circuit 100 and the sound signal system discrimination circuit 500 so that a broadcasting station of a sound system desired by the user is automatically set for each position number by carrying out a sorting operation along the sorting order set by the user. Although a burden is imposed on the user in the point that he must set the position numbers and the sound systems, only a broadcasting station (e.g., a broadcasting station of the user's country) which is necessary for the user can be automatically set when broadcasting stations of different sound systems of other countries are mixed around the border or the like.

<Sixteenth Embodiment>

Figure 48:
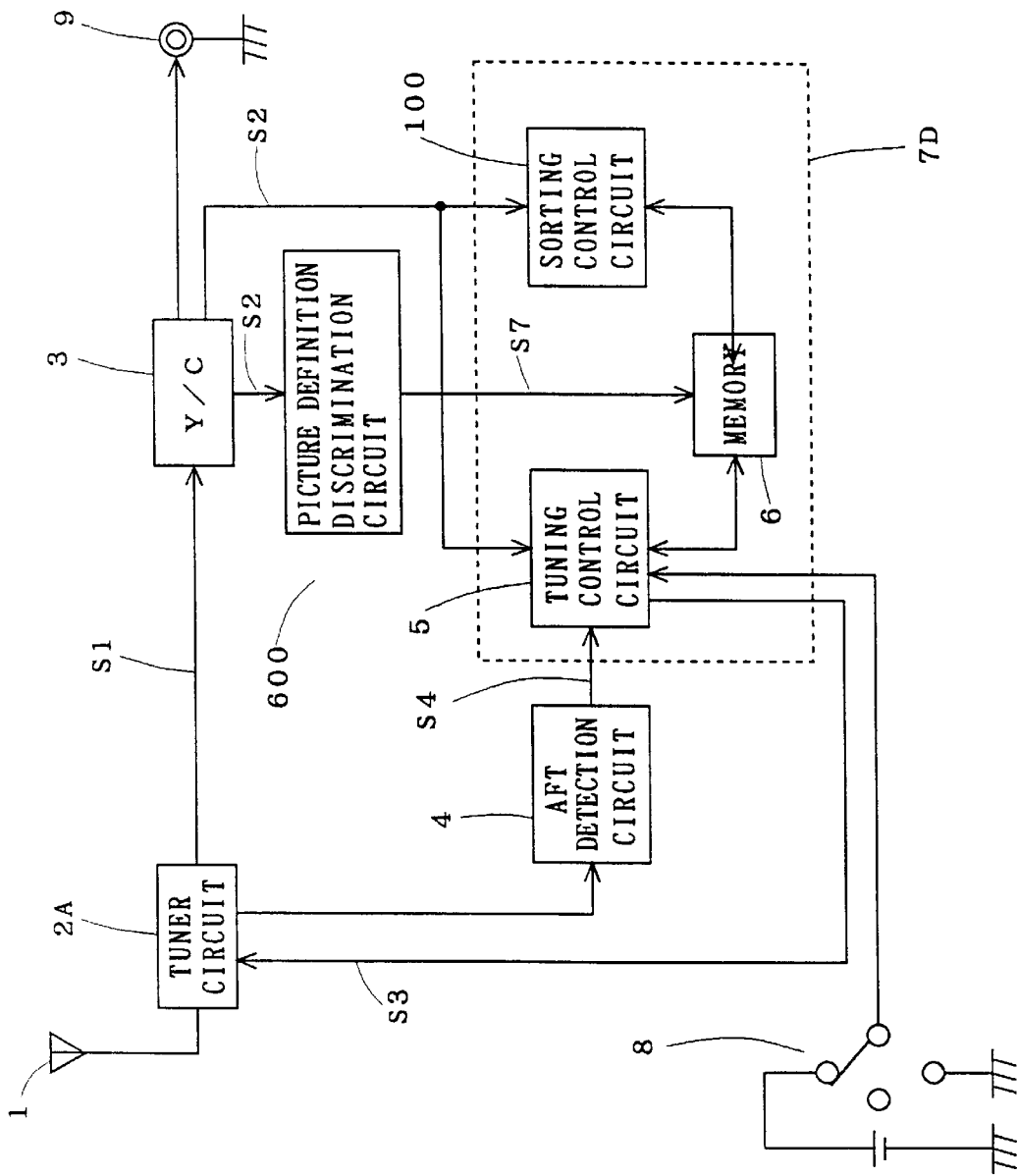
FIG. 48 illustrates the structure of an automatic tuning apparatus according to a sixteenth embodiment of the present invention.

FIG. 48 shows the structure of an automatic tuning apparatus A16 for a VTR according to a sixteenth embodiment of the present invention. Referring to FIG. 48, structural parts identical to those of the automatic tuning apparatus A10 described with reference to FIG. 28 are denoted by the same reference numerals, to omit redundant description. In the automatic tuning apparatus A16, a picture definition discrimination circuit 600 is provided in place of the text data decoder circuit 10 of the automatic tuning apparatus A10 shown in FIG. 28.

The picture definition discrimination circuit 600, which is formed similarly to the picture definition detection circuit 30 of the automatic tuning apparatus A3 described with reference to FIG. 7 as the third embodiment, outputs picture definition data S7 which is proportionate to the noise quantity of a blanking part of a video signal S1 having no actual signal. Redundant description is omitted since the detail of the picture definition detection circuit 30 has already been explained, and the output of the picture definition discrimination circuit 600 is called "discrimination result of the degree of picture definition" in the following description. Further, a sorting control circuit 100 employs the picture definition information in place of broadcasting station information (station ID), and hence "station ID" in the automatic tuning apparatus A10 described with reference to the tenth embodiment of the present invention is re-read as "degree of picture definition".

Figure 49:
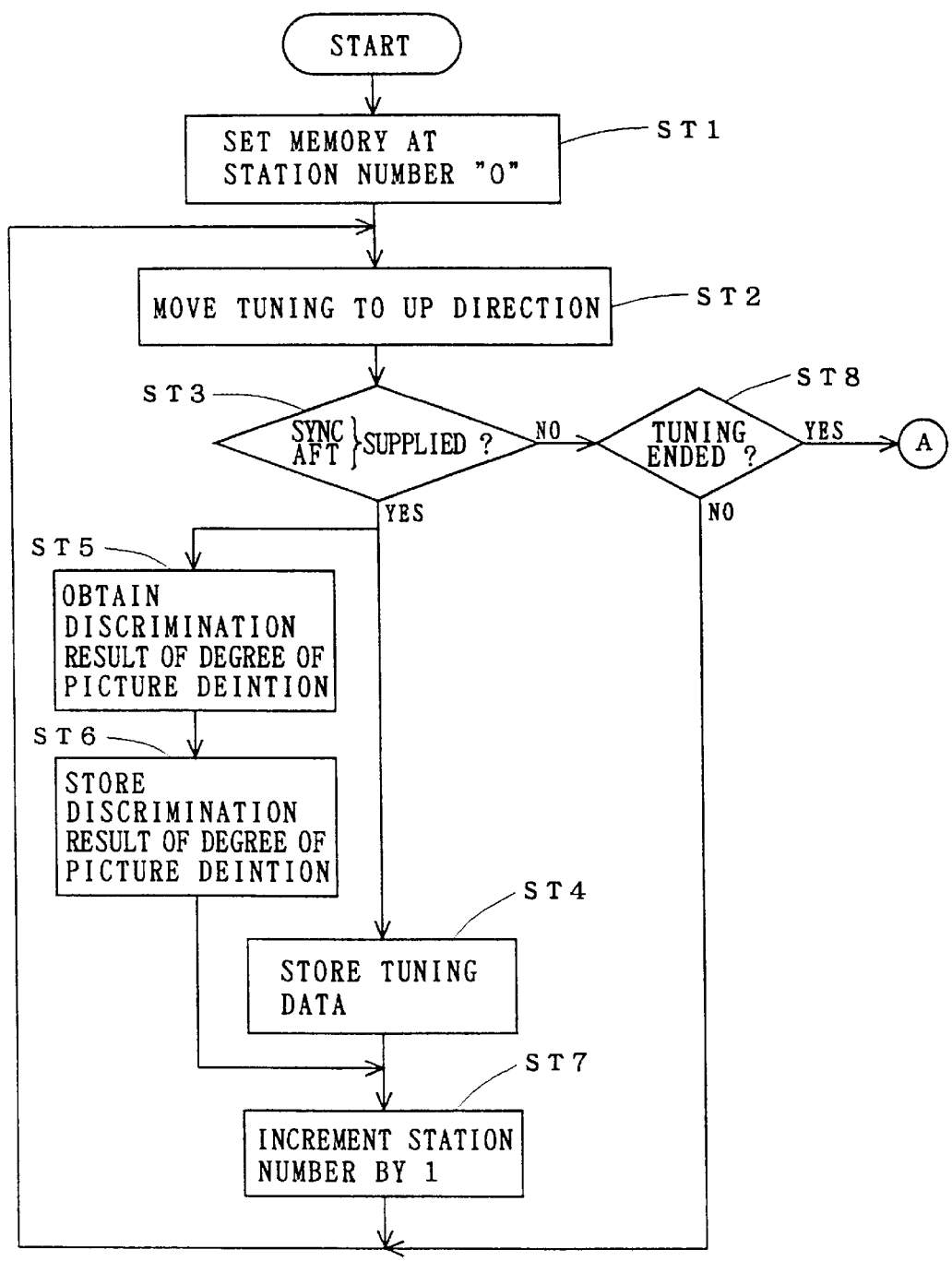
FIG. 49 is a flow chart for illustrating the operation of the automatic tuning apparatus according to the sixteenth embodiment of the present invention.
Figure 50:
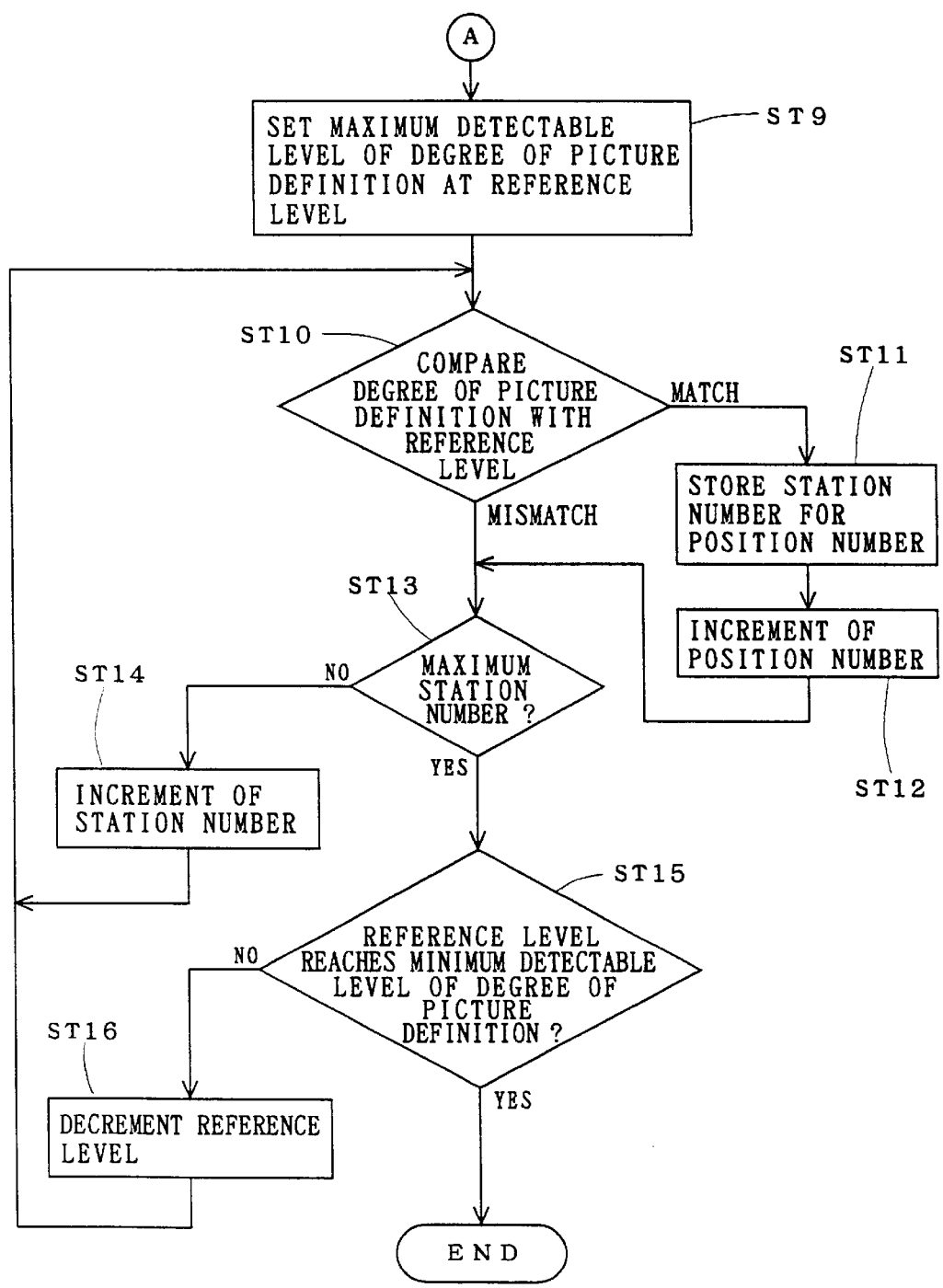
FIG. 50 is a flow chart for illustrating the operation of the automatic tuning apparatus according to the sixteenth embodiment of the present invention.
Figure 5:
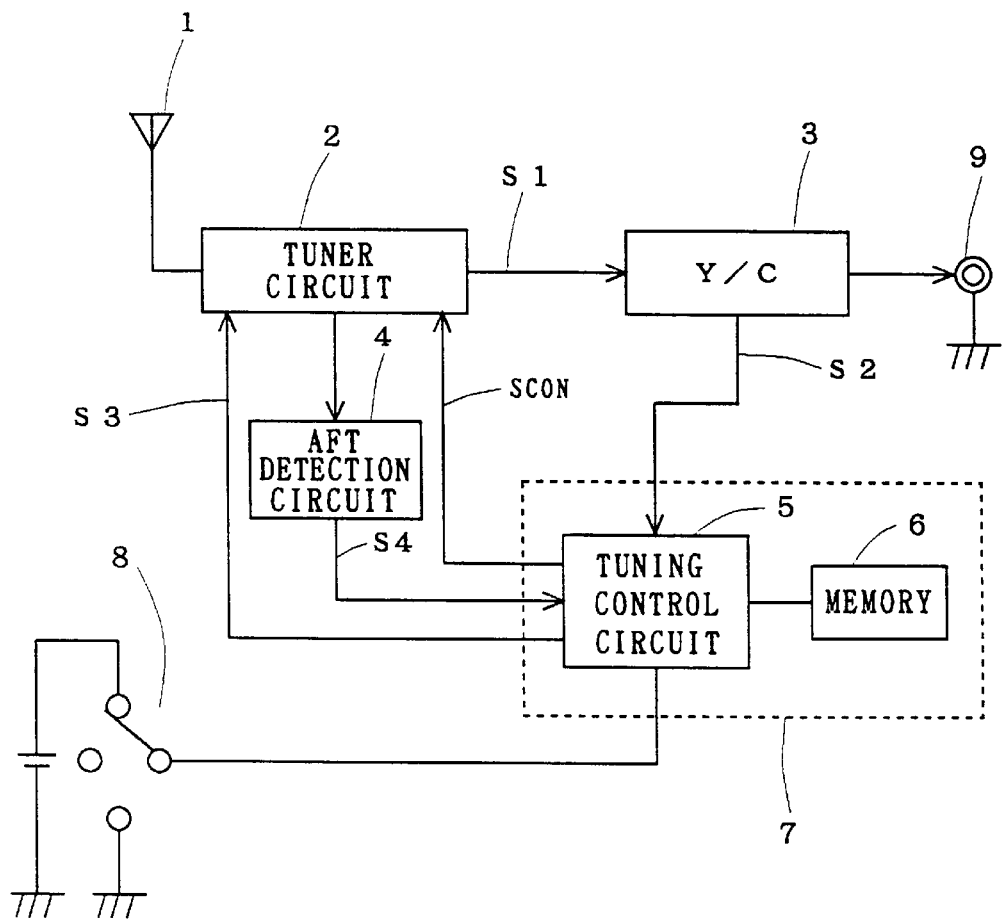
Figure 52:
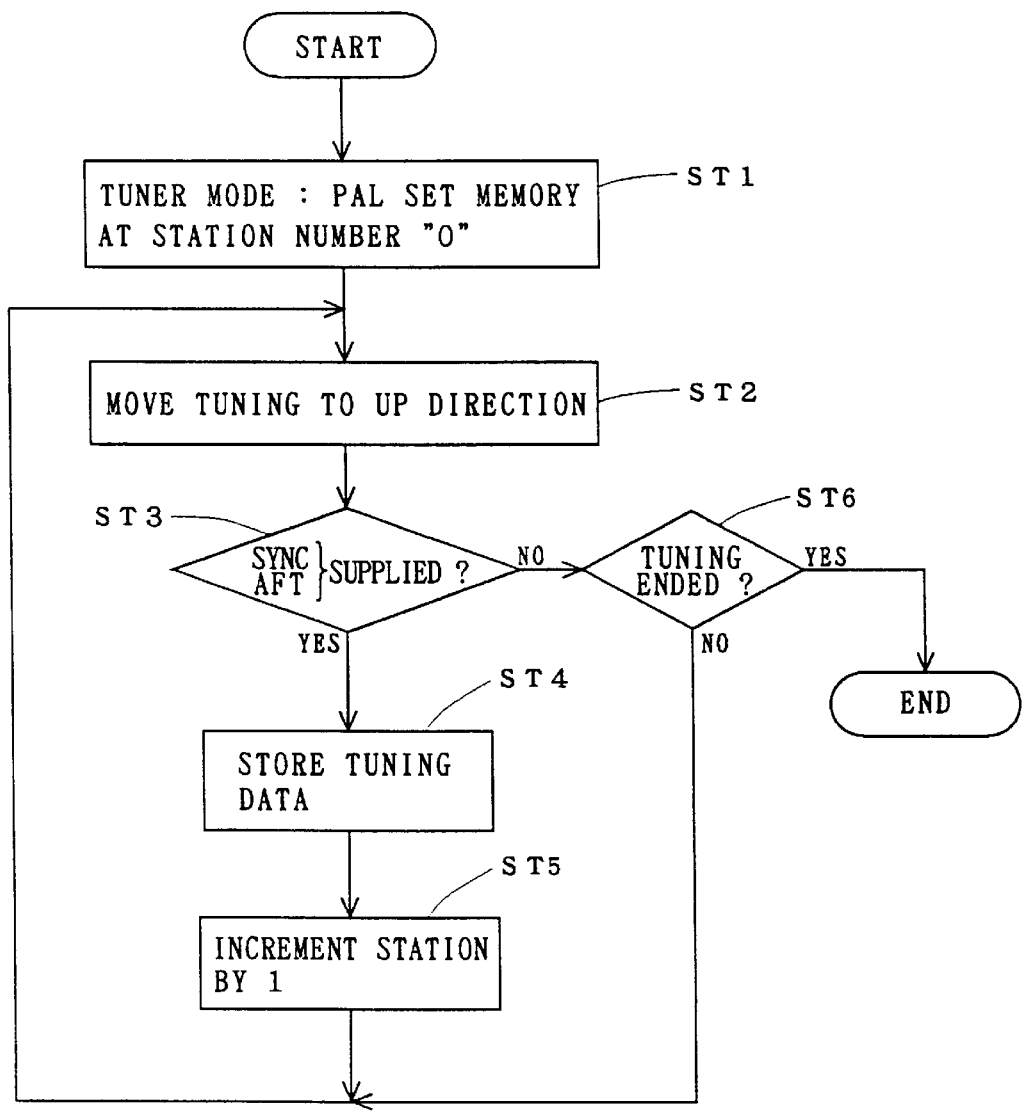
FIG. 52 is a flow chart for illustrating the operation of the conventional automatic tuning apparatus.

With reference to flow charts shown in FIGS. 49 and 50, the operation of the automatic tuning apparatus A16 is now described. When a command for auto tuning is received from the user, a system controller 7D sets the memory address of a memory 6 at a station number "0" (step ST1).

Then, a tuning control signal S3 is transmitted to a tuner circuit 2A, to control the same in a direction for increasing the tuning frequency by a constant amount (step ST2). At this time, an AFT signal S4 which is outputted from an AFT detection circuit 4 and a SYNC signal S2 indicating presence/absence of a signal separated by a video signal processing circuit 3 are inputted in the tuning control circuit 5 for detecting presence/absence of a broadcasting station transmitting a signal of the frequency, to make a discrimination (step ST3).

When both of the AFT signal S4 and the SYNC signal S2 are supplied at this point of time, the tuning control circuit 5 determines that the signal from the broadcasting station can be received, and the current tuning data is stored in the address of the station number "0" in the memory 6 (step ST4).

At the same time, the discrimination result of the degree of picture definition is obtained from the picture definition discrimination circuit 600 (step ST5).

The discrimination result of the degree of picture definition is stored in the address of the station number "0" in the memory 6, similarly to data related to the frequency (step ST6).

Then, the address of the memory 6 is incremented by one to a station number "1" in order to store next tuning data, for entering a next tuning operation (step ST7).

If both of the AFT signal S4 and the SYNC signal S2 are supplied at the step ST3, on the other hand, a discrimination is made as to whether or not the current frequency reaches the upper limit of the tuning frequency, i.e., whether or not the tuning is ended (step ST8). If the current frequency does not reach the upper limit of the tuning frequency, the operation at the step ST2 is carried out again and the operations through the steps ST2 to ST7 are repeated until the upper limit of the tuning frequency is reached.

If the upper limit of the tuning frequency is reached at the step ST8, the process enters a sorting operation of the sorting control circuit 100. First, a reference level for comparing received degrees of screen definition of respective broadcasting stations is set. The maximum detectable level of the degree of picture definition is set here (step ST9).

Then, a tuning data memory 62 in the memory 6 is activated, a degree of picture definition corresponding to the station number is read to be compared with the reference level, and a determination part 160 makes a determination (step ST10).

When the degrees of picture definition match with each other at the step ST10, the station number is stored in a sorting result memory 63 in the memory 6 in correspondence to the position number (step ST11).

Then, the position number is incremented by one in a position number pointer 110 (step ST12).

Then, a station number pointer 120 determines whether or not the current station number reaches the upper limit (step ST13).

Also when the degrees of picture definition mismatch with each other at the step ST10, the operation at the step ST13 is carried out.

If the current station number does not reach the upper limit at the step ST13, the station number is incremented by one in the station number pointer 120, to carry out the operation following the step ST10 again (step ST14).

When the current station number reaches the upper limit, on the other hand, a discrimination is made as to whether or not the reference level is the minimum detectable level of the degree of picture definition (step ST15).

If a determination is made at the step ST15 that the reference level reaches the minimum detectable level of the degree of picture definition, the sorting operation is ended.

If the reference level does not reach the minimum detectable level of the degree of picture definition, on the other hand, the reference level is decremented, to carry out the operation following the step ST10 again (step ST16).

The aforementioned automatic tuning apparatus A16 comprises the sorting control circuit 100 and the picture definition discrimination circuit 600 and carries out the sorting operation, whereby broadcasting stations are automatically set in the respective position numbers from that having a higher degree of picture definition. Therefore, a broadcasting station having higher picture definition is preferentially stored in the case where the same broadcasting station is received at different frequencies or the like, whereby the user can receive excellent broadcasting by selecting the broadcasting station in the order of the position number.

When a plurality of broadcasting stations having the same levels of picture definition are received, the same are set at the position numbers in order of level comparison, i.e., the order of the broadcasting frequencies.

At the step ST9, the first set reference level may alternatively set at the minimum level.

While the sorting order is decided by the degrees of picture definition in the aforementioned automatic tuning apparatus A16, sorting may alternatively be carried by the amounts of noises detected by a simple noise detector.

While the invention has been shown and described in detail, the foregoing description is in all aspects illustrative and not restrictive. It is therefore understood that numerous modifications and variations can be devised without departing from the scope of the invention.

What is claimed is:

1. An automatic tuning apparatus comprising:

tuner means for tune-selecting a prescribed channel from broadcast electric waves including at least a video signal;

video signal processing means for receiving said video signal output from said tuner means, and for separating a synchronizing signal included in said video signal;

automatic fine tuning (AFT) detection means for detecting a presence or absence of a broadcasting station via a signal received from said tuner means;

tuning control means for receiving said synchronizing signal from said video signal processing means and an AFT signal from said AFT detection means, and for controlling a tuning operation of said tuner means;

memory means connected to said tuning control means for storing data related to at least a tuning frequency of said tuner means; and a text data decoder means for receiving said video signal output from said tuner means, and for decoding text data included in said video signal;

said tuning control means controlling said tuner means with said decoded text data while separating broadcasting station information specifying said broadcasting station from said decoded text data, and storing the broadcasting station information in said memory means along with said data related to the tuning frequency so that said presence or absence of broadcasting stations is automatically determined in an auto-tuning operation.

2. The automatic tuning apparatus in accordance with claim 1, further comprising:

character generator means, connected to said video signal processing means outputting said video signal, for superposing said broadcasting station information stored in said memory means on said video signal.

3. An automatic tuning apparatus comprising:

tuner means for tune-selecting a prescribed channel from broadcast electric waves including at least a video signal;

video signal processing means for receiving said video signal output from said tuner means, and for separating a synchronizing signal included in said video signal;

automatic fine tuning (AFT) detection means for detecting a presence or absence of a broadcasting station via a signal received from said tuner means;

tuning control means for receiving said synchronizing signal from said video signal processing means and an AFT signal from said AFT detection means, and for controlling a tuning operation of said tuner means;

memory means connected to said tuning control means for storing data related to at least a tuning frequency of said tuner means; and a text data decoder means for receiving said video signal output from said tuner means, and for decoding text data included in said video signal; and sorting control means for automatically sorting storage contents stored in said memory means, including at least said data related to the tuning frequency of said tuning means, in a predetermined order;

said tuning control means controlling said tuner means with said decoded text data while separating broadcasting station information specifying said broadcasting station from said decoded text data, and storing the broadcasting station information in said memory means along with said data related to the tuning frequency, data related to said broadcasting station information, and data related to said tuning frequency automatically sorted in said predetermined order so that said presence or absence of broadcasting stations is automatically determined in an auto-tuning operation.

4. The automatic tuning apparatus in accordance with claim 3, further comprising:

sorting order set means connected to said memory means for arbitrarily setting the predetermined sorting order of said storing contents.

5. An automatic tuning apparatus comprising:

a tuner configured to tune-select a prescribed channel from broadcast electric waves including at least a video signal;

a video signal processor configured to receive said video signal output from said tuner, and configured to separate a synchronizing signal included in said video signal;

an automatic fine tuning (AFT) detector configured to detect a presence or absence of a broadcasting station via a signal received from said tuner;

a tuning controller configured to receive said synchronizing signal from said video signal processor and an AFT signal from said AFT detector, and configured to control a tuning operation of said tuner;

a memory connected to said tuning controller configured to store data related to at least a tuning frequency of said tuner; and a text data decoder configured to receive said video signal output from said tuner, and configured to decode text data included in said video signal;

said tuning controller controlling said tuner with said decoded text data while separating broadcasting station information specifying said broadcasting station from said decoded text data, and storing the broadcasting station information in said memory along with said data related to the tuning frequency so that said presence or absence of broadcasting stations is automatically determined in an auto-tuning operation.

6. The automatic tuning apparatus in accordance with claim 5, further comprising:

a character generator, connected to said video signal processor outputting said video signal, configured to superpose said broadcasting station information stored in said memory on said video signal.

7. An automatic tuning apparatus comprising:

a tuner configured to tune-select a prescribed channel from broadcast electric waves including at least a video signal;

a video signal processor configured to receive said video signal output from said tuner, and configured to separate a synchronizing signal included in said video signal;

an automatic fine tuning (AFT) detector configured to detect a presence or absence of a broadcasting station via a signal received from said tuner;

a tuning controller configured to receive said synchronizing signal from said video signal processor and an AFT signal from said AFT detector, and configured to control a tuning operation of said tuner;

a memory connected to said tuning controller configured to store data related to at least a tuning frequency of said tuner;

a text data decoder configured to receive said video signal output from said tuner, and configured to decode text data included in said video signal; and sorting controller configured to automatically sort storage contents stored in said memory, including at least said data related to the tuning frequency of said tuner, in a predetermined order;

said tuning controller controlling said tuner with said decoded text data while separating broadcasting station information specifying said broadcasting station from said decoded text data, and storing the broadcasting station information in said memory along with said data related to the tuning frequency, data related to said broadcasting station information, and data related to said tuning frequency automatically sorted in said predetermined order so that said presence or absence of broadcasting stations is automatically determined in an auto-tuning operation.

8. The automatic tuning apparatus in accordance with claim 7, further comprising:

sorting order setter connected to said memory configured to arbitrarily set the predetermined sorting order of said storing contents.

* * * * *